(12) United States Patent
Hino

(10) Patent No.: US 9,793,992 B2
(45) Date of Patent: Oct. 17, 2017

(54) SIGNAL TRANSMISSION DEVICE, RECEIVING CIRCUIT, AND ELECTRONIC APPARATUS

(75) Inventor: Yasufumi Hino, Saitama (JP)

(73) Assignee: Sony Corporation, Tokyo (JP)

( * ) Notice: Subject to any disclaimer, the term of this patent is extended or adjusted under 35 U.S.C. 154(b) by 498 days.

(21) Appl. No.: 14/236,242

(22) PCT Filed: Sep. 2, 2011

(86) PCT No.: PCT/JP2011/070005
§ 371 (c)(1),
(2), (4) Date: Jan. 30, 2014

(87) PCT Pub. No.: WO2013/021510
PCT Pub. Date: Feb. 14, 2013

(65) Prior Publication Data
US 2014/0178064 A1    Jun. 26, 2014

(30) Foreign Application Priority Data

Aug. 9, 2011 (JP) .................................. 2011-174068

(51) Int. Cl.
*H04Q 11/02* (2006.01)
*H04B 10/25* (2013.01)
(Continued)

(52) U.S. Cl.
CPC ....... *H04B 10/2503* (2013.01); *H04B 1/1036* (2013.01); *H04B 3/52* (2013.01);
(Continued)

(58) Field of Classification Search
CPC .... H04B 10/2503; H04B 1/1036; H04B 3/52; H04J 1/02
See application file for complete search history.

(56) References Cited

U.S. PATENT DOCUMENTS 5,530,722 A  *  6/1996  Dent ...................... H03C 1/542
                                                    332/103
6,169,912 B1 *  1/2001  Zuckerman ............ H04B 1/525
                                                    455/570
(Continued)

FOREIGN PATENT DOCUMENTS

JP    05-122549    5/1993
JP    07-264571    10/1995
(Continued)

OTHER PUBLICATIONS

Fukuda, Satoshi, et al., "A 12.5+12.5Gb/s Full-Duplex Plastic Waveguide Interconnect", International Solid-State Circuits Conference,IEEE, 2011, p. 150-152.

*Primary Examiner* — Khaled Kassim
*Assistant Examiner* — Berhanu Belete
(74) *Attorney, Agent, or Firm* — Chip Law Group

(57) ABSTRACT

There is provided a signal transmission device including reception processing units for respective channels, so as to enable multichannel transmission by dividing frequency bands. The total number of channels is equal to or greater than three. When full-duplex two-way communication is applied in any combination of two channels, one of reception processing unit include a signal suppressing unit configured to suppress a signal component of a channel other than a self channel.

19 Claims, 24 Drawing Sheets

(51) Int. Cl.
    *H04J 1/12*          (2006.01)
    *H04B 1/10*         (2006.01)
    *H04J 1/02*          (2006.01)
    *H04L 5/14*          (2006.01)
    *H04L 5/16*          (2006.01)
    *H04B 3/52*         (2006.01)
    *H04L 25/03*        (2006.01)

(52) U.S. Cl.
    CPC .................................. *H04J 1/02* (2013.01);
    *H04J 1/12* (2013.01); *H04L 5/14* (2013.01);
    *H04L 5/16* (2013.01);
    *H04L 2025/03426* (2013.01)

(56) References Cited

U.S. PATENT DOCUMENTS

| | | | | |
|---|---|---|---|---|
| 6,493,131 B1* | 12/2002 | Tarng | H04B 10/503 | 359/240 |
| 7,356,213 B1* | 4/2008 | Cunningham | H01L 23/48 | 257/E23.01 |
| 9,634,737 B2* | 4/2017 | Chang | H04B 5/02 | |
| 2004/0012387 A1* | 1/2004 | Shattil | H04B 7/0857 | 324/225 |
| 2004/0214537 A1* | 10/2004 | Bargroff | H03D 7/00 | 455/136 |
| 2005/0032485 A1* | 2/2005 | Bachman | H03F 1/3229 | 455/114.2 |
| 2007/0297713 A1* | 12/2007 | Lu | G02B 6/421 | 385/14 |
| 2008/0131047 A1* | 6/2008 | Beausoleil | B82Y 20/00 | 385/1 |
| 2009/0086859 A1* | 4/2009 | Okuma | H03G 3/3068 | 375/345 |
| 2010/0014610 A1* | 1/2010 | Jaso | H04L 27/2046 | 375/308 |
| 2010/0093299 A1* | 4/2010 | Pinel | G06G 7/12 | 455/226.1 |
| 2010/0231452 A1* | 9/2010 | Babakhani | G01S 7/032 | 342/368 |
| 2010/0316391 A1* | 12/2010 | Shastri | H04B 10/801 | 398/141 |
| 2011/0009078 A1* | 1/2011 | Kawamura | G06K 19/07749 | 455/101 |
| 2011/0013866 A1* | 1/2011 | Rosenberg | G02B 6/0096 | 385/14 |
| 2011/0026443 A1* | 2/2011 | Okada | H01P 1/17 | 370/280 |
| 2011/0037863 A1* | 2/2011 | Mihota | G03B 17/00 | 348/208.99 |
| 2011/0038282 A1* | 2/2011 | Mihota | H04B 3/52 | 370/276 |
| 2011/0044217 A1* | 2/2011 | Wu | H04L 5/14 | 370/294 |
| 2011/0051780 A1* | 3/2011 | Kawasaki | H04B 1/40 | 375/135 |
| 2011/0068990 A1* | 3/2011 | Grzyb | H01P 1/042 | 343/772 |
| 2011/0075721 A1* | 3/2011 | Minakawa | H04B 15/02 | 375/238 |
| 2011/0076944 A1* | 3/2011 | Mihota | H04L 27/02 | 455/41.2 |
| 2011/0095385 A1* | 4/2011 | Kawamura | H01L 23/48 | 257/428 |
| 2011/0098010 A1* | 4/2011 | Mihota | H04B 7/0413 | 455/101 |
| 2011/0158344 A1* | 6/2011 | Kawamura | H01P 1/047 | 375/295 |
| 2011/0181375 A1* | 7/2011 | Ma | H01P 5/028 | 333/240 |
| 2011/0194627 A1* | 8/2011 | Fukuda | H04B 1/40 | 375/259 |
| 2011/0199972 A1* | 8/2011 | Warke | H01Q 3/26 | 370/328 |
| 2012/0207195 A1* | 8/2012 | Kawasaki | H04B 1/04 | 375/219 |
| 2013/0205049 A1* | 8/2013 | Kawasaki | H01L 23/48 | 710/33 |

FOREIGN PATENT DOCUMENTS

| | | |
|---|---|---|
| JP | 2001-144661 | 5/2001 |
| JP | 2009-055379 | 3/2009 |
| JP | 2010-178144 | 8/2010 |

* cited by examiner

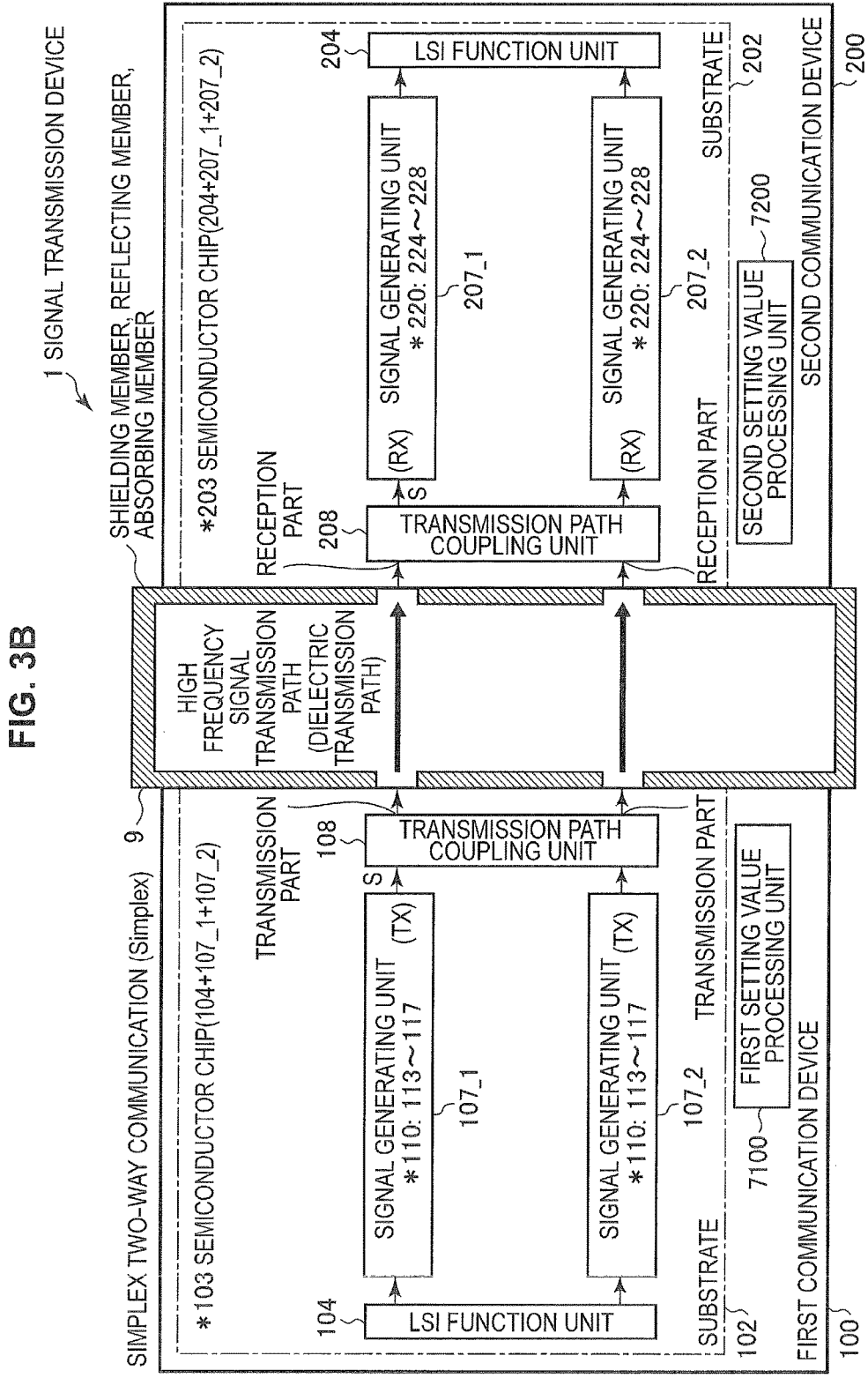

FIG. 4
(A) IDEAL GAIN CHARACTERISTIC OF AMPLIFIER CIRCUIT (SYMMETRIC)
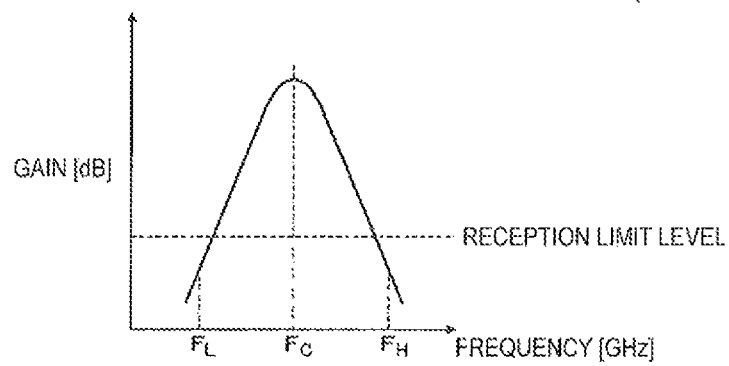
(B) REALISTIC GAIN CHARACTERISTIC: LOW FREQUENCY SIDE HAS HIGHER GAIN TENDENCY THAN HIGH FREQUENCY SIDE
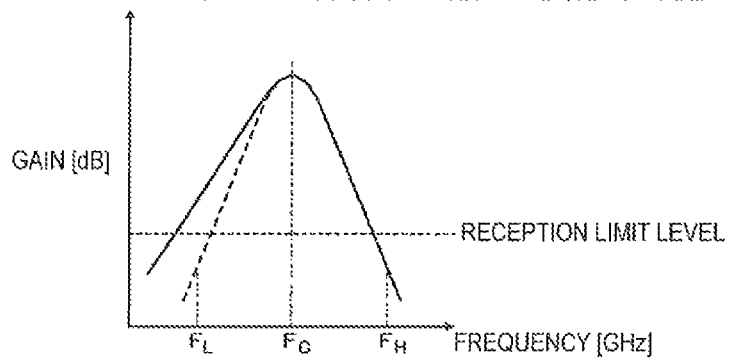
(C) REALISTIC GAIN CHARACTERISTIC: HIGH FREQUENCY SIDE HAS HIGHER GAIN TENDENCY THAN LOW FREQUENCY SIDE
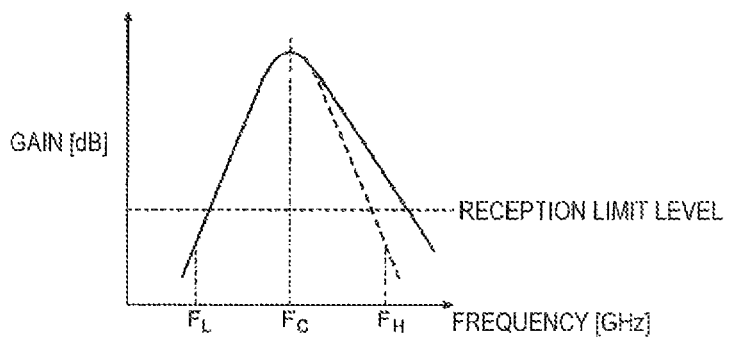

FIG. 5
< COUNTERMEASURE PRINCIPLE OF ADJACENT INTERFERENCE >
(A) REALISTIC GAIN CHARACTERISTIC: LOW FREQUENCY SIDE HAS HIGHER GAIN TENDENCY THAN HIGH FREQUENCY SIDE
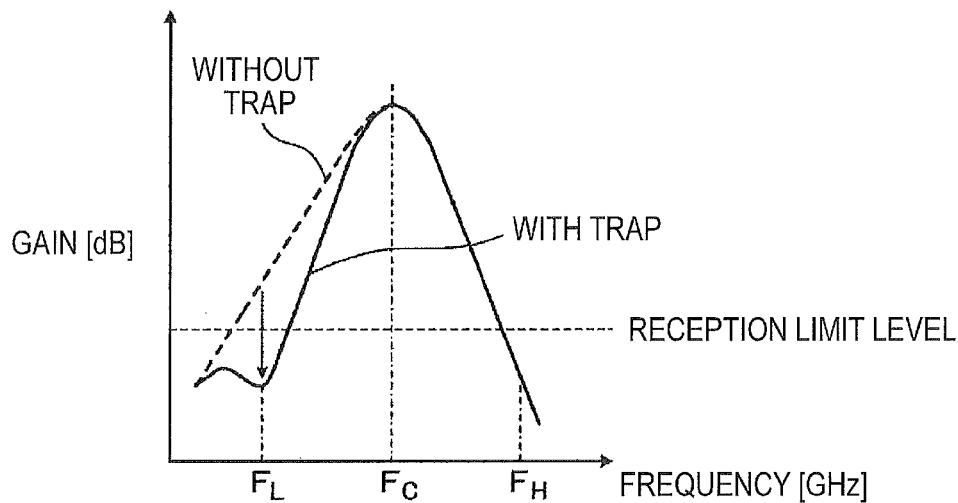
(B) REALISTIC GAIN CHARACTERISTIC: HIGH FREQUENCY SIDE HAS HIGHER GAIN TENDENCY THAN LOW FREQUENCY SIDE
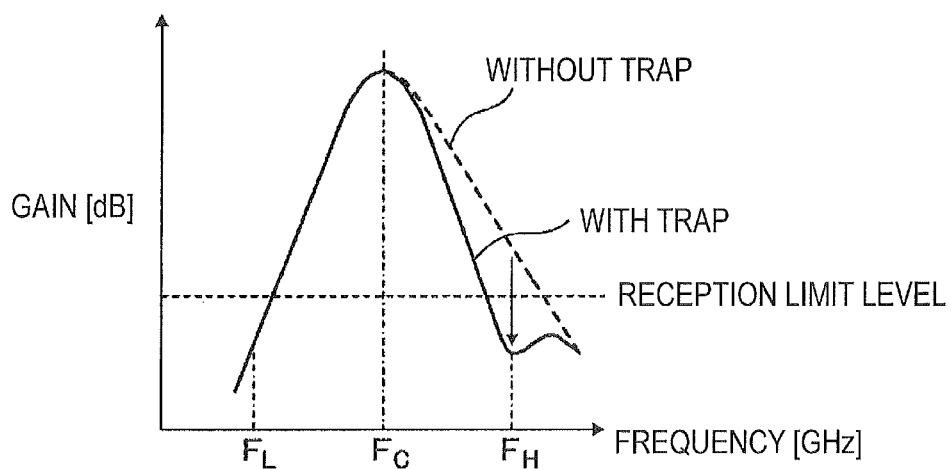

FIG. 6
< COUNTERMEASURE PRINCIPLE OF ADJACENT INTERFERENCE >
(A) BOTH CHANNELS: LOW FREQUENCY SIDE HAS HIGHER GAIN TENDENCY THAN HIGH FREQUENCY SIDE

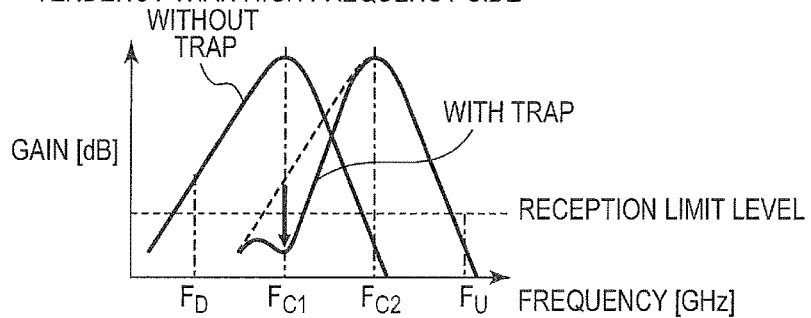

(B) BOTH CHANNELS: HIGH FREQUENCY SIDE HAS HIGHER GAIN TENDENCY THAN LOW FREQUENCY SIDE

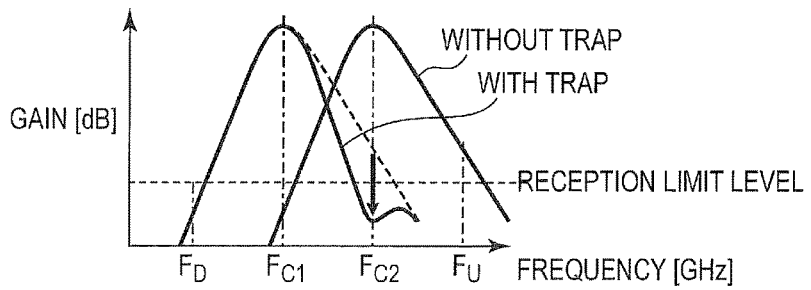

(C) LOW FREQUENCY CHANNEL: HIGH FREQUENCY SIDE HAS HIGHER GAIN TENDENCY THAN LOW FREQUENCY SIDE
HIGH FREQUENCY CHANNEL: LOW FREQUENCY SIDE HAS HIGHER GAIN TENDENCY THAN HIGH FREQUENCY SIDE

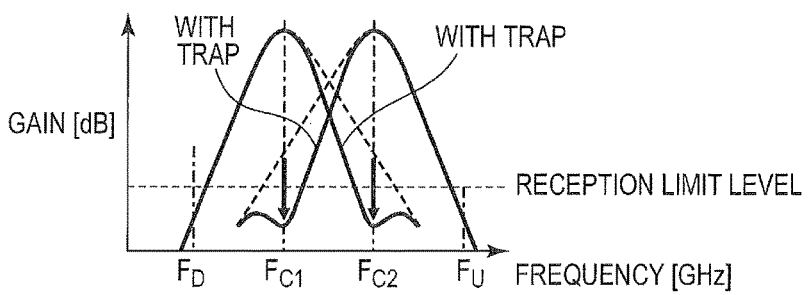

(D) LOW FREQUENCY CHANNEL: LOW FREQUENCY SIDE HAS HIGHER GAIN TENDENCY THAN HIGH FREQUENCY SIDE
HIGH FREQUENCY CHANNEL: HIGH FREQUENCY SIDE HAS HIGHER GAIN TENDENCY THAN LOW FREQUENCY SIDE

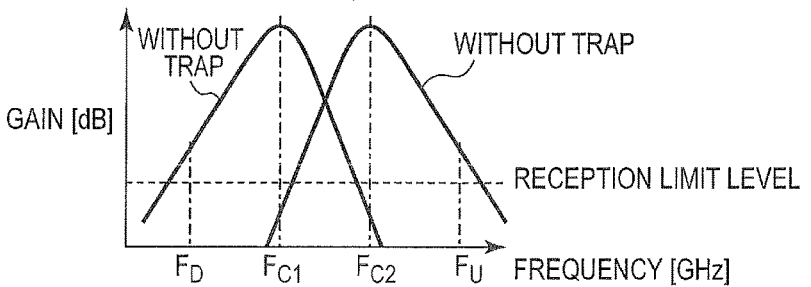

FIG. 7
< LOW-NOISE AMPLIFIER 400 WITH TRAP: FIRST EXAMPLE >
(A)
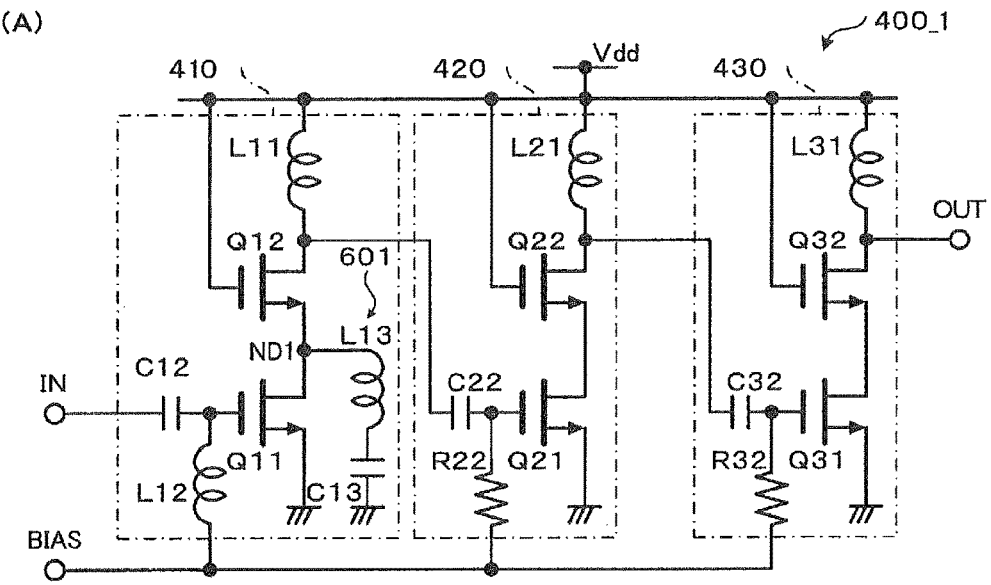
(B) GAIN CHARACTERISTIC EXAMPLE OF 57GHz AMP
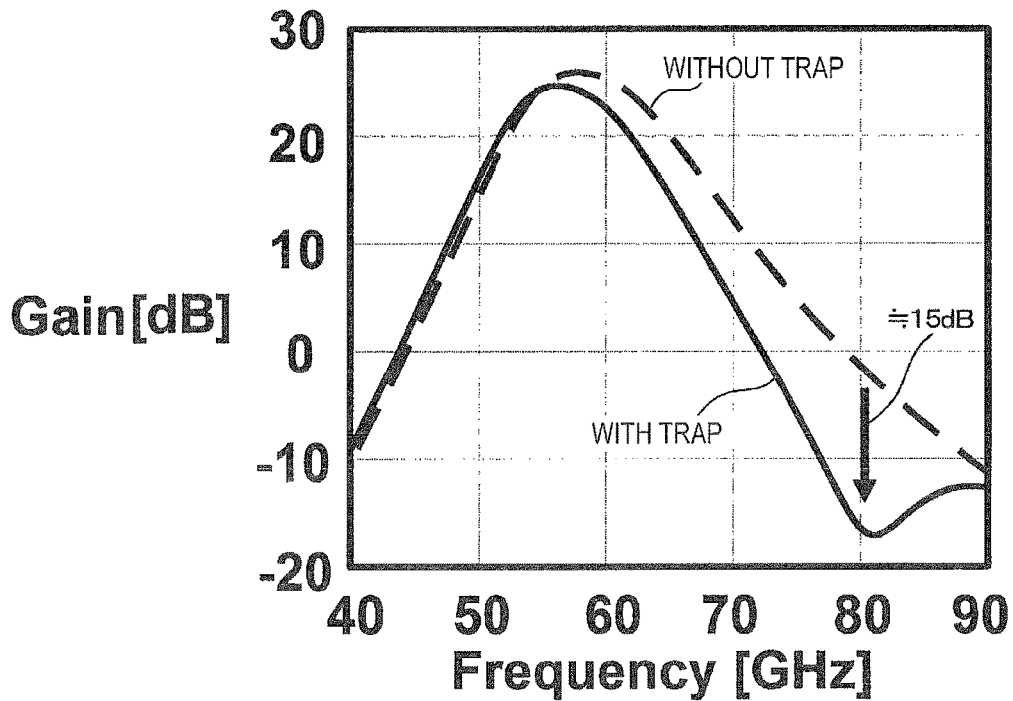

< LOW-NOISE AMPLIFIER 400 WITH TRAP : SECOND EXAMPLE >

< LOW-NOISE AMPLIFIER 400 WITH TRAP: THIRD EXAMPLE >

FIG. 10
< LOW-NOISE AMPLIFIER 400 WITHOUT TRAP >
(A)
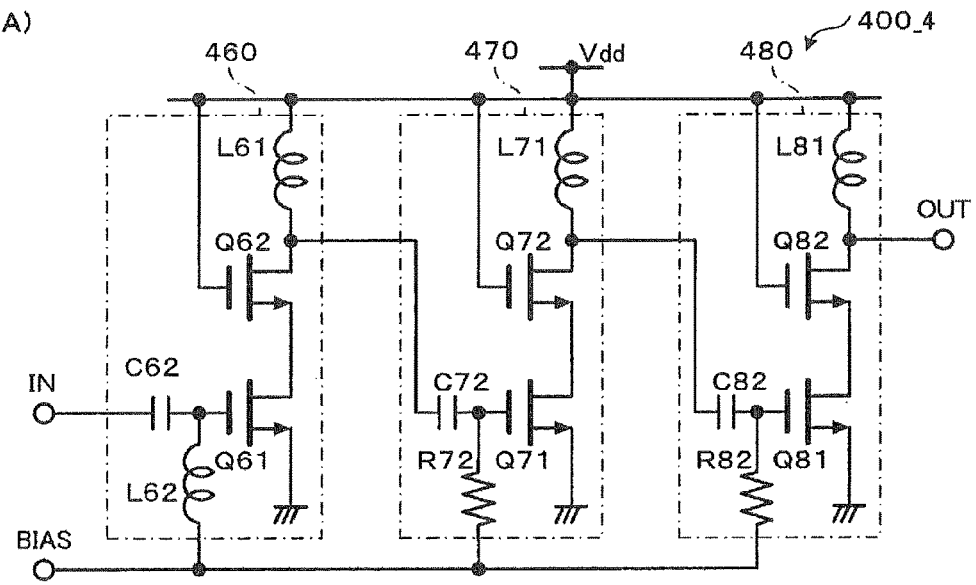
(B) GAIN CHARACTERISTIC EXAMPLE OF 80GHz AMP
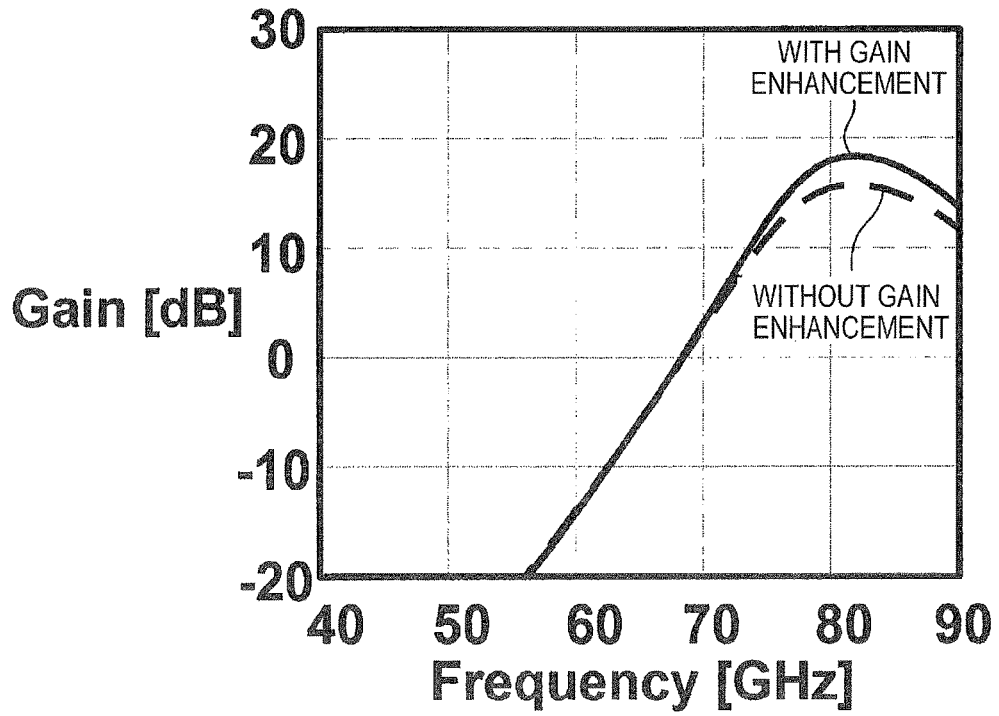

< EMBODIMENT 1: FULL-DUPLEX TWO-WAY COMMUNICATION (Full-duplex) >

FIG. 12
< EMBODIMENT 1 >
(A)
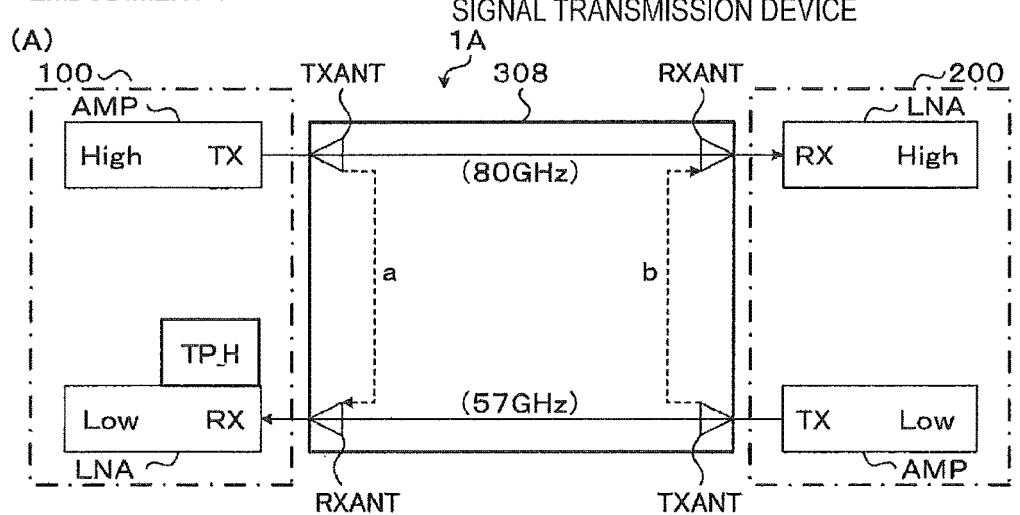
(B) GAIN CHARACTERISTIC EXAMPLE OF 57GHz AMP
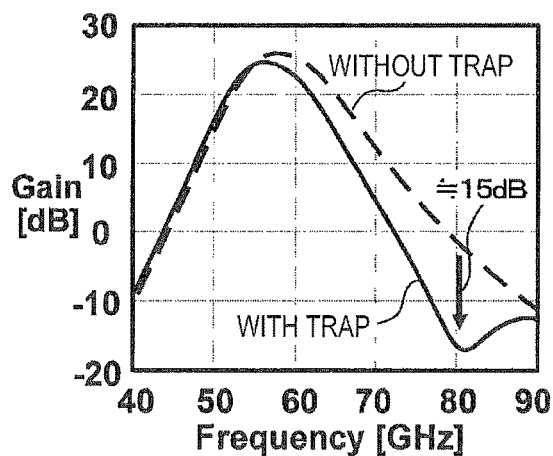
(C) GAIN CHARACTERISTIC EXAMPLE OF 80GHz AMP
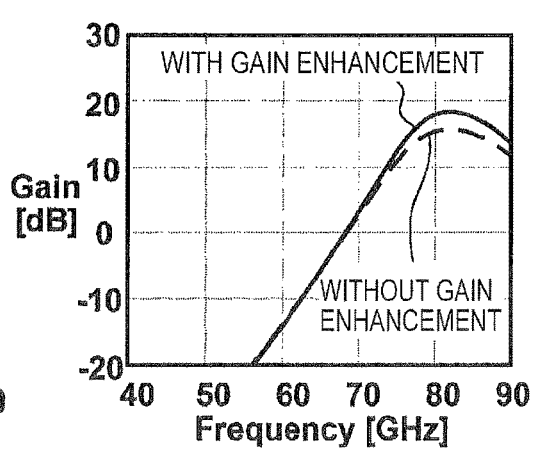

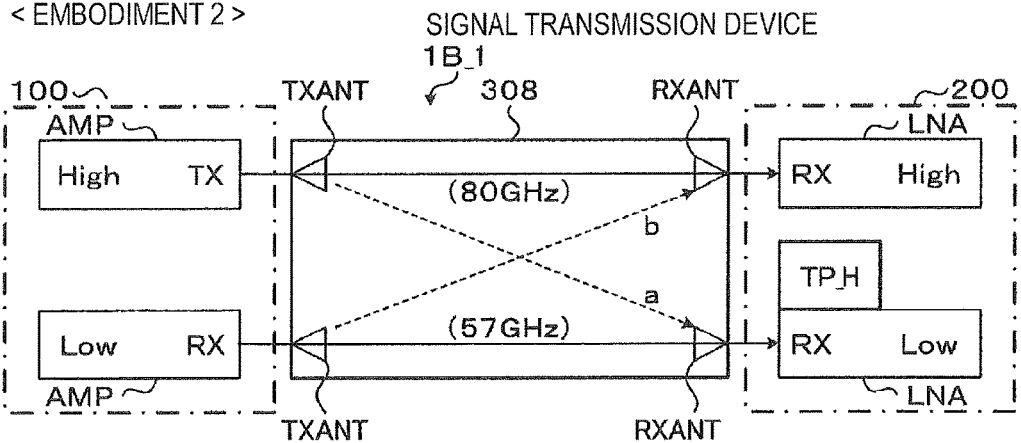
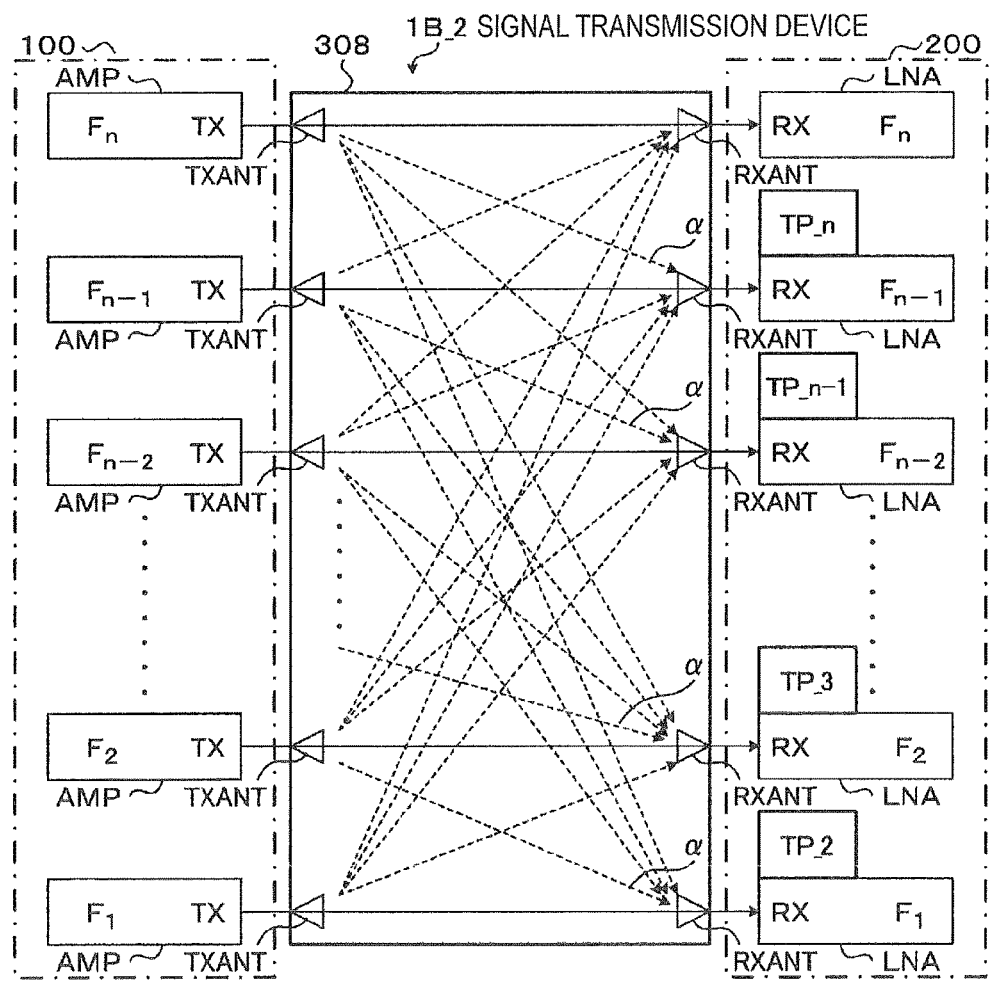

FIG. 16
< EMBODIMENT 3 >
(A) GAIN CHARACTERISTIC EXAMPLE OF 57GHz AMP
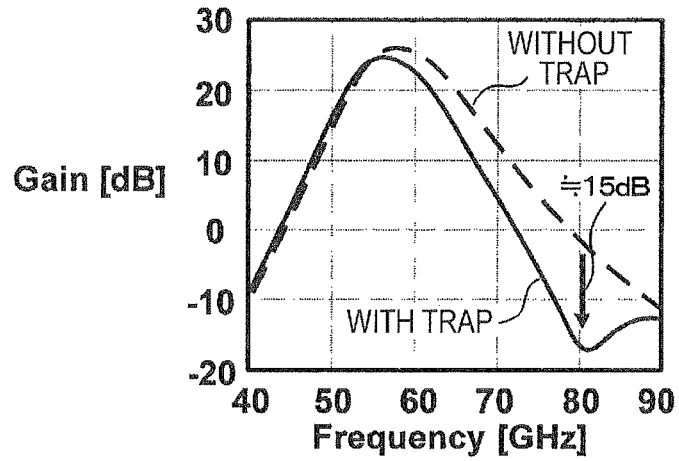
(B) GAIN CHARACTERISTIC EXAMPLE OF 80GHz AMP
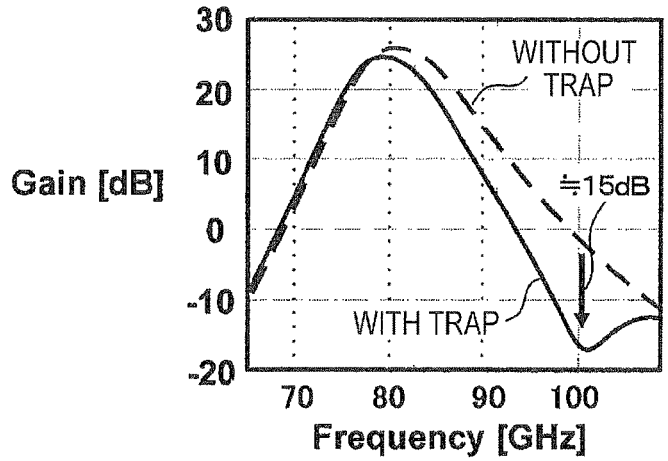
(C) GAIN CHARACTERISTIC EXAMPLE OF 103GHz AMP
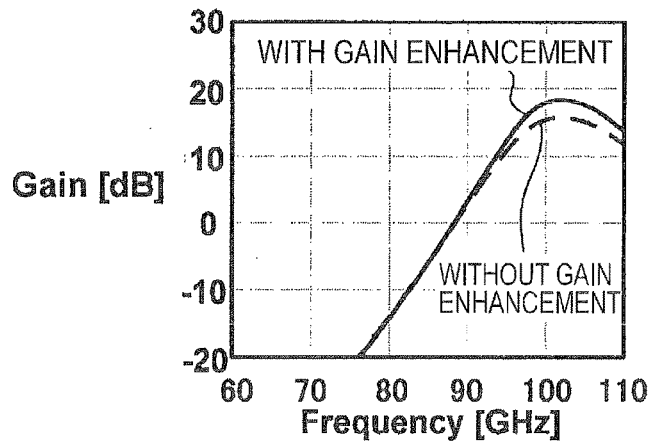

FIG. 17
<EMBODIMENT 3>
(A) FIRST EXAMPLE
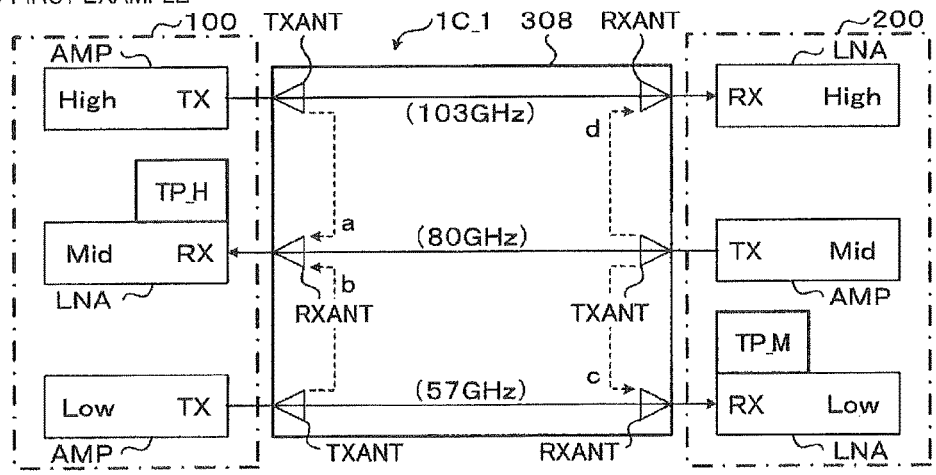
(B) SECOND EXAMPLE
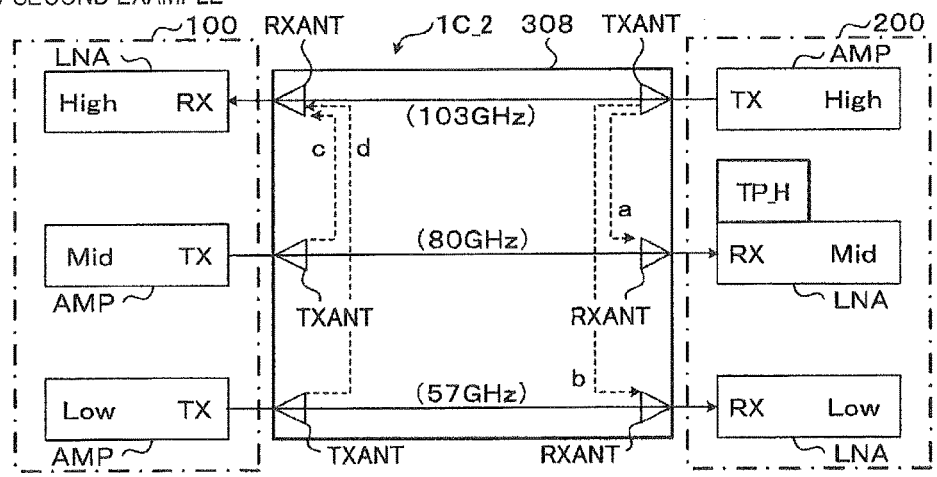
(C) THIRD EXAMPLE
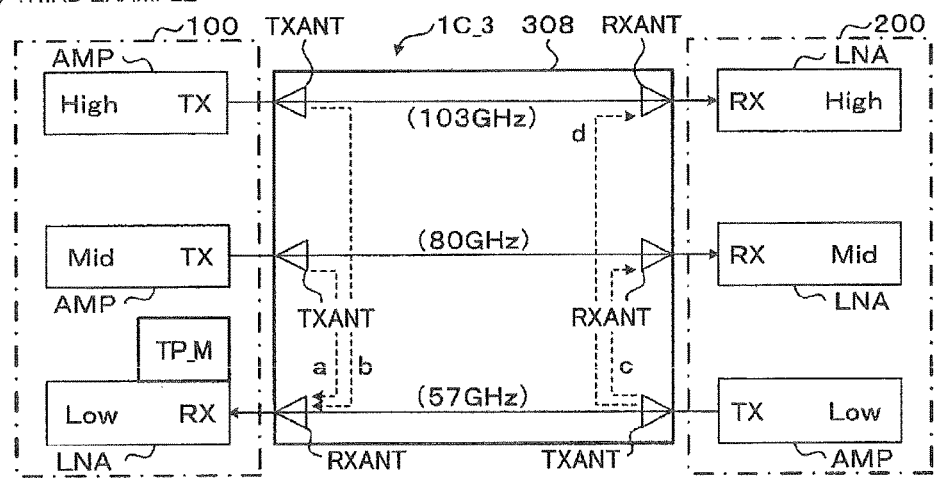

FIG. 19
<EMBODIMENT 4>
(A) FIRST EXAMPLE
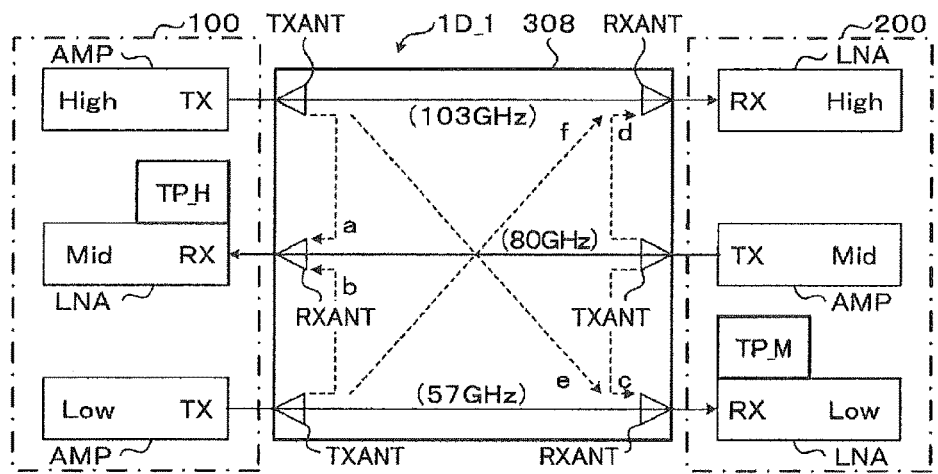
(B) SECOND EXAMPLE
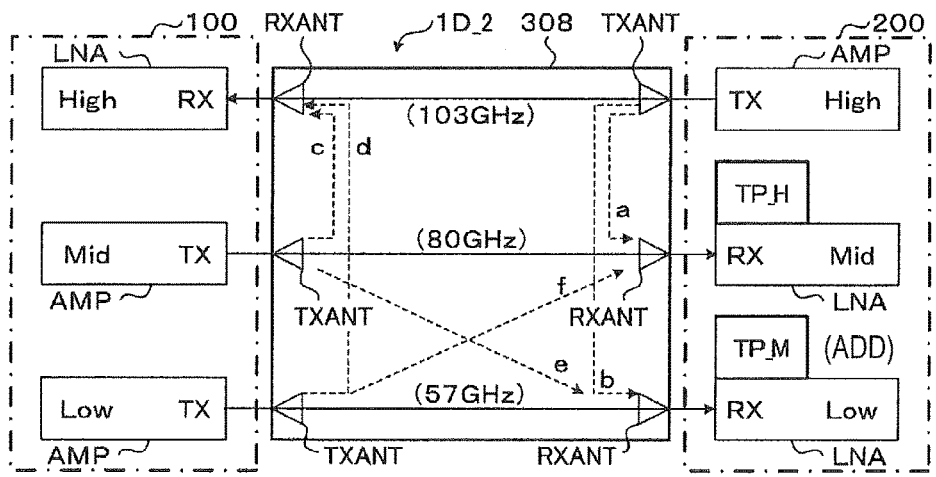
(C) THIRD EXAMPLE
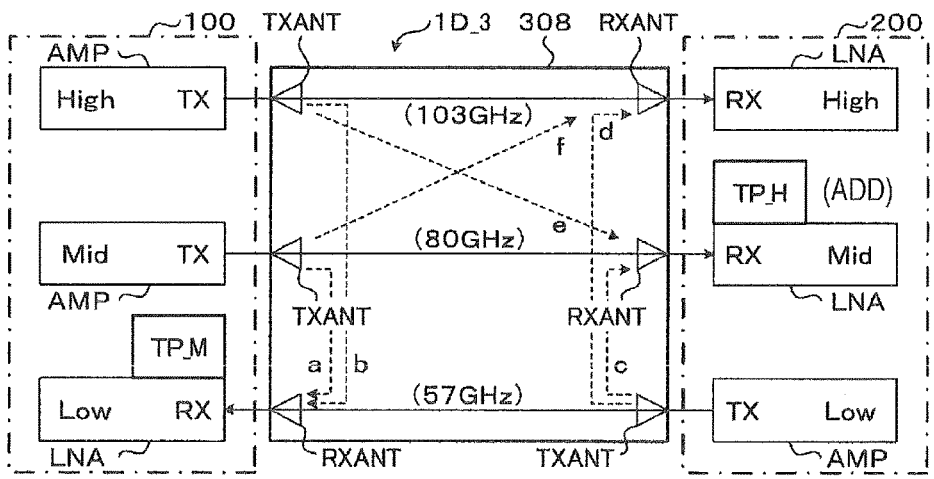

FIG. 20
< MODIFICATION OF EMBODIMENT 4 >
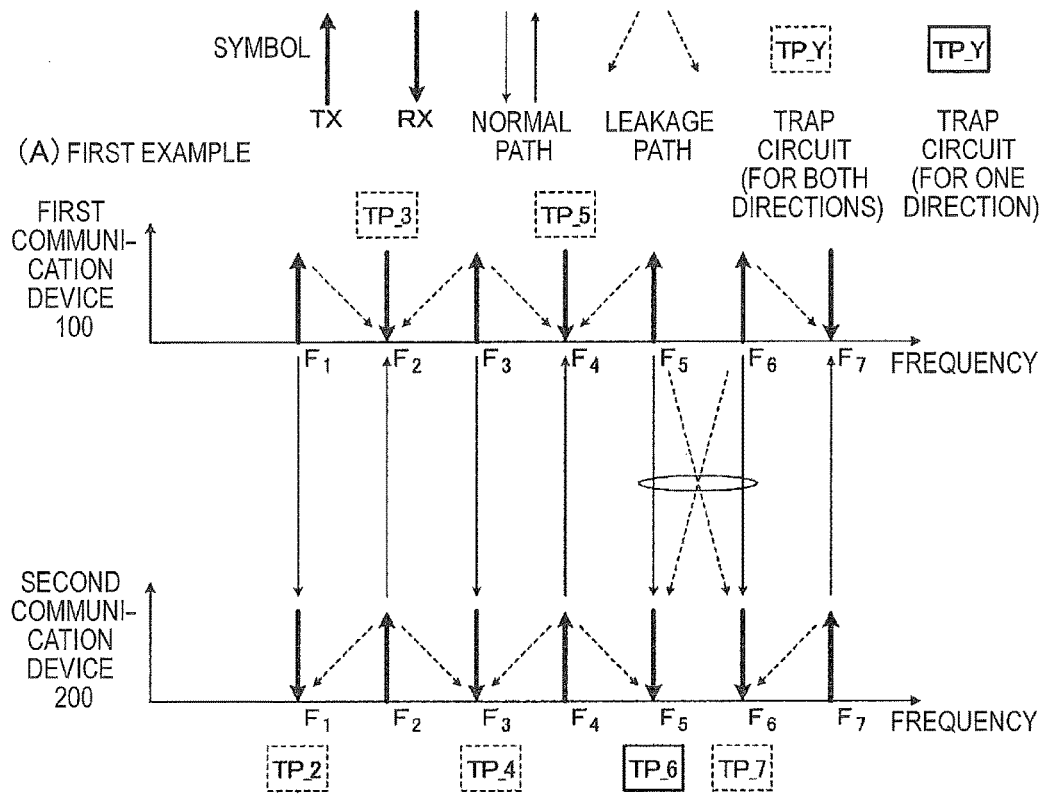
(A) FIRST EXAMPLE
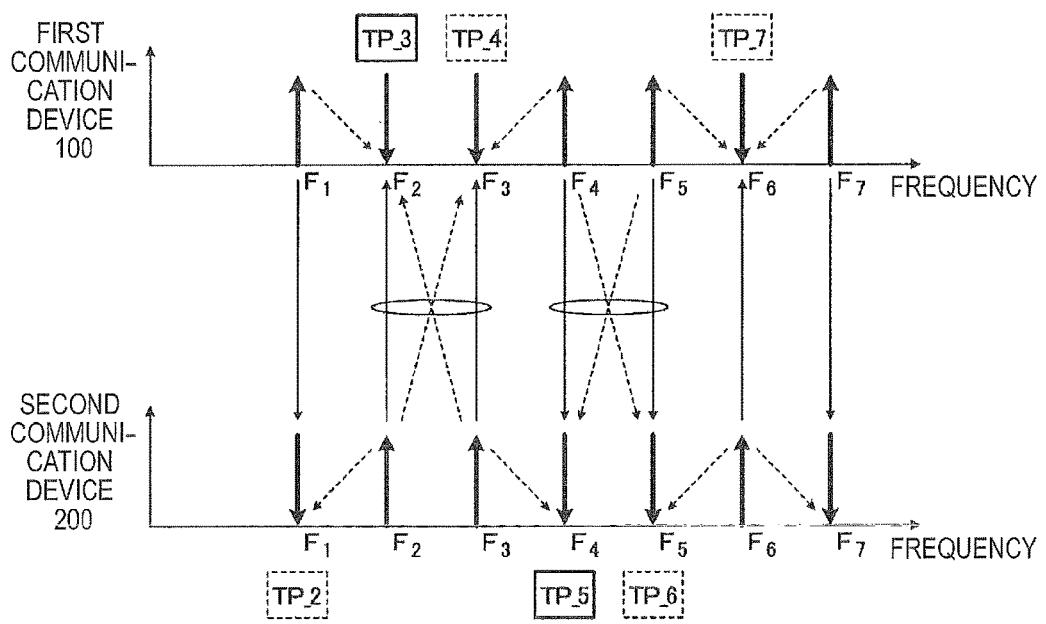
(B) SECOND EXAMPLE FIG. 21
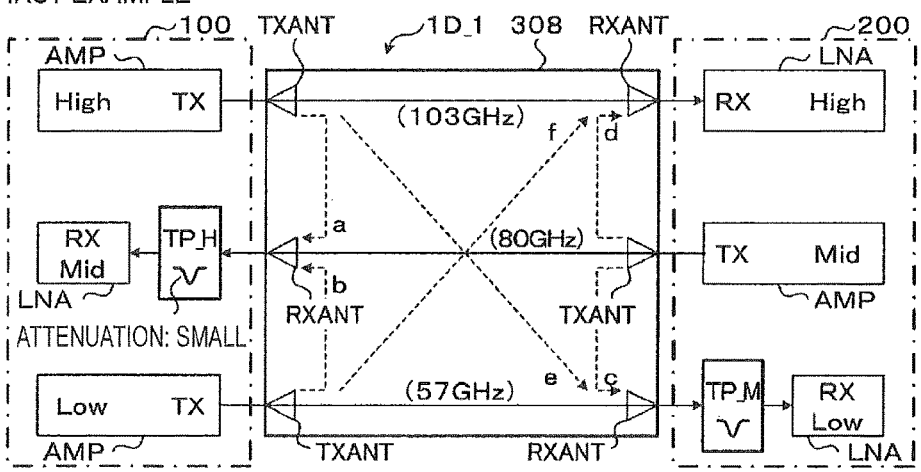
(A) FIRST EXAMPLE
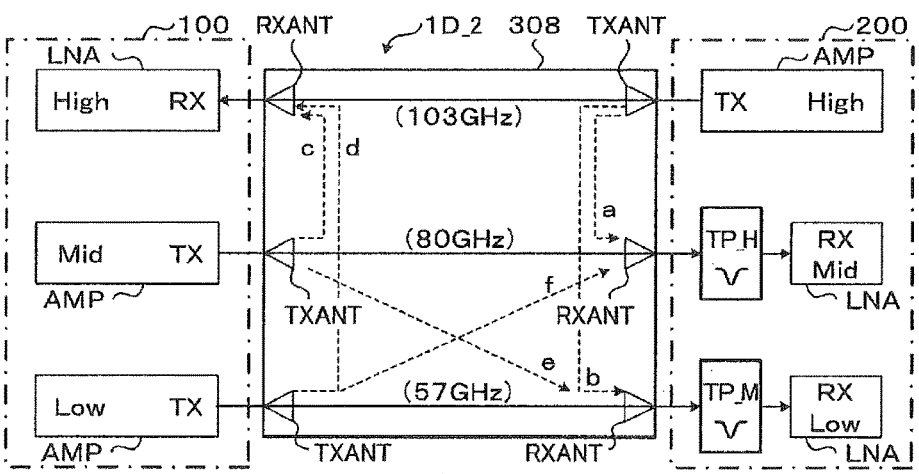
(B) SECOND EXAMPLE
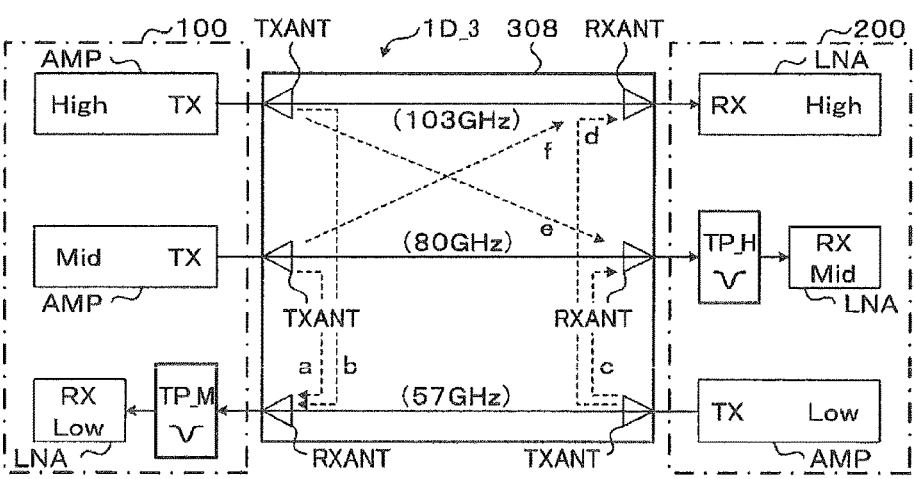
(C) THIRD EXAMPLE FIG. 22
<EMBODIMENT 5>
(A) FOURTH EXAMPLE
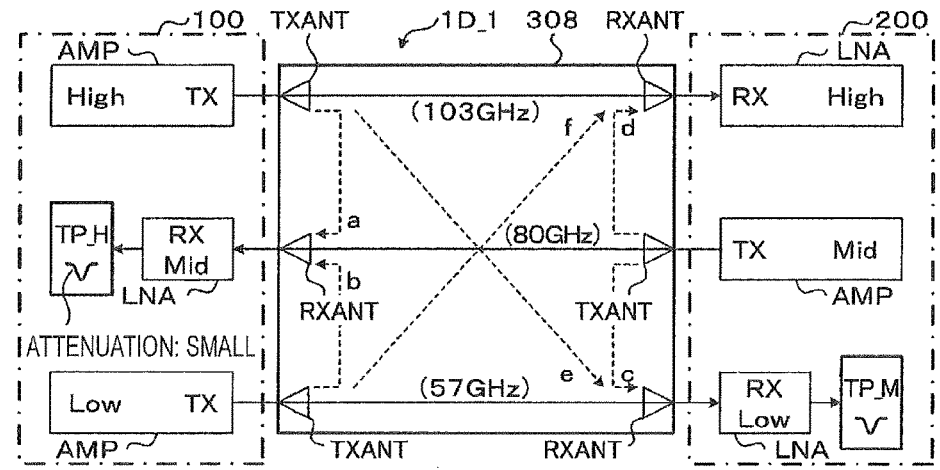
(B) FIFTH EXAMPLE
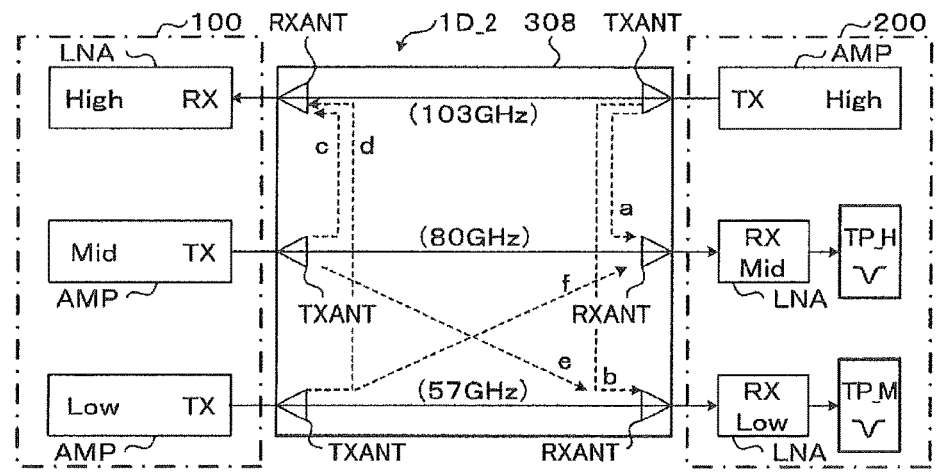
(C) SIXTH EXAMPLE
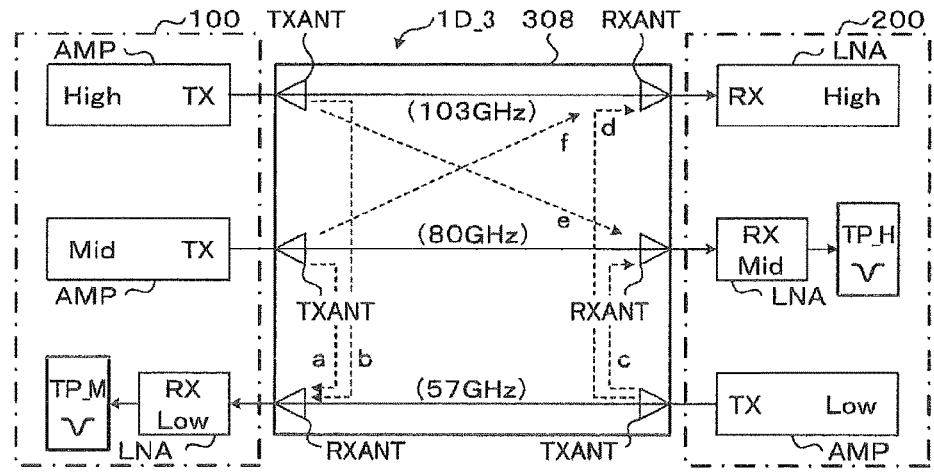

FIG. 24
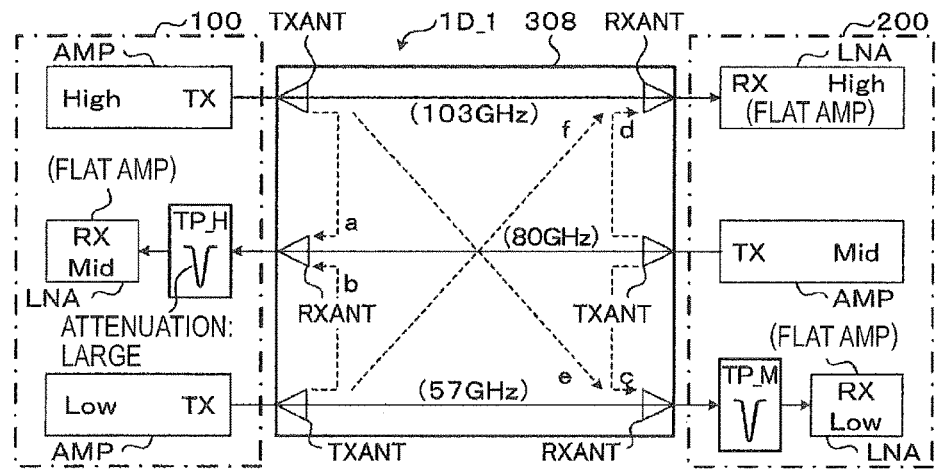
(A) FOURTH EXAMPLE  < EMBODIMENT 6 >
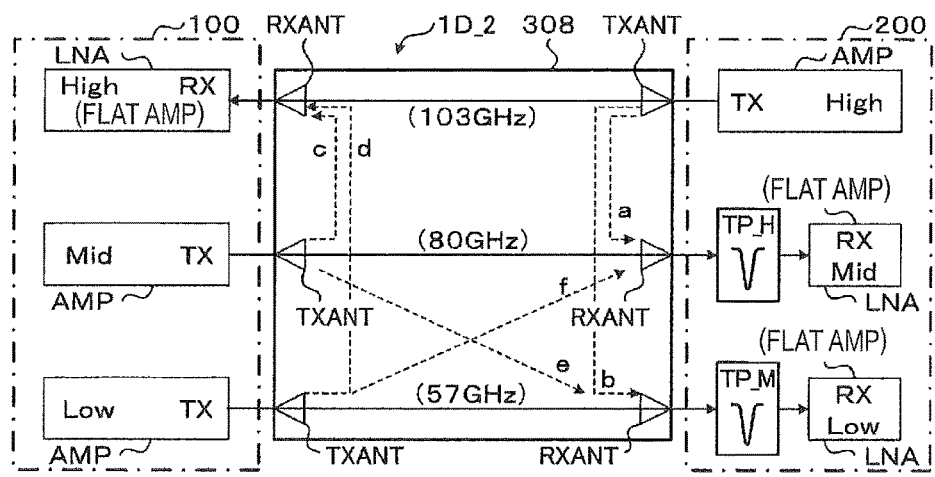
(B) FIFTH EXAMPLE
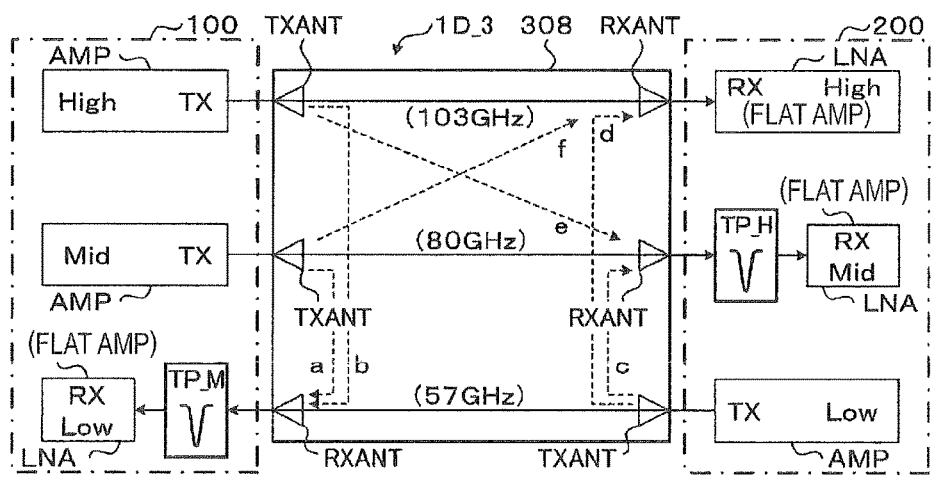
(C) SIXTH EXAMPLE

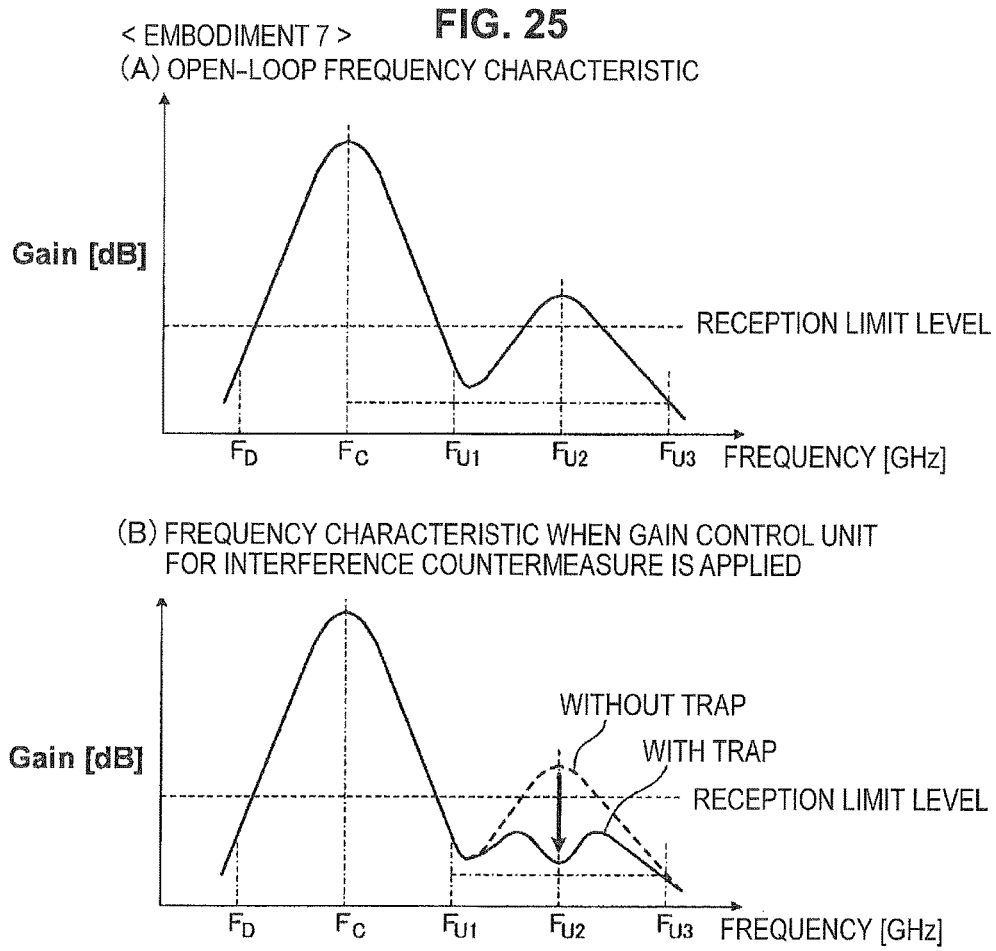
FIG. 25
< EMBODIMENT 7 >
(A) OPEN-LOOP FREQUENCY CHARACTERISTIC
(B) FREQUENCY CHARACTERISTIC WHEN GAIN CONTROL UNIT FOR INTERFERENCE COUNTERMEASURE IS APPLIED
FIG. 26
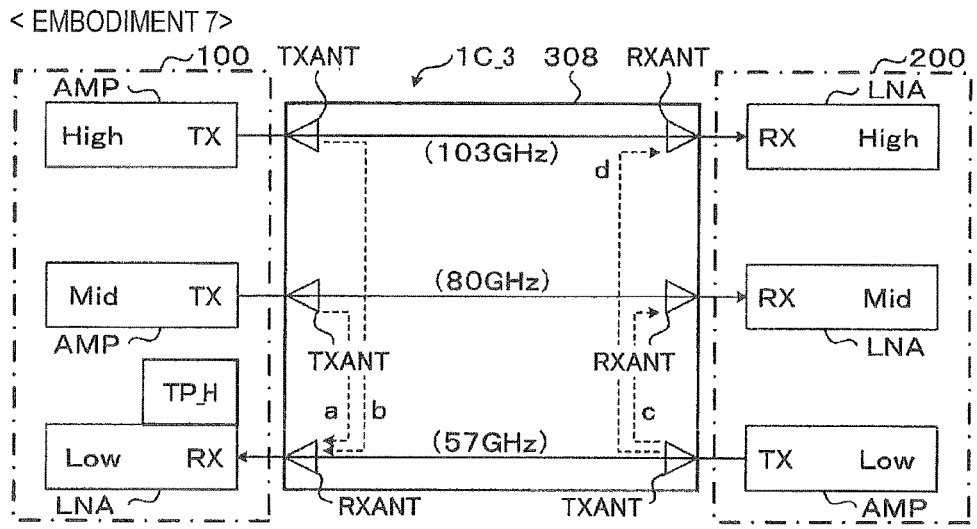

SIGNAL TRANSMISSION DEVICE, RECEIVING CIRCUIT, AND ELECTRONIC APPARATUS

TECHNICAL FIELD

The present invention relates to a signal transmission device, a receiving circuit, and an electronic apparatus, and more specifically, to technology for addressing mutual interference when multichannel transmission is performed.

BACKGROUND ART

Today, in signal transmission inside an electronic apparatus or between electronic apparatuses, technology capable of processing or transmitting a large amount of data at a high speed (for example, in real time) is necessary. In related art, signals have been typically transmitted through an electric wire. For example, low voltage differential signaling (LVDS) has been known as a method for implementing high speed signal transmission. However, due to recent new large amounts of transmission data at high speeds, problems such as an increase of power consumption, an increase of signal distortion effects due to reflection or the like, and an increase of unnecessary radiation occur. For example, LVDS has reached a limitation when signals such as an image signal (including an imaging signal) or a computer image are transmitted in the apparatus at a high speed (in real time).

In order to respond to a problem of high speed transmission data, there is a method in which the number of wires is increased and thus a transmission rate for a single signal line is decreased due to signal parallelization. However, this method causes an increased number of input and output terminals. As a result, for example, a complicated printed circuit board or cable wire or an increase of a semiconductor chip size is necessary. In addition, an electromagnetic interference problem occurs due to transmission of large amounts of high speed data through the wire.

Problems in both of the LVDS and the method of increasing the number of wires occur due to signal transmission through the electric wire. Thus, as a method of addressing the problem due to signal transmission through the electric wire, technology in which a plastic waveguide is used and signal transmission is performed using a millimeter-wave band is disclosed in, for example, "A 12.5+12.5 Gb/s Full-Duplex Plastic Waveguide Interconnect" (ISSCC 2011 conference presentations: refer to proceedings and presentation slides).

CITATION LIST

Non-Patent Literature

Non-Patent Literature 1: Satoshi Fukuda, et al., "A 12.5+12.5 Gb/s Full-Duplex Plastic Waveguide Interconnect", 2011 IEEE International Solid-State Circuits Conference ISSCC 2011/SESSION 8/ARCHITECTURES & CIRCUITS FOR NEXT GENERATION WIRELINE TRANSCEIVERS/8.5, Feb. 23, 2011, p. 150-152.

Non-Patent Literature 2: Satoshi Fukuda, et al., "A 12.5+12.5 Gb/s Full-Duplex Plastic Waveguide Interconnect", 2011 IEEE International Solid-State Circuits Conference ISSCC 2011/SESSION 8/February, 2011, presentation slides p. 1-29.

SUMMARY OF INVENTION

Technical Problem

Incidentally, when frequency division multiplexing (FDM) in which a frequency band is divided and communication is performed through one waveguide is applied, another channel (sometimes referred to as a channel, hereinafter also denoted as "CH") serves as an interfering wave and causes adverse effects on communication. In general, this is referred to as "mutual interference" or an "interference problem between channels." Typically, it is referred to as an "interference problem between adjacent channels" when two channels are adjacent to each other.

In order to address this problem, for example, a method in which a frequency between channels is separated to have a certain difference or higher is employed. However, as the frequency is separated (that is, as a frequency difference between channels becomes higher), a required frequency band as a whole increases. In this case, a wideband characteristic is necessary not only for a communication device or a communication semiconductor device (chip) but also for the waveguide.

Therefore, the invention has been made in view of the aforementioned problems and the invention provides technology capable of reducing an interference problem with another channel without employing a method of increasing a frequency difference between channels.

Solution to Problem

According to a first aspect of the present disclosure, a signal transmission device includes a reception processing unit for each channel, which enables multichannel transmission by dividing a frequency band, and the number of channels is equal to or greater than three in total. In addition, when full-duplex two-way communication is applied in any combination of two channels, a signal suppressing unit configured to suppress a signal component of a channel other than a self channel is provided in any reception processing unit. Each signal transmission device disclosed in dependent descriptions of the signal transmission device according to the first aspect of the present disclosure defines further advantageous and specific examples of the signal transmission device according to the first aspect of the present disclosure. For example, the reception processing unit may include an amplifier configured to have frequency selectivity for the self channel and amplify a received signal, and the signal suppressing unit may include a gain suppressing unit provided in the amplifier. In addition, in any combination of two channels, when the full-duplex two-way communication is applied, the gain suppressing unit is configured to suppress a gain of a channel, other than the self channel, having an insufficient attenuation degree in a gain frequency characteristic. Furthermore, in a combination of two channels which are adjacent to each other, the gain suppressing unit is configured to suppress a gain of either lower-side or upper-side adjacent channel that has an inefficient attenuation degree in the gain frequency characteristic.

According to a second aspect of the present disclosure, signal transmission device includes a reception processing unit for each channel, which enables multichannel transmission by dividing a frequency band, and the number of channels is equal to or greater than two in total. In addition, in any combination of two channels, when simplex two-way communication is applied, the signal suppressing unit configured to suppress a signal component of a channel other than the self channel is provided in any reception processing unit.

According to a third aspect of the present disclosure, a receiving circuit includes a signal suppressing circuit configured to suppress a signal component of a channel other than the self channel when the number of channels is equal to or greater than three in total and the full-duplex two-way communication is applied in any combination of two channels.

According to a fourth aspect of the present disclosure, a receiving circuit includes a signal suppressing circuit configured to suppress a signal component of a channel other than the self channel when the simplex two-way communication is applied in any combination of two channels.

According to a fifth aspect of the present disclosure, an electronic apparatus includes a reception processing unit for each channel, which enables multichannel transmission by dividing a frequency band, and the number of channels is equal to or greater than three in total. In addition, in any combination of two channels, when the full-duplex two-way communication is applied, a signal suppressing unit configured to suppress a signal component of a channel other than the self channel is provided in any reception processing unit.

According to a sixth aspect of the present disclosure, an electronic apparatus includes a reception processing unit for each channel, which enables multichannel transmission by dividing a frequency band, and the number of channels is equal to or greater than two in total. In addition, in any combination of two channels, when the simplex two-way communication is applied, a signal suppressing unit configured to suppress a signal component of a channel other than the self channel is provided in any reception processing unit.

Various technologies and methods (however, excluding specific matters of the full-duplex two-way communication in the receiving circuit according to the fourth aspect and the electronic apparatus according to the sixth aspect) to be applied to each signal transmission device described in dependent descriptions of the signal transmission device according to the first aspect of the present disclosure may be similarly applied to the signal transmission devices according to the second aspect of the present disclosure, the receiving circuit according to the third and fourth aspects of the present disclosure and the electronic apparatuses according to the fifth and sixth aspects of the present disclosure. Configurations in which various technologies and methods are applied define further advantageous and specific examples of the signal transmission device according to the second aspect of the present disclosure, the receiving circuits according to the third and fourth aspects of the present disclosure, and the electronic apparatuses according to the fifth and sixth aspects of the present disclosure. For example, the reception processing unit may include an amplifier configured to have frequency selectivity for the self channel and amplify a received signal, and the signal suppressing unit may include a gain suppressing unit provided in amplifier. In addition, in any combination of two channels, when the simplex two-way communication is applied, the gain suppressing unit is configured to suppress a gain of a channel other than the self channel having an insufficient attenuation degree in the gain frequency characteristic. Furthermore, in a combination of two channels which are adjacent to each other, the gain suppressing unit may be configured to suppress a gain of either lower-side or upper-side adjacent channel that has an insufficient attenuation degree in the gain frequency characteristic.

In the technology disclosed in the specification, regardless of the number of channels when multichannel transmission is performed, and regardless of whether the full-duplex two-way communication or the simplex two-way communication is applied, in any reception processing unit, the signal suppressing unit configured to suppress a signal component of a channel other than the self channel is provided in the amplifier or a pre-stage or a post-stage of the amplifier circuit. Preferably, the signal suppressing unit includes the gain suppressing unit provided in the amplifier. In any combination of two channels, the gain suppressing unit configured to suppress a gain of a channel other than the self channel having an insufficient attenuation degree in the gain frequency characteristic is provided in the amplifier or the amplifier circuit. For example, in a combination of two channels which are adjacent to each other, the gain suppressing unit configured to suppress a gain of either lower-side or upper-side adjacent channel that has an insufficient attenuation degree in the gain frequency characteristic is provided in the amplifier or the amplifier circuit. In addition, when the full-duplex two-way communication is applied, the gain suppressing unit may be applied to the amplifier or the amplifier circuit according to the above condition only when the full-duplex two-way communication is applied (in addition, channels are preferably adjacent to each other) according to the above condition.

Incidentally, in the signal transmission device according to the first aspect of the present disclosure, the receiving circuit according to the third aspect of the present disclosure, and the electronic apparatus according to the fifth aspect of the present disclosure, the number of channels is equal to or greater than three in total. When the simplex two-way communication is applied, the signal suppressing unit or the gain suppressing unit may be provided according to the above condition only when the simplex two-way communication is applied (in addition, channels are preferably adjacent to each other). Incidentally, in the signal transmission device according to the second aspect of the present disclosure, the receiving circuit according to the fourth aspect of the present disclosure, and the electronic apparatus according to the sixth aspect of the present disclosure, the number of channels is equal to or greater than two in total. When both of the full-duplex two-way communication and the simplex two-way communication are applied, the signal suppressing unit or the gain suppressing unit may be provided according to the above condition only when both of the full-duplex two-way communication and the simplex two-way communication are applied (in addition, channels are preferably adjacent to each other).

That is, in the technology disclosed in the specification, the signal suppressing unit configured to suppress a signal component of a channel other than the self channel is provided in any reception processing unit (for example, inside the amplifier or the amplifier circuit, or a pre-stage or a post-stage thereof). The gain suppressing unit is provided in "any" reception processing unit rather than in all of the plurality of reception processing units, and thus mutual interference is suppressed. Accordingly, a simpler configuration than when the signal suppressing unit configured to suppress a signal component of another channel is provided in all of the plurality of reception processing units is possible. When the signal suppressing unit is used, it is possible to suppress an interfering wave influence. Therefore, without setting a frequency interval with another channel more than necessary, it is possible to reduce the interference problem with another channel and effectively use the frequency.

In the exemplary aspects of the technology disclosed in the specification, the gain suppressing unit configured to suppress a gain of "either lower-side or upper-side adjacent channel that has an insufficient attenuation degree in the gain frequency characteristic" is provided in the reception processing unit. For example, the gain suppressing unit is provided inside the amplifier or the amplifier circuit, or a pre-stage or a post-stage thereof. More preferably, the gain suppressing unit is provided inside the amplifier or the amplifier circuit. In the exemplary aspects of the technology disclosed in the specification, when the gain suppressing unit is not provided (hereinafter referred to as an "open-loop"), it is assumed that the gain frequency characteristic of the amplifier or the amplifier circuit is symmetrical in a lower side (low frequency side) and an upper side (high frequency side) with respect to a desired channel (self channel). When the gain frequency characteristics is "asymmetrical," a gain attenuation degree is sufficient in either the lower side (low frequency side) or the upper side (high frequency side), and a gain attenuation degree is insufficient in the other side. Typically, in a combination of two channels which are adjacent to each other, the gain attenuation degree is sufficient in either the upper-side or lower-side adjacent channel, whereas the gain attenuation degree is insufficient in the other side. In this case, as it is, there is a problem of interference (particularly, it is also referred to as "adjacent interference" when channels are adjacent to each other) from a channel having an insufficient gain attenuation degree.

Here, in exemplary aspects of the technology disclosed in the specification, an asymmetric open-loop gain frequency characteristic of the amplifier or the amplifier circuit is used, and thus the gain suppressing unit is provided in only either (specifically, a channel having an insufficient attenuation degree in the gain frequency characteristic) the lower side (low frequency side) channel or the upper side (high frequency side) channel. As a typical example of mutually adjacent channels, the gain suppressing unit is provided in either (a channel having an insufficient attenuation degree in the gain frequency characteristic) the upper-side or lower-side adjacent channel. In summary, in the exemplary aspects of the technology disclosed in the specification, when the open-loop gain frequency characteristic of the amplifier or the amplifier circuit is asymmetrical in the lower or upper side of the desired channel, the gain suppressing unit is provided in only a side having an insufficient attenuation degree against interference with another channel, and thus mutual interference is suppressed. Accordingly, a simpler configuration than when the gain suppressing unit is provided in both (typically, both of the upper-side and lower-side adjacent channels) of the lower side (low frequency side) channel and the upper side (high frequency side) channel is possible. When the gain suppressing unit is provided, since it is possible to suppress the interfering wave influence without setting a frequency interval with another channel (typically, an adjacent channel) more than necessary, it is possible to reduce the interference problem from another channel and effectively use the frequency.

Advantageous Effects of Invention

In the first and second signal transmission devices of the present disclosure, the receiving circuits according to the third and fourth aspects, and the electronic apparatuses according to the fifth and sixth aspects of the present disclosure, it is possible to reduce the interference problem with another channel without employing a method of increasing a frequency difference between channels in a simple configuration.

BRIEF DESCRIPTION OF DRAWINGS

FIG. 3B is a functional block diagram illustrating the signal transmission device.

FIGS. 4(A) to 4(C) are diagrams illustrating a cause of mutual interference generation.

FIGS. 5(A) and 5(B) are diagrams illustrating a principle of countermeasures against mutual interference according to an embodiment (a first example).

FIGS. 6(A) to 6(D) are diagrams illustrating a principle of countermeasures against mutual interference according to an embodiment (a second example).

FIGS. 7(A) and 7(B) are diagrams illustrating a first example of a low-noise amplifier having a trap circuit.

FIGS. 10(A) and 10(B) are diagrams illustrating a low-noise amplifier having no trap circuit.

FIG. 12(A) to FIG. 12(C) are diagrams illustrating a specific technique for addressing mutual interference according to Embodiment 1.

FIG. 14 is a diagram illustrating a specific technique for addressing mutual interference according to Embodiment 2.

FIG. 15 is a diagram illustrating a modification of Embodiment 2.

FIGS. 16(A) to 16(C) are diagrams illustrating an example of a gain characteristic of a low-noise amplifier used in Embodiment 3 in which the full-duplex two-way communication and the simplex two-way communication are combined.

FIGS. 17(A) to 17(C) are diagrams illustrating transmission and reception systems according to Embodiment 3.

FIGS. 19(A) to 19(C) are diagrams illustrating transmission and reception systems according to Embodiment 4 in which the full-duplex two-way communication and the simplex two-way communication are combined.

FIGS. 20(A) and 20(B) are diagrams illustrating a modification of Embodiment 4.

FIGS. 21(A) to 21(C) are diagrams illustrating transmission and reception systems according to Embodiment 5 (first to third examples).

FIGS. 22(A) to 22(C) are diagrams illustrating transmission and reception systems according to Embodiment 5 (fourth to sixth examples).

FIGS. 24(A) to 24(C) are diagrams illustrating transmission and reception systems according to Embodiment 6 (fourth to sixth examples).

FIGS. 25(A) to 25(B) are diagrams illustrating an example of a gain characteristic of a low-noise amplifier used in Embodiment 7.

FIG. 26 is a diagram illustrating transmission and reception systems according to Embodiment 7.

DESCRIPTION OF EMBODIMENTS

Figure 1:
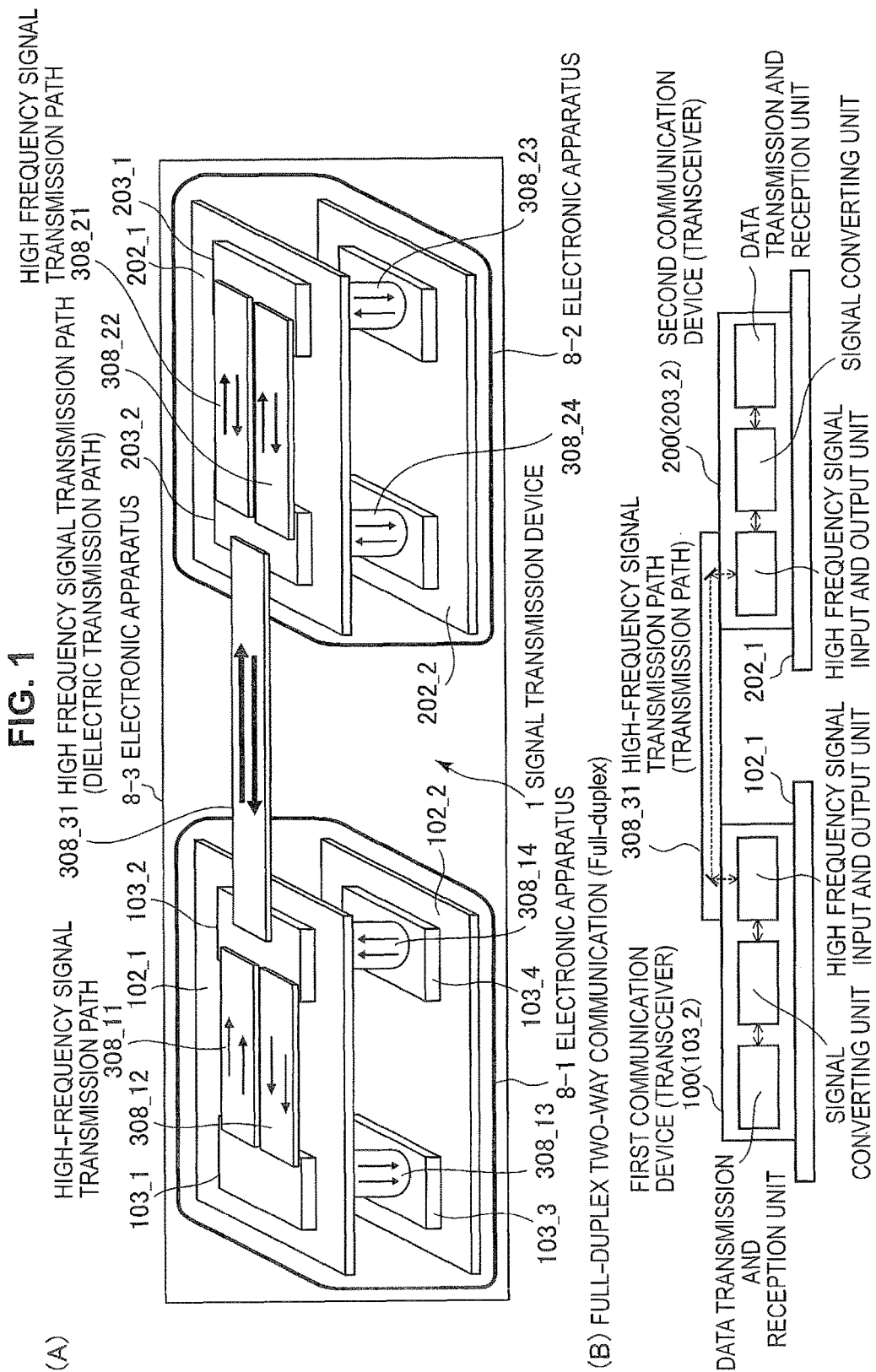
FIGS. 1(A) and 1(B) are diagrams illustrating an overview of a signal transmission device and an electronic apparatus.

Hereinafter, embodiments of the technology disclosed in the specification will be described in detail with reference to the accompanying drawings. In order to distinguish each functional component by type, letters, "_n" (n is a number), or a combination thereof are suffixed to reference numerals. When a description is made without specific distinction, these suffixes are omitted. This is similarly applied to the drawings.

Description will be given in the following order.
1. Overview
2. Transmission processing system (fundamental): an apparatus configuration and details of functional block configuration examples
3. Mutual interference and countermeasure principles thereof: generation cause and countermeasure method
4. Examples of an amplifier configuration: first to fourth examples
5. Detailed applications
Embodiment 1: a first example of a countermeasure method, 2CH and full-duplex two-way communication
Embodiment 2: a first example of a countermeasure method, 2CH and simplex two-way communication
Embodiment 3: a first example of a countermeasure method, 3CH or more and a combination of full-duplex two-way and simplex two-way communication
(Without consideration of a leakage path of a simplex two-way communication system)
Embodiment 4: a first example of a countermeasure method, 3CH or more, and a combination of full-duplex two-way and simplex two-way communication
(In consideration of a leakage path of a simplex two-way communication system)
Embodiment 5: a second example of a countermeasure method and a countermeasure method not in an amplifier circuit.
(Using an asymmetric open-loop gain frequency characteristic of an amplifier circuit)
Embodiment 6: a third example of a countermeasure method
(Not using an asymmetric open-loop gain frequency characteristic of an amplifier circuit)
Embodiment 7: an interference countermeasure of a channel other than an adjacent channel
 <Overview>

First, a fundamental configuration will be described below. In a signal transmission device or an electronic apparatus disclosed in the specification, a receiving circuit includes a plurality of reception processing units configured to receive a transmission signal. A plurality of transmission processing units are provided to correspond to the plurality of reception processing units. For example, in order to allow multichannel transmission through frequency band dividing, a reception processing unit is provided for each channel. A transmission processing unit is provided for each channel so as to correspond to the reception processing unit provided for each channel. Any reception processing unit includes a signal suppressing unit configured to suppress a signal component of a channel other than the self channel. It is possible to reduce the interference problem with another channel in a simple configuration compared to when all reception processing units have the signal suppressing unit.

As an exemplary example, the reception processing unit includes an amplifier (amplifier circuit) configured to have frequency selectivity for the self channel and amplify a received signal. An open-loop gain frequency characteristic of the amplifier is asymmetrical between a lower side (low frequency side) and an upper side (high frequency side) with respect to a desired channel (self channel). In this case, in an exemplary embodiment of the signal transmission device or the electronic apparatus disclosed in the specification, this asymmetric characteristic is used, and in any of the plurality of reception processing units, a gain suppressing unit configured to suppress a gain of an interfering wave is provided in the amplifier (amplifier circuit). That is, the signal suppressing unit includes the gain suppressing unit provided in the amplifier. When there is an influence from a channel (not limited to channels adjacent on either side but including other more distant channels: collectively called an "interference channel") other than the self channel, the influence of the interference channel is suppressed by the gain suppressing unit. Typically, the influence from the adjacent channel is suppressed. For example, in a combination of two channels which are adjacent to each other, the gain suppressing unit configured to suppress a gain of either lower-side or upper-side adjacent channel which has an insufficient attenuation degree in a gain frequency characteristic is provided in the amplifier. That is, when the gain suppressing unit is not provided, the asymmetric open-loop gain frequency characteristic of the amplifier is actively used, and thus the gain suppressing unit, such as a trap circuit, is provided for an adjacent channel having an insufficient gain attenuation degree.

Here, there are two asymmetrical states of the open-loop gain frequency characteristic of the amplifier. In the first state, a low frequency side has more insufficient gain attenuation than a high frequency side with respect to the self channel. In the second state, a high frequency side has more insufficient gain attenuation than a low frequency side with respect to the self channel. In the first state, wavelength selectivity for a lower-side adjacent channel decreases. In the second state, wavelength selectivity for an upper-side adjacent channel decreases. In two channels to be combined, an open-loop gain frequency characteristic for one channel amplifier and an open-loop gain frequency characteristic for the other channel amplifier may have an equal asymmetric state and a mixed asymmetric state. That is, there are four combination cases in total. In the first case, the open-loop gain frequency characteristic for one channel amplifier is in the first state and the open-loop gain frequency characteristic for the other channel amplifier is also in the first state. In the second case, the open-loop gain frequency characteristic for one channel amplifier is in the second state and the open-loop gain frequency characteristic for the other channel amplifier is also in the second state. In the third case, the open-loop gain frequency characteristic for one channel amplifier is in the second state and the open-loop gain frequency characteristic for the other channel amplifier is in the first state. In the fourth case, the open-loop gain frequency characteristic for one channel amplifier is in the first state and the open-loop gain frequency characteristic for the other channel amplifier is in the second state. Accordingly, in the signal transmission device, the receiving circuit, or the electronic apparatus according to the embodiment, when the gain suppressing unit is provided in the amplifier, the gain suppressing unit is provided in a required channel amplifier such that "a gain of a channel having an insufficient attenuation degree in the gain frequency characteristic is suppressed" for each of the above four combinations.

For example, when the number of channels is two in total and the two channels are adjacent to each other, one channel has a lower carrier frequency than the other channel. For convenience of description, one channel (low frequency side) having a low carrier frequency is referred to as a low frequency channel and the other channel (high frequency side) having a high carrier frequency is referred to as a high frequency channel. In the first case, since open-loop gain frequency characteristics of both channel amplifiers are in the first state in which a low frequency side has more insufficient gain attenuation than a high frequency side with respect to the self channel, the gain suppressing unit may be provided only in a high frequency channel amplifier. The gain suppressing unit may suppress a gain of a low frequency channel serving as a lower-side adjacent channel. It is unnecessary to provide the gain suppressing unit in a low frequency channel amplifier. In the second case, since open-loop gain frequency characteristics of both channel amplifiers are in the second state in which a high frequency side has more insufficient gain attenuation than a low frequency side with respect to the self channel, the gain suppressing unit may be provided only in the low frequency channel amplifier. The gain suppressing unit may suppress a gain of a high frequency channel serving as an upper-side adjacent channel. It is unnecessary to provide the gain suppressing unit in the high frequency channel amplifier. In this way, in the first or second case in which open-loop gain frequency characteristics of both channel amplifiers have an equal asymmetric state, the gain suppressing unit configured to suppress a gain of a channel may be provided only in either channel amplifier.

In the third case, the open-loop gain frequency characteristic of the low frequency channel amplifier is in the second state in which a high frequency side has more insufficient gain attenuation than a low frequency side with respect to the self channel, and the open-loop gain frequency characteristic of the high frequency channel amplifier is in the first state in which a low frequency side has more insufficient gain attenuation than a high frequency side with respect to the self channel. Therefore, a gain suppressing unit configured to suppress a gain of an upper-side adjacent channel is provided in the low frequency channel amplifier, and a gain suppressing unit configured to suppress a gain of a lower-side adjacent channel is provided in the high frequency channel amplifier. In this way, in the third case, since a gain attenuation degree for the other channel is insufficient (an attenuation degree is insufficient) in both channels, it is necessary to provide the gain suppressing unit configured to suppress a gain of the other channel in both channels.

In the fourth case, the open-loop gain frequency characteristic of the low frequency channel amplifier is in first state in which a low frequency side has more insufficient gain attenuation than a high frequency side with respect to the self channel, and the open-loop gain frequency characteristic of the high frequency channel amplifier is in second state in which a high frequency side has more insufficient gain attenuation than a low frequency side with respect to the self channel. Even when the gain suppressing unit is not provided in the low frequency channel amplifier, a gain attenuation degree for the high frequency channel serving as an upper-side adjacent channel is sufficient. Even when the gain suppressing unit is not provided in the high frequency channel amplifier, a gain attenuation degree for the low frequency channel serving as a lower-side adjacent channel is sufficient. In this way, in the fourth case, since a gain attenuation degree for the other channel is sufficient (an attenuation degree is sufficient) in both channels, it is unnecessary to provide the gain suppressing unit configured to suppress a gain of the other channel in both channels.

When the number of channels is equal to or greater than three in total, further combinations of channels are included. When channels are adjacent to each other in each combination including two channels, the combination is determined as one of the aforementioned four cases. Based on a determination result, it may be determined whether the gain suppressing unit is necessary, and when the gain suppressing unit is provided, it may be determined that a gain of either channel is suppressed.

In the signal transmission device, the receiving circuit, or the electronic apparatus disclosed in the specification, when multichannel transmission is performed using full-duplex two-way communication, the gain suppressing unit is provided in the amplifier according to the above method only when the full-duplex two-way communication is applied and channels are adjacent to each other.

Alternatively, in the signal transmission device, the receiving circuit, or the electronic apparatus disclosed in the specification, when multichannel transmission is performed using simplex two-way communication, the gain suppressing unit is provided in the amplifier according to the above method only when the simplex two-way communication is applied and channels are adjacent to each other.

Alternatively, in the signal transmission device, the receiving circuit, or the electronic apparatus disclosed in the specification, when both of the full-duplex two-way communication and the simplex two-way communication are applied, preferably, the above methods for the full-duplex two-way communication and the simplex two-way communication are combined. In addition, when both full-duplex two-way communication and simplex two-way communication are applied, it is unnecessary to combine the above method for simplex two-way communication. The reason is as follows.

First, when the full-duplex two-way communication is applied, in either or both of one communication device (first communication device) side and the other communication device (second communication device) side, a leakage path may be formed such that a high frequency signal leaks almost directly from a self transmission processing unit to a reception processing unit. Energy thereof is greater than that in a leakage path in which energy leaks into a reception processing unit of the other side communication device through a waveguide. This is based on a difference of whether or not there is an influence from transmission loss of the waveguide interposed between the transmission processing unit and the reception processing unit. Therefore, when the full-duplex two-way communication is applied, in either or both of one communication device (first communication device) side and the other communication device (second communication device) side, when a leakage path in which a high frequency signal leaks almost directly from the self transmission processing unit to the reception processing unit is formed in a combination of two channels (typically, in a combination of adjacent channels), it is preferable to apply the above method for full-duplex two-way communication.

On the other hand, when the simplex two-way communication is applied, a high frequency signal is transmitted from the transmission processing unit of one communication device to the reception processing unit of the other communication device through the waveguide. In this case, a leakage path in which a high frequency signal leaks not only into a reception processing unit for the self channel but also into a reception processing unit for another may be formed. However, since transmission is performed through the waveguide to the other communication device, received energy is less than energy in a leakage path from the self transmission processing unit to the reception processing unit, which is formed when the full-duplex two-way communication is applied. This is because reception-side energy decreases due to transmission loss of the waveguide that couples one communication device and the other communication device. Therefore, in some cases, it is unnecessary to apply the method for simplex two-way communication.

In the signal transmission device, the receiving circuit, or the electronic apparatus disclosed in the specification, providing the gain suppressing unit in the amplifier may be applicable to a case of two channels, in principle, regardless of whether the full-duplex two-way communication or the simplex two-way communication is applied. A minimum value of the number of channels is "two" in total.

For example, the number of channels is equal to or greater than three in total and the simplex two-way communication is not applied but the full-duplex two-way communication is applied. In this case, in any combination of two channels, when the full-duplex two-way communication is applied, the method for full-duplex two-way communication is applied. Typically, in any combination of two channels, when the channels are adjacent to each other and the full-duplex two-way communication is applied, the method for full-duplex two-way communication is applied.

When both of the full-duplex two-way communication and the simplex two-way communication are applied, the methods for full-duplex two-way communication and simplex two-way communication are combined. When the full-duplex two-way communication and the simplex two-way communication are combined, a minimum value of the number of channels is "three" in total. In this case, in any combination of two channels, when the full-duplex two-way communication is applied, the method for full-duplex two-way communication is applied. In any combination of two channels, when the simplex two-way communication is applied, the method for simplex two-way communication is applied. Typically, in any combination of two channels, when the channels are adjacent to each other and the full-duplex two-way communication is applied, the method for full-duplex two-way communication is applied. In any combination of two channels, when the channels are adjacent to each other and the simplex two-way communication is applied, the method for simplex two-way communication is applied.

In many cases, when the gain suppressing unit is not provided, an open-loop gain frequency characteristic of the amplifier is asymmetrical such that a high frequency side has more insufficient gain attenuation than a low frequency side with respect to the self channel. Two channels to be combined belong to the second case. Therefore, in an exemplary embodiment of the signal transmission device, the receiving circuit, or the electronic apparatus disclosed in the specification, this asymmetrical feature is used and thus the amplifier may include the gain suppressing unit only for an upper-side adjacent channel.

For example, when an asymmetrical characteristic is shown such that a high frequency side has more insufficient gain attenuation than a low frequency side with respect to the self channel and the number of channels is three in total, a carrier frequency of a second channel is set higher than that of a first channel. When a carrier frequency of a third channel is set higher than that of the second channel, the following three aspects may be applicable to the full-duplex two-way communication. When multichannel transmission is performed between first and second communication devices, which are coupled through the waveguide, the three aspects are determined by disposing each of first, second, and third channel transmission processing units, and first, second, and third channel reception processing units in either the first or second communication device.

For example, in the first aspect, the first communication device includes the first channel transmission processing unit, the second channel reception processing unit, and the third channel transmission processing unit, and the second communication device includes the first channel reception processing unit, the second channel transmission processing unit, and the third channel reception processing unit. In this case, the full-duplex two-way communication may be considered to be applied in a combination of second and first channels, and a combination of second and third channels. In the case, a leakage path from the second channel transmission processing unit to the first channel reception processing unit in the second communication device side and a leakage path from the third channel transmission processing unit to the second channel reception processing unit in the first communication device side may cause the interference problem between adjacent channels. As a countermeasure thereof, in the second communication device, the gain suppressing unit configured to suppress a gain of the second channel is provided in the amplifier of the first channel reception processing unit, and in the first communication device, the gain suppressing unit configured to suppress a gain of the third channel is provided in the amplifier of the second channel reception processing unit.

In the second aspect, the first communication device includes the first channel transmission processing unit, the second channel transmission processing unit, and the third channel reception processing unit, and the second communication device includes the first channel reception processing unit, the second channel reception processing unit, and the third channel transmission processing unit. In this case, the full-duplex two-way communication may be considered to be applied in a combination of third and first channels, and a combination of third and second channels. In this case, in the second communication device side, a leakage path from the third channel transmission processing unit to the second channel reception processing unit may cause the interference problem between adjacent channels. As a countermeasure thereof, in the second communication device, the gain suppressing unit configured to suppress a gain of the third channel is provided in the amplifier of the second channel reception processing unit.

In the third aspect, the first communication device includes the first channel transmission processing unit, the second channel transmission processing unit, and the third channel reception processing unit, and the second communication device includes the first channel reception processing unit, the second channel reception processing unit, and the third channel transmission processing unit. In this case, the full-duplex two-way communication may be considered to be applied in a combination of first and second channels and a combination of first and third channels. In this case, in the first communication device side, a leakage path from the second channel transmission processing unit to the first channel reception processing unit may cause the interference problem between adjacent channels. As a countermeasure thereof, in the first communication device, the gain suppressing unit configured to suppress a gain of the second channel is provided in the amplifier of the first channel reception processing unit.

In addition, the simplex two-way communication may be further applied to these three aspects. In this case, the simplex two-way communication may be applied in the combination of first and third channels. According to the simplex two-way communication, a leakage path is formed between the first and second communication devices when transmission and reception are performed through the waveguide. Here, when the simplex two-way communication is combined with the first aspect, a leakage path from the third channel transmission processing unit in the first communication device side to the first channel reception processing unit in the second communication device side is formed, and a leakage path from the first channel transmission processing unit in the first communication device to the third channel reception processing unit in the second communication device side is formed. Since the channels forming the leakage path are not adjacent to each other, the interference problem between adjacent channels may not occur. Accordingly, when the simplex two-way communication is combined, it is unnecessary to further provide the gain suppressing unit configured to suppress a gain of an adjacent channel in either amplifier. That is, even when the simplex two-way communication is combined, the first aspect in which the full-duplex two-way communication is applied may be applied without change.

On the other hand, in the second aspect, when the simplex two-way communication is combined, the simplex two-way communication may be applied in the combination of first and second channels. Accordingly, a leakage path from the second channel transmission processing unit in the first communication device side to the first channel reception processing unit in the second communication device side is formed, and a leakage path from the first channel transmission processing unit in the first communication device side to the second channel reception processing unit in the second communication device side is formed. Since the channels forming the leakage path are adjacent to each other, the interference problem between adjacent channels may occur. As a countermeasure thereof, when the simplex two-way communication is combined, in the second communication device, the gain suppressing unit configured to suppress a gain of the second channel is provided in the amplifier of the first channel reception processing unit (add). In addition, as described above, in the second aspect, in order to suppress the interference problem between adjacent channels occurring when the full-duplex two-way communication is applied, in the second communication device, the gain suppressing unit configured to suppress a gain of the third channel is provided in the amplifier of the second channel reception processing unit.

In addition, when the simplex two-way communication is combined with the third aspect, the simplex two-way communication may be applied in the combination of the second and third channels. Accordingly, a leakage path from the third channel transmission processing unit in the first communication device side to the second channel reception processing unit in the second communication device side is formed, and a leakage path from the second channel transmission processing unit in the first communication device side to the third channel reception processing unit in the second communication device side is formed. Since the channels forming the leakage path are adjacent to each other, the interference problem between adjacent channels may occur. As a countermeasure thereof, when the simplex two-way communication is combined, in the second communication device, the gain suppressing unit configured to suppress a gain of the third channel is provided (added) in the amplifier of the second channel reception processing unit. Incidentally, as described above, in the third aspect, in order to suppress the interference problem between adjacent channels occurring when the full-duplex two-way communication is applied, in the first communication device, the gain suppressing unit configured to suppress a gain of the second channel is provided in the amplifier of the first channel reception processing unit.

In the signal transmission device, the receiving circuit, or the electronic apparatus disclosed in the specification, the signal suppressing unit may suppress a signal component of a channel other than the self channel, and the gain suppressing unit may suppress a gain of a channel other than the self channel. In both of the units, various circuit configurations such as a trap circuit may be employed. This can be applied regardless of whether the full-duplex two-way communication or the simplex two-way communication is applied. As the trap circuit, a serial or parallel resonance circuit composed of an inductor and a capacitor, or a serial-parallel resonance circuit according to any combination thereof may be used. Although types of the trap circuit are dependent on a configuration of the amplifier to which the gain suppressing unit is added, the serial or parallel resonance circuit has the simplest configuration.

As an exemplary embodiment, when the gain frequency characteristic of the amplifier has an asymmetric characteristic such that either the high or low frequency side has a higher gain than the other side with respect to the self channel, the gain suppressing unit may employ various circuit configurations in order to compensate for insufficient attenuation due to the asymmetric gain frequency characteristic. That is, an exemplary embodiment of the gain suppressing unit may be simply configured such that attenuation is not shown for a desired wave component and attenuation is shown only for an adjacent channel serving as an interfering wave (undesired wave) component. For example, the trap circuit may be used.

Regardless of whether one layer or a plurality of layers are formed, the inductor and the capacitor which compose the trap circuit may be formed as a lumped parameter circuit by forming a coil-shaped pattern, but the invention is not limited thereto. For example, a pattern such as a microstripline may be formed and a distributed constant circuit shape may be used. In any case, in order to reduce a pattern area, it is preferable to use a distributed capacity when pattern formation of the inductor is performed as a capacitor component.

Other Embodiments

In the signal transmission device, the receiving circuit, or the electronic apparatus disclosed in the specification, the amplifier may preferably include two cascade-connected transistors and an amplifier stage having an inductor in which a constant is set to have frequency selectivity for the self channel as a load. This configuration may be applied regardless of whether the full-duplex two-way communication or the simplex two-way communication is applied. In this case, the gain suppressing unit may be connected between a cascade connection point of two transistors and a reference potential point, and the serial resonance circuit may be used when the trap circuit is used as the gain suppressing unit. That is, it is preferable that the amplifier be composed as a cascade amplifier, and the trap circuit composed of the serial resonance circuit be provided between the cascade connection point and the reference potential point. In order to implement such a cascade amplifier configuration in a semiconductor integrated circuit such as a CMOS, it is preferable to use a dual-gate MOSFET structure.

Preferably, in the inductor of the amplifier stage, a pattern may be designed to achieve gain up. For example, a pattern is formed in a plurality of wiring layers, inductors in each layer are connected in parallel through an electric circuit, and thus a series resistance component of the inductor may be reduced. Alternatively, the amplifier may be formed in a complementary metal oxide semiconductor.

Here, it is preferable that the amplifier include a plurality of amplifier stages. That is, when the amplifier is composed of cascade amplifiers, it is preferable that the number of cascade amplifier stages be plural. In this case, the gain suppressing unit may be provided in a first amplifier stage focusing on linearity or may be provided in at least one amplifier stage other than the first stage focusing on noise performance.

In addition, by combining both cases, the gain suppressing unit may be provided in the first amplifier stage and may also be provided in at least one amplifier stage other than the first stage. In this case, in either of the gain suppressing unit provided in the first amplifier stage or the gain suppressing unit provided in at least one amplifier stage other than the first stage, a switch may be provided to selectively use the gain suppressing unit. In this way, it is possible to distinguishably use the gain suppressing unit of the first stage or the gain suppressing unit other than the first stage using the switch. In particular, when the switch is provided in both units, it is possible to arbitrarily distinguishably use the gain suppressing unit of the first stage and the gain suppressing unit other than the first stage.

In the signal transmission device, the receiving circuit, or the electronic apparatus disclosed in the specification, a gap between the transmission processing unit and the reception processing unit may be coupled by the waveguide that is made of a dielectric material. That is, the transmission or reception processing unit for each channel is disposed in either of the first or the second communication device so as to perform multichannel transmission, and a gap between the first and second communication devices is coupled by the waveguide. Then, the waveguide may be made of a magnetic material or a dielectric material such as plastic. In particular, the waveguide made of the dielectric material is preferable in terms of flexibility, cost, availability, manufacturability, or the like. This may apply regardless of whether the full-duplex two-way communication or the simplex two-way communication is applied.

In the signal transmission device, the receiving circuit or the electronic apparatus capable of being used in combination with the signal transmission device disclosed in the specification, for example, the waveguide made of the dielectric material or the magnetic material is disposed inside a case, a gap between the communication devices is coupled by the waveguide, and thus high frequency signal communication is performed through the waveguide. In this way, high speed data transmission is performed in communication inside the apparatus or in communication between apparatuses by reducing multipath, transmission degradation, unnecessary degradation, or the like. This may apply regardless of whether the full-duplex two-way communication or the simplex two-way communication is applied.

In an electric wire connection, an arrangement of the waveguide and a transmission path coupling unit (a transmission structure having a high frequency signal transmission function, also referred to as a coupler) may allow a considerable degree of error (several millimeters to several centimeters) rather than specifying a pin arrangement or a contact position as an electric wire connector. In a wireless connection, since a loss of electromagnetic waves may be reduced, power of a transmitter may be reduced, and thus a reception-side configuration may be simplified. It is also possible to suppress electric wave interference from outside the apparatus or radiation to the outside of the apparatus.

Since a transmission target signal is converted into a high frequency signal such as a millimeter-wave band and is transmitted, high speed transmission may be possible. When the waveguide is used, power consumption is low due to good coupling and small loss. The dielectric material such as an easily available plastic may be used for the waveguide, and thus it is possible to configure the signal transmission device and the electronic apparatus at a low cost. Since a high frequency signal is trapped in the waveguide, an influence of multipath decreases and an EMC problem decreases.

When a high frequency signal of an electric wave frequency band such as a millimeter-wave band is used for signal transmission, no problem occurs when the electric wire or light is used. That is, when the high frequency signal of the electric wave frequency band is used for signal transmission without the electric wire or the light, wireless communication technology may be applied. Therefore, it is possible to address a problem of the electric wire and to build a simpler and less expensive signal interface configuration than when the light is used. In terms of a size and a cost, it is more advantageous than when the light is used. Preferably, in the embodiment, it is preferable to mainly use a carrier frequency of a millimeter-wave band (a wavelength of 1 to 10 millimeters) in signal transmission. However, the invention is not limited to the millimeter-wave band, but may also be applied when a carrier frequency of a near millimeter-wave band, such as a sub-millimeter-wave band (a wavelength of 0.1 to 1 millimeters) having a shorter wavelength or a centimeter-wave band (a wavelength of 1 to 10 centimeters) having a longer wavelength, is used. For example, a sub-millimeter-wave band to a millimeter-wave band, a millimeter-wave band to a centimeter-wave band, or a sub-millimeter-wave band to a millimeter-wave band to a centimeter-wave band may be used. In signal transmission, when the millimeter-wave band or the near band thereof is used, interference with another electric wire may not occur and a need for an EMC countermeasure that is necessary when the electric wire (for example, flexible printed wiring) is used for signal transmission decreases. When the millimeter-wave band or the near band thereof is used, since a data rate is greater than that of the electric wire (for example, flexible printed wiring), it is also possible to simply respond to high speed and high data rate transmission such as a high speed image signal due to a high definition or a high frame rate.

<Transmission Processing System (Fundamental)>

Figure 2:
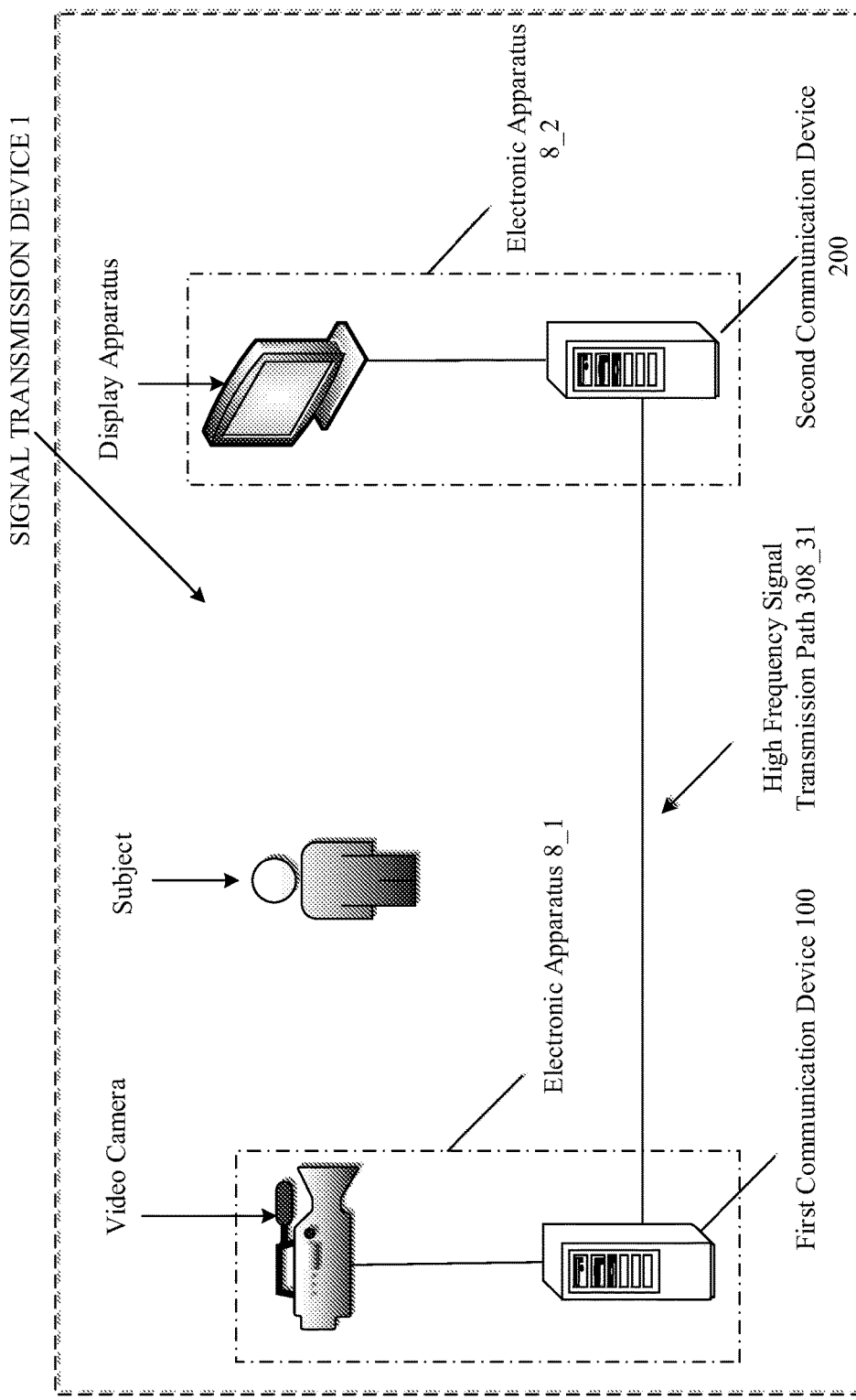
FIG. 2 is a diagram illustrating a specific example of the signal transmission device and the electronic apparatus.
Figure 3A:
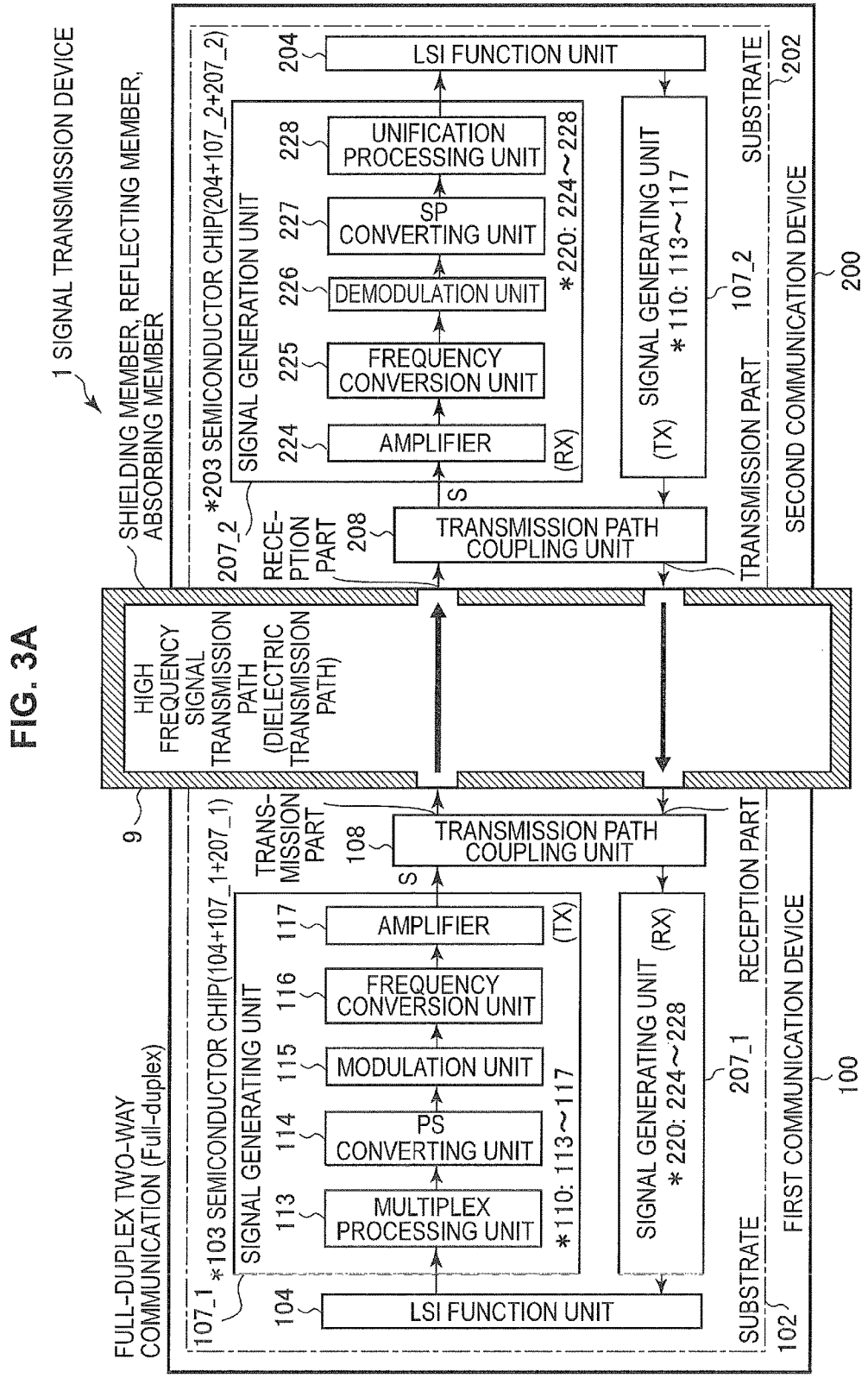
FIG. 3A is a functional block diagram illustrating the signal transmission device.

FIGS. 1 to 3B are diagrams illustrating functional configurations of signal interfaces of the signal transmission device and the electronic apparatus according to the embodiment. In other words, fundamentals of functional block diagrams are illustrated, focusing on communication processing in the signal transmission device and the electronic apparatus according to the embodiment. Here, FIG. 1 illustrates an overview of the signal transmission device and the electronic apparatus. FIG. 2 illustrates a specific example of the signal transmission device and the electronic apparatus. FIGS. 3A and 3B illustrate functional block diagrams of the signal transmission device.

[Apparatus Configuration]

As illustrated in FIG. 1(A), a signal transmission device 1 includes two electronic apparatuses 8 (first electronic apparatus 8_1 and second electronic apparatus 8_2) and a high frequency signal waveguide 308_31. Communication inside the apparatus or communication between apparatuses may be performed through a high frequency signal waveguide 308. As the high frequency signal waveguide 308, it is preferable to use, for example, a dielectric waveguide.

For example, the first electronic apparatus 8_1 includes a substrate 102_1 on which two semiconductor chips 103 (semiconductor chip 103_1 and semiconductor chip 1032) are mounted, and a substrate 1022 on which two semiconductor chips 103 (conductor chip 103_3 and semiconductor chip 103_4) are mounted. In the first electronic apparatus 8_1, one-way communication is possible between the semiconductor chip 103_1 and the semiconductor chip 103_2 through a high frequency signal waveguide 308_11, and two-way communication is possible by combining one-way communication through a high frequency signal waveguide 308_12. In addition, in the first electronic apparatus 8_1, one-way communication is possible between the semiconductor chip 103_1 and the semiconductor chip 103_3 through the high frequency signal waveguide 308_13, and one-way communication is possible between the semiconductor chip 1032 and the semiconductor chip 103_4 through a high frequency signal waveguide 308_14.

The second electronic apparatus 8_2 includes a substrate 202_1 on which two semiconductor chips 203 (semiconductor chip 203_1 and semiconductor chip 2032) are mounted and a substrate 2022 on which two semiconductor chips 203 (semiconductor chip 203_3 and semiconductor chip 203_4) are mounted. In the second electronic apparatus 82, one-way communication is possible between the semiconductor chip 203_1 and the semiconductor chip 203_2 through a high frequency signal waveguide 308_21, and two-way communication is possible by combining one-way communication through the high frequency signal waveguide 308_22. In addition, in the second electronic apparatus 8_2, one-way communication is possible between the semiconductor chip 203_1 and the semiconductor chip 203_3 through a high frequency signal waveguide 308_23, and one-way communication is possible between the semiconductor chip 2032 and the semiconductor chip 2034 through a high frequency signal waveguide 308_24.

In inter-apparatus communication between the first electronic apparatus 8_1 and the second electronic apparatus 82, two-way communication is possible between the semiconductor chip 103_2 and the semiconductor chip 203_2 through the high frequency signal waveguide 308_31. The first electronic apparatus 8_1 and the second electronic apparatus 8_2 are gathered and accommodated in one housing to configure a single electronic apparatus 8_3, and thus communication inside the apparatus may also be possible in such a manner.

FIG. 1(B) illustrates a functional block when communication is performed between first and second communication devices 100 and 200 through the high frequency signal waveguide 308. In this case, as an example, FIG. 1B focuses on a system in which the full-duplex two-way communication (Full-duplex) is performed between the semiconductor chip 103_2 and the semiconductor chip 203_2 through the high frequency signal waveguide 308_31. In the first communication device 100 (the semiconductor chip 103_2) and the second communication device 200 (the semiconductor chip 2032), for example, a data transmission and reception unit, a signal converting unit, and a high frequency signal input and output unit are provided. In the signal transmission device 1 including the high frequency signal waveguide 308, and a plurality of communication devices that are electromagnetically coupled with the high frequency signal waveguide 308, a plurality of transmission paths (communication channels) are formed in the high frequency signal waveguide 308 between the communication devices, and multiple two-way transmission is performed between the communication devices. Although not illustrated, one transmission path (communication channel) is provided in one high frequency signal waveguide 308. That is, the separate high frequency signal waveguide 308 may be used for each communication channel. In addition, as illustrated in FIG. 2(B) to be described below, the simplex two-way communication (Simplex) may be performed between the communication devices. For example, as illustrated in FIG. 2(A), the simplex two-way communication may be applied to communication between the semiconductor chip 103_1 and the semiconductor chip 1032 through the high frequency signal waveguide 308_11, or the high frequency signal waveguide 308_12, communication between the semiconductor chip 103_1 and the semiconductor chip 103_3 through the high frequency signal waveguide 308_13, and communication between the semiconductor chip 103_2 and the semiconductor chip 103_4 through the high frequency signal waveguide 308_14.

FIG. 2 illustrates an overview of the signal transmission device 1 when a video camera is used as the first electronic apparatus 8_1 and a display apparatus made of a liquid crystal, an organic EL display device, or the like is used as the second electronic apparatus 8_2. In addition, in order to facilitate understanding, the first communication device 100 is detached from the video camera and the second communication device 200 is detached from the display apparatus. Image information of a subject captured by the video camera (the electronic apparatus 8_1) is converted into a millimeter-wave band high frequency signal by the first communication device 100, and is transmitted to the second communication device 200 of the display apparatus (the electronic apparatus 8_2) side through the high frequency signal waveguide 308_31. The second communication device 200 demodulates the received high frequency signal of a millimeter-wave band, reproduces the subject image information, and provides the result to the display apparatus. In this manner, the subject image captured by the video camera is displayed on the display apparatus.

[Details of Functional Block Configuration Examples]

FIGS. 3A and 3B illustrate functional block diagrams of the signal transmission device 1 in detail. FIG. 3A illustrates a configuration example when the full-duplex two-way communication is applied. FIG. 3B illustrates a configuration example when the simplex two-way communication is applied. In FIG. 3A, a detailed transmission system is illustrated in the first communication device 100, and a detailed reception system is illustrated in the second communication device 200. In the signal transmission device 1, the first communication device 100 as an example of a first wireless apparatus and the second communication device 200 as an example of a second wireless apparatus are coupled through a signal transmission path 9 (for example, the high frequency signal waveguide 308), and signal transmission is performed using a high frequency signal (for example, the millimeter-wave band).

In the first communication device 100, the semiconductor chip 103 is provided to correspond to transmission and reception using the millimeter-wave band. In the second communication device 200, the semiconductor chip 203 is provided to correspond to transmission and reception using the millimeter-wave band. In the embodiment, a signal to be communicated using the millimeter-wave band includes only a signal requesting a high speed or large capacity. A low speed or small capacity signal, or a signal regarded as a DC such as power is not converted into the millimeter-wave signal. These signals (including power) that are not converted into the millimeter-wave signal are connected by the same method described above. Before converting into the millimeter-wave, an original electrical signal to be transmitted is collectively referred to as a baseband signal. Each signal generating unit to be described below is an example of a millimeter-wave signal generating unit or an electric signal converting unit.

In the first communication device 100, a transmission path coupling unit 108 and the semiconductor chip 103 corresponding to transmission and reception using the millimeter-wave band are mounted on a substrate 102. The semiconductor chip 103 is a large scale integrated circuit (LSI) in which, as an example of a pre-stage signal processing unit, an LSI function unit 104, a signal generating unit 107_1 for transmission processing (an example of a transmission processing unit TX configured to perform transmission processing by converting a transmission target signal into a high frequency signal), and a signal generating unit 207_1 for reception processing (an example of a reception processing unit RX configured to perform reception processing by converting a received high frequency signal into a transmission target signal) are integrated. The LSI function unit 104 is configured to perform main application control of the first communication device 100 and includes, for example, a circuit configured to process various types of signals to be transmitted to the other side or a circuit configured to process various types of signals received from the other side. Although not illustrated, each of the LSI function unit 104, the signal generating unit 107_1, and the signal generating unit 207_1 may be configured separately, or any two of the units may be integrated.

The semiconductor chip 103 is connected to the transmission path coupling unit 108. Incidentally, the transmission path coupling unit 108 may be built in the semiconductor chip 103. A part in which the transmission path coupling unit 108 and the signal transmission path 9 are coupled (that is, a part in which a wireless signal is transmitted) is a transmission part or a reception part. Typically, an antenna corresponds to these parts.

In the second communication device 200, a transmission path coupling unit 208 and the semiconductor chip 203 corresponding to transmission and reception using the millimeter-wave band are mounted on a substrate 202. The semiconductor chip 203 is connected to the transmission path coupling unit 208. Incidentally, the transmission path coupling unit 208 may be built in the semiconductor chip 203. As the transmission path coupling unit 208, the same structure as the transmission path coupling unit 108 may be employed. The semiconductor chip 203 is an LSI in which, as an example of a post-stage signal processing unit, an LSI function unit 204, a signal generating unit 207_2 for reception processing, and a signal generating unit 1072 for transmission processing are integrated. Although not illustrated, each of the LSI function unit 204 and the signal generating units 107_2 and 207_2 may be configured separately, or any two of the units may be integrated.

The transmission path coupling units 108 and 208 are configured to perform electromagnetical coupling of a high frequency signal (millimeter-wave band electrical signal) to the signal transmission path 9. For example, an antenna structure having an antenna coupling unit, an antenna terminal, an antenna, or the like is applied. Alternatively, a transmission line such as a microstripline, a stripline, a coplanar line, or a slot line may be directly used.

The signal generating unit 107_1 includes a transmission-side signal generating unit 110 configured to convert a signal from the LSI function unit 104 into a millimeter-wave signal and perform signal transmission control through the signal transmission path 9. The signal generating unit 207_1 includes a reception-side signal generating unit 220 configured to perform signal reception control through the signal transmission path 9. The signal generating unit 107_2 includes the transmission-side signal generating unit 110 configured to convert a signal from the LSI function unit 204 into a millimeter-wave signal and perform signal transmission control through the signal transmission path 9. The signal generating unit 207_2 includes a reception-side signal generating unit 220 configured to perform signal reception control through the signal transmission path 9. Transmission-side signal generating unit 110 and the transmission path coupling unit 108 constitute a transmission system (transmission unit: a transmission-side communication unit). The reception-side signal generating unit 220 and the transmission path coupling unit 208 constitute a reception system (reception unit: a reception-side communication unit).

In order to generate a millimeter-wave signal through signal processing of an input signal, the transmission-side signal generating unit 110 includes a multiplex processing unit 113, a parallel-serial converting unit 114 (PS conversion unit), a modulation function unit (a modulation unit 115 and a frequency conversion unit 116), and an amplifier 117. The amplifier 117 is an example of an amplitude adjustment unit configured to adjust a magnitude of an input signal and output the result. In addition, the modulation unit 115 and the frequency conversion unit 116 may be combined into a so-called direct conversion system. When the direct conversion system is used, wide band transmission (wide bandwidth) is possible, and a simple and compact circuit configuration may be obtained (small and simple circuits).

When there are a plurality of types of signals (denoted as N1) to be communicated using the millimeter-wave band among signals from the LSI function unit 104, the multiplex processing unit 113 performs a multiplexing process such as time division multiplexing, frequency division multiplexing, or code division multiplexing, and combines the plurality of types of signals into a signal of one system. For example, a plurality of types of signals requesting a high speed or a large capacity are combined into a signal of one system as signals to be transmitted using the millimeter-wave.

The parallel-serial converting unit 114 converts a parallel signal into a serial data signal and provides the converted signal to the modulation unit 115. The modulation unit 115 modulates a transmission target signal and provides the modulated signal to the frequency conversion unit 116. When this configuration example is not applied, the parallel-serial converting unit 114 is provided for a parallel interface specification used for a plurality of signals for parallel transmission and is unnecessary for a serial interface specification.

Basically, the modulation unit 115 may modulate at least one of an amplitude, a frequency, and a phase of a transmission target signal, and may also employ a combining method thereof. An analog modulation scheme includes, for example, amplitude modulation (AM) and vector modulation. The vector modulation includes frequency modulation (FM) and phase modulation (PM). A digital modulation scheme includes, for example, amplitude shift keying (ASK), frequency shift keying (FSK), phase shift keying (PSK), and amplitude phase shift keying (APSK) for modulating an amplitude and a phase. Quadrature amplitude modulation (QAM) is representative amplitude phase modulation. In particular, the present embodiment uses a scheme in which a synchronous detection method is employed in a reception side.

The frequency conversion unit 116 performs frequency conversion on the transmission target signal modulated by the modulation unit 115, generates a millimeter-wave electrical signal (high frequency signal), and provides the generated signal to the amplifier 117. The millimeter-wave electrical signal refers to an electrical signal having a frequency of approximately 30 GHz to 300 GHz. As indicated by the term "approximately," if a frequency can obtain an effect of millimeter-wave communication, a lower bound is not limited to 30 GHz and an upper bound is not limited to 300 GHz.

The frequency conversion unit 116 may employ various circuit configurations. For example, a configuration having a frequency mixing circuit (a mixer circuit) and a local oscillation circuit may be used. The local oscillation circuit generates a carrier wave (carrier signal, reference carrier wave) used for modulation. The frequency mixing circuit multiplies (modulation) the signal from the parallel-serial converting unit 114 and the millimeter-wave band carrier wave generated by the local oscillation circuit, generates a millimeter-wave band transmission signal, and provides the generated signal to the amplifier 117.

The amplifier 117 amplifies the millimeter-wave electrical signal after frequency conversion, and provides the amplified signal to the transmission path coupling unit 108. The amplifier 117 is connected to the two-way transmission path coupling unit 108 through, for example, an antenna terminal (not illustrated). The transmission path coupling unit 108 transmits the millimeter-wave high frequency signal generated by the transmission-side signal generating unit 110 to the signal transmission path 9. The transmission path coupling unit 108 may include, for example, the antenna coupling unit. The antenna coupling unit constitutes one or a part of the transmission path coupling unit 108 (signal coupling unit). The antenna coupling unit refers to a unit that couples an electronic circuit in the semiconductor chip and an antenna inside or outside the chip in a narrow sense, and refers to a unit that couples signals between the semiconductor chip and the signal transmission path 9 in a broad sense. The antenna coupling unit may include, for example, at least an antenna structure. The antenna structure may include a unit of electromagnetical (according to an electromagnetic field) coupling with the signal transmission path 9, may couple the millimeter-wave band electrical signal to the signal transmission path 9, and does not mean only the antenna itself.

In order to perform signal processing of the millimeter-wave electrical signal received by the transmission path coupling unit 208 and generate an output signal, the reception-side signal generating unit 220 includes an amplifier 224, a demodulation function unit (a frequency conversion unit 225 and a demodulation unit 226), a serial-parallel conversion unit 227 (an SP conversion unit), and a unification processing unit 228. The amplifier 224 is an example of an amplitude adjustment unit configured to adjust a magnitude of an input signal and output the result. Similar to the modulation function unit, the frequency conversion unit 225 and the demodulation unit 226 may be combined into a so-called direct conversion system. In addition, an injection locking method may be applied to generate a demodulation carrier signal. The reception-side signal generating unit 220 is connected to the transmission path coupling unit 208. The reception-side amplifier 224 is connected to the transmission path coupling unit 208, amplifies the millimeter-wave electrical signal received by the antenna, and provides the amplified signal to the frequency conversion unit 225. The frequency conversion unit 225 performs frequency conversion on the amplified millimeter-wave electrical signal, and provides the frequency converted signal to the demodulation unit 226. The demodulation unit 226 demodulates the frequency converted signal, obtains a baseband signal, and supplies the obtained signal to the serial-parallel conversion unit 227.

The serial-parallel conversion unit 227 converts serial reception data into parallel output data, and provides the converted data to the unification processing unit 228. Similar to the parallel-serial converting unit 114, when this configuration example is not applied, the serial-parallel conversion unit 227 is provided for a parallel interface specification used for a plurality of signals for parallel transmission. When original signal transmission is performed in series between the first and second communication devices 100 and 200, the parallel-serial converting unit 114 and the serial-parallel conversion unit 227 may not be provided.

When original signal transmission is performed in parallel between the first and second communication devices 100 and 200, an input signal is parallel-serial converted and is transmitted to the semiconductor chip 203 side, and a reception signal from the semiconductor chip 203 side is serial-parallel converted. As a result, the number of millimeter-wave conversion target signals is reduced.

The unification processing unit 228 corresponds to the multiplex processing unit 113, and separates signals combined in one system into a plurality of types of signal_n (n is 1 to N). For example, a plurality of data signals combined in one system are separated by each type and are provided to the LSI function unit 204.

The LSI function unit 204 is configured to perform main application control of the second communication device 200, and includes, for example, a circuit configured to process various types of signals received from the other side.

Referring to FIG. 1, for example, a part from the LSI function unit 104 to the parallel-serial converting unit 114 of the signal generating unit 107, and a part from the LSI function unit 204 to the serial-parallel conversion unit 227 correspond to the data transmission and reception unit. A part from the modulation unit 115 to the amplifier 117 or from the amplifier 224 to the demodulation unit 226 corresponds to the high frequency signal conversion unit. The transmission path coupling unit 108 or the transmission path coupling unit 208 corresponds to the high frequency signal input and output unit.

[Parameter Setting]

The signal transmission device 1 according to the embodiment may further include a parameter setting function. For example, as illustrated in FIG. 3B, the first communication device 100 includes a first setting value processing unit 7100 and the second communication device 200 includes a second setting value processing unit 7200. It is assumed that a transmission characteristic between transmission and reception is already known. Under an environment in which a transmission condition between transmission and reception is not substantially changed (that is, a fixed condition), for example, when an arrangement position of transmission and reception units is not changed in one housing (in communication inside the apparatus), or when transmission and reception units are arranged in separate housings, but an arrangement position of the transmission and reception units is predetermined while the units are used (in signal transmission between apparatuses in a relatively short distance), it is possible to previously identify the transmission characteristic between the transmission and reception units. Each signal processing unit (in this example, the signal generating unit 107 or 207) performs predetermined signal processing based on a setting value. The setting value processing unit inputs a setting value for predetermined signal processing to the signal processing unit.

The setting value is not limited to a setting value corresponding to the transmission characteristic, or signal transmission inside the apparatus or between apparatuses, but also includes, for example, parameter setting for variation correction of circuit elements. For example, the parameter setting for variation correction of circuit elements is included, and preferably, the setting value processing unit may input a setting value for predetermined signal processing to the signal processing unit corresponding to the transmission characteristic between the transmission and reception units. In a configuration according to the embodiment, as a major difference from open-air communication, under an environment in which a transmission condition between transmission and reception is not substantially changed (that is, a fixed condition), even when a setting value for defining an operation of the signal processing unit is dealt with as a fixed value, that is, the parameter setting is fixed, the signal processing unit may operate with no problems. When the setting value for signal processing is set as a predetermined value (that is, a fixed value), the parameter setting is not dynamically changed and thus it is possible to reduce a parameter calculating circuit and power consumption. In communication inside the apparatus or signal transmission between apparatuses in a relatively short distance, since a communication environment is fixed, various circuit parameters depending on the communication environment may be determined in advance. Under an environment having a fixed transmission condition, even when the setting value for defining an operation of the signal processing unit is dealt with as a fixed value, that is, the parameter setting is fixed, the signal processing unit may operate with no problems. For example, an optimal parameter is calculated at the time of shipping, the parameter is maintained inside the device, and thus it is possible to reduce the parameter calculating circuit and power consumption.

There are various signal processing parameter settings. For example, there is gain setting (signal amplitude setting) of a signal amplifier (amplitude adjustment unit). The signal amplifier is used in, for example, transmission power setting, reception level setting to be input to the demodulation function unit, or automatic gain control (AGC). In this case, the signal processing unit includes the amplitude adjustment unit configured to perform signal processing by adjusting a magnitude of an input signal and outputting the adjusted signal, and the setting value processing unit inputs a setting value for adjusting a magnitude of an input signal to the amplitude adjustment unit. Another example of signal processing parameter setting is phase adjustment amount setting. For example, in a system in which a carrier signal and a clock are separately transmitted, a phase is adjusted to match a transmission signal delay amount. In this case, the signal processing unit includes a phase adjustment unit configured to perform signal processing by adjusting a phase of an input signal and outputting the adjusted signal, and the setting value processing unit inputs a setting value for adjusting a phase of an input signal to the phase adjustment unit. It is also possible to combine this phase adjustment amount setting and the aforementioned gain setting. Another example of the signal processing parameter setting includes frequency characteristic setting when the transmission side emphasizes an amplitude of a low frequency component or a high frequency component, echo cancellation amount setting when two-way communication is performed, and crosstalk cancellation amount setting when each of the transmission and reception units includes a plurality of antennas and spatial multiplexing communication is performed between transmission and reception. In addition, another example of the signal processing parameter setting includes settings of an amplitude value (injection amount) or a phase shift amount of an injection signal when a carrier signal for demodulation (demodulation carrier signal) is generated by being synchronized with a carrier signal for modulation (modulation carrier signal) that is generated by the transmission-side carrier signal generating unit using the injection locking method based on a received signal, or setting of a correction amount of a phase difference between the demodulation carrier signal and a reception signal to be input to the demodulation function unit.

[Signal Transmission Path]

The signal transmission path 9 serving as a millimeter-wave propagation path is a free space transmission path, and may be used for propagation, for example, inside the housing or through a space between electronic apparatuses. In the embodiment, preferably, a waveguide structure including a waveguide, a transmission line, a dielectric line, a dielectric material, or the like is used. The high frequency signal waveguide 308 is used to trap a millimeter-wave electromagnetic wave in the transmission path and transmit the wave efficiently. For example, a dielectric waveguide including a dielectric material having a certain range of a dielectric constant and a certain range of a dielectric tangent may be used. For example, the dielectric waveguide may be a circuit substrate itself, may be disposed on the substrate, or may be embedded in the substrate. For example, since a predetermined length of polystyrene having a predetermined thickness and width or another plastic may be used as the dielectric material, the dielectric waveguide may be made at a low cost. In addition, the signal transmission path 9 (the high frequency signal waveguide 308) may use a magnetic body material instead of the dielectric material.

As surrounding portions (for example, a top surface, a bottom surface, and a side surface: but not a portion corresponding to the transmission or reception part) other than the transmission and reception part of the signal transmission path 9, a shielding member, a reflecting member, or an absorbing member may be used as necessary. For example, in order not to receive an unnecessary electromagnetic wave influence from the outside or in order to prevent millimeter-wave leakage from the inside, a shielding material may be used (for example, a metal member including metal plating is used). When the metal member is used as the shielding material, since the metal member also functions as a reflective material, a reflection component is used and a reflected wave due to the reflection component may also be used for transmission and reception. Therefore, increased sensitivity is expected. However, there is a problem in that an unnecessary standing wave due to multiple reflections in the signal transmission path 9 is generated in the signal transmission path 9. In order to avoid this problem, surrounding portions other than the transmission and reception part of the signal transmission path 9 may remain open, or the absorbing member (electric wave absorber) for absorbing the millimeter-wave may be disposed thereon. When the electric wave absorber is used, it is difficult to use the reflected wave in transmission and reception, but it is possible to absorb an electric wave leaked from the side surface. In this way, it is possible to prevent electric wave leakage to the outside and decrease a multiple reflection level in the signal transmission path 9.

[Correspondence to One-Way Communication]

In the configuration of "two-way communication" in FIG. 3A, the signal transmission path 9 serving as a millimeter-wave transmission channel is used for single-core two-way transmission of one system (single core). In this implementation, a half-duplex system in which time division duplex (TDD) is applied, or a full-duplex system in which frequency division duplex (FDD) or the like is applied is used. In the embodiment, the frequency division duplex is employed. In addition, in FIG. 3A, as a multiplexing technique for sharing one circuit by bundling a plurality of circuits, the frequency division multiplexing (FDM) is employed. An example in FIG. 3A illustrates a configuration of the full-duplex two-way communication using the frequency division duplex (FDD) in which a frequency band to be used for communication is divided in half and a separate frequency is used for transmission and reception in order to perform communication. On the other hand, according to a pair of the signal generating units 107_1 and 207_1, or a pair of the signal generating units 107_2 and 207_2, the configuration corresponds to the simplex two-way communication (simplex) as illustrated in FIG. 3B.

[Connection and Operation]

A method of signal transmission that converts a frequency of an input signal is generally used for broadcast or wireless communication. In these applications, a relatively complex transmitter or receiver is used to cope with problems such as a distance at which communication is possible (an S/N problem with respect to thermal noise), handling of reflection or multipath, or prevention of disturbance or interference from another channel.

On the other hand, the signal generating units 107 and 207 used in the embodiment use a higher frequency millimeter-wave band than a frequency range used in the complex transmitter or receiver that is generally used for the broadcast or wireless communication. Accordingly, since a wavelength λ is short, a frequency range that can be easily reused and is suitable for communication between multiple adjacently disposed devices is used.

In the embodiment, unlike a signal interface using the electric wire in related art, as described above, signal transmission is performed using the millimeter-wave band so as to flexibly respond to a high speed or a large capacity. For example, only a signal requesting a high speed or a large capacity is transmitted using the millimeter-wave band. Depending on a device configuration, the first and second communication devices 100 and 200 include an interface (connection through a terminal and a connector) using the aforementioned electric wire for a low speed or small capacity signal or power supply.

The signal generating unit 107 is an example of a signal processing unit configured to perform predetermined signal processing based on a setting value (parameter). In this example, signal processing of an input signal received from the LSI function unit 104 is performed and a millimeter-wave signal is generated. The signal generating units 107 and 207 are connected to the transmission path coupling unit 108 using a transmission line such as a microstripline, a stripline, a coplanar line, or a slot line, and the generated millimeter-wave signal is provided to the signal transmission path 9 through the transmission path coupling unit 108.

The transmission path coupling unit 108 includes, for example, an antenna structure that has a function of converting a transmitted millimeter-wave signal into an electromagnetic wave and sending the electromagnetic wave. The transmission path coupling unit 108 is electromagnetically coupled with the signal transmission path 9, and the electromagnetic wave converted by the transmission path coupling unit 108 is provided in one end of the signal transmission path 9. The transmission path coupling unit 208 in the second communication device 200 side is coupled with the other end of the signal transmission path 9. The signal transmission path 9 is provided between the transmission path coupling unit 108 in the first communication device 100 side and the transmission path coupling unit 208 in the second communication device 200 side, and thus the millimeter-wave electromagnetic wave propagates through the signal transmission path 9. The transmission path coupling unit 208 receives the electromagnetic wave transmitted to the other end of the signal transmission path 9, converts the received wave into a millimeter-wave band signal, and provides the converted signal to the signal generating unit 207 (baseband signal generating unit). The signal generating unit 207 is an example of a signal processing unit configured to perform predetermined signal processing based on a setting value (parameter). In this example, signal processing of the converted millimeter-wave signal is performed, an output signal (baseband signal) is generated, and the generated signal is provided to the LSI function unit 204. The above operations have been described in signal transmission from the first communication device 100 to the second communication device 200. Similarly, in signal transmission from the LSI function unit 204 of the second communication device 200 to the first communication device 100, it is possible to transmit the millimeter-wave signal two ways.

<Mutual Interference and Countermeasure Principle Thereof>

[Cause of Mutual Interference Generation]

FIG. 4 shows diagrams illustrating a cause of mutual interference generation. FIG. 4(A) illustrates an ideal gain characteristic of the amplifier (amplifier circuit). FIGS. 4(B) and 4(C) illustrate realistic gain characteristics of the amplifier. The horizontal axis represents a frequency in gigahertz (GHz) and the vertical axis represents a gain in decibels (dB) (it is the same in the following gain characteristic diagram).

The amplifier has a resonance characteristic for a signal of a desired channel (a frequency band of a desired wave) and amplifies the signal. A gain characteristic (a frequency characteristic of a gain) of the amplifier tuned in the desired wave (carrier frequency Fc), in other words, ideally, a characteristic diagram illustrating a frequency selection characteristic is shown such that low and high frequency sides are symmetrical with respect to a peak point, as illustrated in FIG. 4(A). That is, gain attenuation is vertically symmetrical. However, in reality, as illustrated in FIG. 4(B), the low frequency side has a higher gain tendency than the high frequency side, that is, the low frequency side has more insufficient gain attenuation than the high frequency side. On the other hand, as illustrated in FIG. 4(C), the high frequency side has a higher gain tendency than the low frequency side, that is, an asymmetrical characteristic is shown such that the high frequency side has more insufficient gain attenuation than the low frequency side. When the gain characteristic of the amplifier is asymmetrical, with respect to the desired channel, an adjacent channel component (carrier frequency $F_D$) positioned in a lower side (in the low frequency side) or an adjacent channel component (carrier frequency $F_U$) positioned in an upper side (in the high frequency side) may not be sufficiently attenuated. When the adjacent channel component exceeds a reception limit level, the adjacent channel component is demodulated, and thus so-called mutual interference occurs. For example, when a transmission level and a reception level of each channel are the same, in gain characteristics illustrated in FIGS. 4(B) and 4(C), the adjacent channel component is demodulated.

In order to avoid mutual interference, for example, the amplifier may have an approximately symmetrical gain frequency characteristic (gain characteristic) such that the gain frequency characteristic represents a sufficient attenuation degree for both of the lower-side and upper-side adjacent channels. However, it is not simple due to circuit characteristics. In many cases, as illustrated in FIG. 4(C), the high frequency side has a higher gain tendency than the low frequency side, that is, the high frequency side has more insufficient gain attenuation than the low frequency side. Rarely, as illustrated in FIG. 4(B), the low frequency side has a higher gain tendency than the high frequency side, that is, the low frequency side has more insufficient gain attenuation than the high frequency side. There are many cases in which the high frequency side has a higher gain tendency than the low frequency side. This is because Q value (quality factor: resonance performance) includes a frequency characteristic when the amplifier has a tuning characteristic (frequency selectivity for the self channel). In many cases, this is because a decrease degree of Q value is enhanced in the high frequency side. For example, when Q value is low, a peak gain decreases, a bandwidth becomes broader, and thus an overall gain attenuation degree also becomes gentle. When the decrease degree of Q value is enhanced in the high frequency side, a gain attenuation degree in the high frequency side becomes gentler than that in the low frequency side (refer to a low-noise amplifier 400_1 to be described below).

[Mutual Interference Countermeasure Method: First Example]

FIGS. 5 and 6 are diagrams illustrating a principle of a first example of a mutual interference countermeasure method of according to the embodiment. Here, FIG. 5(A) is a diagram illustrating a countermeasure method when an asymmetrical characteristic is shown such that the high frequency side has a higher gain tendency than the low frequency side. FIG. 5(B) is a diagram illustrating a countermeasure method when an asymmetrical characteristic is shown such that the low frequency side has a higher gain tendency than the high frequency side. FIG. 6 shows diagrams illustrating a method of determining whether the gain suppressing unit is necessary and determining that the gain suppressing unit is configured to suppress a gain of either channel when the number of channels is two in total.

In the first example of the mutual interference countermeasure method according to the embodiment, it is assumed that the amplifier has an asymmetrical open-loop gain characteristic. The asymmetrical characteristic is effectively used so as to provide the gain suppressing unit (a gain suppressing circuit and an interfering wave eliminating circuit) only for either of the lower-side or the upper-side adjacent channel in the amplifier. Therefore, it is possible to prevent interference from the adjacent channel. When the amplifier has an asymmetrical characteristic such that either of the high or low frequency side has a higher gain than the other side with respect to the self channel, the gain suppressing unit is configured to suppress a gain of a channel positioned at a high gain side out of adjacent channels in the asymmetric gain frequency characteristic. In other words, when the amplifier has frequency selectivity and the open-loop gain frequency characteristic having no gain suppressing unit has an asymmetrical characteristic such that either of the high or low frequency side has more insufficient gain attenuation than the other side with respect to the self channel, the gain suppressing unit is configured to suppress a gain of a channel positioned at an insufficient gain attenuation side out of adjacent channels in the asymmetric gain attenuation. Compared to when the gain suppressing unit is provided in both of the lower-side and upper-side adjacent channels, since it is possible to use the asymmetrical open-loop gain characteristic of the amplifier, it is possible to simply configure a device or a circuit.

That is, in the first example of the countermeasure method, "(effectively) use the asymmetric gain characteristic" means that, in order to compensate for an attenuation shortage due to the asymmetric open-loop gain frequency characteristic, the gain suppressing unit that is related to only either interference channel between low and high frequency sides with respect to a desired wave, is provided in the amplifier. A method in which the signal suppressing unit configured to suppress a signal component of a channel other than the self channel is provided in an input side or output side of the amplifier may be used. However, the first example of the countermeasure method employs a configuration in which the signal suppressing unit includes the gain suppressing unit provided in the amplifier, by following "attenuation shortage due to an asymmetric gain characteristic of the amplifier is compensated in the amplifier," and does not employ a method of disposing the signal suppressing unit outside the amplifier. The method of disposing the signal suppressing unit outside the amplifier will be described in a second example of the countermeasure method.

For example, as illustrated in FIG. 5(A), when an asymmetrical characteristic is shown such that the low frequency side has a higher gain tendency than the high frequency side, with respect to a desired channel signal (carrier frequency $F_C$), a lower-side adjacent channel signal may be attenuated by matching an attenuating frequency (also referred to as a "trap position") with a lower-side adjacent channel signal (carrier frequency $F_D$). A lower-side adjacent channel component may be lowered below the reception limit level, the lower-side adjacent channel component is not demodulated, and thus it is possible to prevent mutual interference. On the other hand, as illustrated in FIG. 5(B), when an asymmetrical characteristic is shown such that the high frequency side has a higher gain tendency than the low frequency side, with respect to a desired channel signal (carrier frequency Fc), an upper-side adjacent channel signal may be attenuated by matching a trap position with an upper-side adjacent channel signal (carrier frequency $F_U$). An upper-side adjacent channel component may be lowered below the reception limit level, the upper-side adjacent channel component is not demodulated, and thus it is possible to prevent mutual interference. When a shortage of the gain attenuation degree in the open-loop gain characteristic of the amplifier is compensated, a slight deviation of the trap position may be allowed.

Ideally, the "gain suppressing unit" does not show attenuation for a desired wave component and shows large attenuation for an interfering wave (undesired wave) component. For example, when a load of an amplifier circuit is used, ideally, an impedance is zero and attenuation is not shown for the desired wave component, and ideally, an impedance is infinite and large attenuation is shown for the interference wave component. In addition, in a form other than the load, typically, it is preferable to use the trap circuit. In this case, ideally, an impedance is infinite and attenuation is not shown for the desired wave component, and ideally, an impedance is zero and large attenuation is shown for the interference wave component. As the "trap circuit," a serial resonance circuit or parallel resonance circuit composed of an inductor (an inductive element) and a capacitor (a capacitance element), or a circuit of any combination thereof (a serial-parallel resonance circuit) may be used. Selection of the trap circuit depends on a configuration of the amplifier to which the gain suppressing unit is added. The trap circuit matches the trap position with the interference wave component such as the adjacent channel signal with respect to the desired channel signal, and thus a circuit constant is set to attenuate the interference wave component.

In principle, although a configuration of the serial or parallel resonance circuit is simple, it is difficult to decrease a width of a trap band, since Q value of the trap circuit is set through a balance of the inductor and the capacitor. Therefore, it is difficult to attenuate only an adjacent channel signal in the vicinity of a desired wave channel signal due to constant variation or the like. In the first example of the mutual interference countermeasure method, when a trap characteristic is sufficient to compensate for an attenuation shortage in the gain characteristic of the amplifier, an attenuation amount is also sufficient for a simple serial or parallel resonance circuit.

FIG. 6 illustrates a method of determining whether the gain suppressing unit (for example, the trap circuit) is necessary and determining that the gain suppressing unit is configured to suppress a gain of either channel in a combination between FIG. 5(A), a combination between FIG. 5(B), and a combination between FIGS. 5(A) and 5(B) when the number of channels is two in total. Between two adjacent channels, one channel having a low carrier frequency is referred to as a low frequency channel (carrier frequency $F_{C1}$) and the other channel having a high carrier frequency is referred to as a high frequency channel (carrier frequency $F_{C2}$).

A first example in FIG. 6(A) illustrates the first case described in the overview. In this case, in both of the low and high frequency channels, the open-loop gain frequency characteristic of the amplifier is shown such that the low frequency side has a more insufficient gain attenuation degree than the high frequency side with respect to the self channel. For this reason, it is necessary to provide the gain suppressing unit configured to suppress a gain of the low frequency channel in the high frequency channel amplifier. However, since the number of channels is two in total, it is unnecessary to provide the gain suppressing unit configured to suppress a gain of the lower-side adjacent channel (carrier frequency $F_D$) in the low frequency channel amplifier. In addition, the high frequency channel amplifier has a sufficient gain attenuation degree for the upper-side adjacent channel (carrier frequency $F_U$), and thus it is unnecessary to provide the gain suppressing unit for the upper-side adjacent channel.

A second example in FIG. 6(B) illustrates the second case described in the overview. In this case, in both of the low and high frequency channels, the open-loop gain frequency characteristic of the amplifier is shown such that the high frequency side has a more insufficient gain attenuation degree than the low frequency side with respect to the self channel. For this reason, it is necessary to provide the gain suppressing unit configured to suppress a gain of the high frequency channel in the low frequency channel amplifier. However, since the number of channels is two in total, it is unnecessary to provide the gain suppressing unit configured to suppress a gain of the upper-side adjacent channel (carrier frequency $F_U$) in the high frequency channel amplifier. In addition, the low frequency channel amplifier has a sufficient gain attenuation degree for the lower-side adjacent channel (carrier frequency $F_D$), and thus it is unnecessary to provide the gain suppressing unit for the lower-side adjacent channel.

A third example in FIG. 6(C) illustrates the third case described in the overview. In this case, the open-loop gain frequency characteristic of the low frequency channel amplifier is shown such that the high frequency side has a more insufficient gain attenuation degree than the low frequency side with respect to the self channel, and the open-loop gain frequency characteristic of the high frequency channel amplifier is shown such that the low frequency side has a more insufficient gain attenuation degree than the high frequency side with respect to the self channel. For this reason, it is necessary to provide the gain suppressing unit configured to suppress a gain of the low frequency channel in the high frequency channel amplifier, and it is necessary to provide the gain suppressing unit configured to suppress a gain of the high frequency channel in the low frequency channel amplifier. The high frequency channel amplifier has a sufficient gain attenuation degree for the upper-side adjacent channel (carrier frequency $F_U$), and thus it is unnecessary to provide the gain suppressing unit for the upper-side adjacent channel. The low frequency channel amplifier has a sufficient gain attenuation degree for the lower-side adjacent channel (carrier frequency $F_D$), and thus it is unnecessary to provide the gain suppressing unit for the lower-side adjacent channel.

A fourth example in FIG. 6(D) illustrates the fourth case described in the overview. In this case, the open-loop gain frequency characteristic of the low frequency channel amplifier is shown such that the low frequency side has a more insufficient gain attenuation degree than the high frequency side with respect to the self channel, and the open-loop gain frequency characteristic of the high frequency channel amplifier is shown such that the high frequency side has a more insufficient gain attenuation degree than the low frequency side with respect to the self channel. As illustrated, the low frequency channel amplifier has a sufficient gain attenuation degree for the high frequency channel without the gain suppressing unit. In addition, the high frequency channel amplifier has a sufficient gain attenuation degree for the low frequency channel serving as the lower-side adjacent channel without the gain suppressing unit. In addition, since the number of channels is two in total, it is unnecessary to provide the gain suppressing unit configured to suppress a gain of the lower-side adjacent channel (carrier frequency $F_D$) in the low frequency channel amplifier. It is unnecessary to provide the gain suppressing unit configured to suppress a gain of the upper-side adjacent channel (carrier frequency $F_U$) in the high frequency channel amplifier. In this manner, in the fourth case in which the number of channels is two in total, for both channels, it is unnecessary to provide the gain suppressing unit configured to suppress a gain of the lower-side or upper-side adjacent channel.

As described above, in the first example of the mutual interference countermeasure method, the asymmetric open-loop gain characteristics of the amplifier are effectively used, and thus the gain suppressing unit (such as the trap circuit) is provided only for either of the lower-side or the upper-side adjacent channel. Therefore, it is possible to suppress (prevent) an interference problem in multichannel transmission in which frequency division multiplexing is applied. Since an interfering wave influence can be suppressed, it is unnecessary to set a frequency interval with the adjacent channel more than necessary, and thus it is possible to effectively use the frequency.

Similarly, the above methods may be applied to multiple channels having three or more channels and may be applied in two-way communication and one-way communication. Incidentally, when the number of channels is equal to or greater than three in total and adjacent channels are combined, based on one of the above four cases, it is determined whether the gain suppressing unit is necessary, and when the gain suppressing unit is provided, it is determined that a gain of either channel is suppressed.

<Configuration Example of Amplifier>

[Low-Noise Amplifier with a Trap Circuit: First Example]

FIG. 7 illustrates a first example of a low-noise amplifier (referred to as a low-noise amplifier 400 (LNA) which corresponds to the amplifier 224) including a trap circuit as an example of the gain suppressing unit. Here, FIG. 7(A) illustrates a first circuit configuration example of the low-noise amplifier 400_1. FIG. 7(B) illustrates a gain characteristic example of the low-noise amplifier 400_1 illustrated in FIG. 7(A).

The first example of the low-noise amplifier 400_1 includes two N-channel transistors (specifically, a metal-oxide-semiconductor field-effect transistor (MOSFET)) connected in cascade (casecode, concatenation), and three amplifier stages (amplifier) including a load inductor in which a constant is set to have frequency selectivity for the self channel. The term "cascade connection" refers to the fact that one end (drain end) of a main electrode end in an input-side transistor is directly connected to one end (source end) of a main electrode end in an output (load) side transistor. That is, a source ground circuit of the input-side transistor and a gate ground circuit of the output-side transistor are vertically connected to constitute a cascade circuit. Each stage employs a configuration of AC coupling through a capacitor in order to easily set a DC bias, and the configuration is not limited to the AC coupling, but includes a configuration of DC coupling by devising a bias circuit. The low-noise amplifier 400 (not limited to the low-noise amplifier 400_1 but including other configuration examples to be described below) is implemented by, for example, a silicon integrated circuit such as a complementary metal-oxide semiconductor (CMOS).

For example, an input-side transistor Q11 and a load-side transistor Q12 are cascade-connected to a first-stage amplifier 410. The other end (source end) of a main electrode end of the transistor Q11 is connected to a reference potential point (for example, a ground). The other end (drain end) of a main electrode end of the transistor Q12 is connected to a power supply Vdd through an inductor L11. A control input end (gate end, control gate) of the transistor Q11 is supplied with a predetermined bias voltage BIAS through an inductor L12, and is connected to an input end IN of the low-noise amplifier 400_1 through a coupling capacitor C12. A control input end (gate end, screen gate) of the transistor Q12 is connected (AC ground) to the power supply Vdd.

Second-stage and third-stage amplifiers have approximately the same configuration as the first-stage amplifier. For example, an input-side transistor Q21 and a load-side transistor Q22 are cascade-connected to a second-stage amplifier 420. The other end (source end) of a main electrode end of the transistor Q21 is connected to a reference potential point (ground). The other end (drain end) of a main electrode end of the transistor Q22 is connected to the power supply Vdd through an inductor L21. A control input end (gate end) of the transistor Q21 is supplied with a predetermined bias voltage BIAS through a resistance element R22, is connected to the other end (drain end) of the main electrode end of the transistor Q12 of the first-stage amplifier 410 through a coupling capacitor C22, and is supplied with an output signal of the first-stage amplifier 410. The control input end (gate end) of the transistor Q22 is connected to the power supply Vdd.

An input-side transistor Q31 and a load-side transistor Q32 are cascade-connected to a third-stage amplifier 430. The other end (source end) of a main electrode end of the transistor Q31 is connected to a reference potential point (ground). The other end (drain end) of a main electrode end of the transistor Q32 is connected to the power supply Vdd through an inductor L31. A connection point between the other end (drain end) of the main electrode end of the transistor Q32 and the inductor L31 is connected to an output end OUT of the low-noise amplifier 400_1. A control input end (gate end) of the transistor Q31 is supplied with a predetermined bias voltage BIAS through a resistance element R32, is connected to the other end (drain end) of the main electrode end of the transistor Q22 of the second-stage amplifier 420 through a coupling capacitor C32, and is supplied with an output signal of the second-stage amplifier 420. A control input end (gate end) of the transistor Q32 is connected to the power supply Vdd.

The inductor L12 for a first-stage bias may be replaced with the resistance element R12 as the second stage or third stage. However, when the inductor L12 is used, it is possible to allow a peaking function (shunt peaking) for emphasizing a high frequency in the input side.

In this manner, in an amplifier 4 of each stage, a source ground circuit composed of a source end, a gate end, and a drain end of the input-side transistor and a source ground circuit composed of a source end, a gate end, and a drain end of the output-side transistor are vertically connected to constitute the cascade circuit. In each of the input-side transistor and the output-side transistor, an amplification factor is set to $\mu_1$ and $\mu_2$, a mutual conductance is set to $g_{m1}$ and $g_{m2}$, and a drain resistance is set to $r_{d1}$ and $r_{d2}$. In the cascade circuit as a whole, a total amplification factor is set to $\mu_1 \cdot \mu_2$, an output resistance is amplified by $\mu_1$ times an output-side drain resistance $r_{d2}$, a mutual conductance is set to $g_{m2}$, and a feedback capacity is set to $1/\mu_2$.

The MOSFET has a capacitor $C_{dg}$ between the drain and the gate. In general, since this value is relatively large and a signal that has passed through the capacitor $C_{dg}$ is fed back to a gate input side from a drain output side, parasitic oscillation easily occurs at a high frequency and an input capacitance increases equivalently due to a mirror effect. For this reason, the MOSFET is undesirable. Alternatively, when the cascade circuit is used, it is possible to suppress the above problem. Incidentally, such a cascade circuit may be included in the semiconductor integrated circuit as a dual-gate MOSFET. When the output-side transistor is interposed between a gate (the gate end of the input-side transistor) and a drain (the drain end of the output-side transistor) of the cascade circuit, it is possible to build an electrostatic shield between the gate and the drain and reduce the feedback capacity to $1\mu_2$ times.

[Configuration Example of Inductor]

In the low-noise amplifier 400_1, a constant of a coil (the inductor L11, L21, or L31), serving as a load of each stage, is set to have frequency selectivity (a resonance characteristic) for a desired wave frequency. An inductor component of the coil and a parasitic capacitance component of a wire, a transistor, or the like constitute a parallel resonance circuit. In this way, each stage amplifier has frequency selectivity and performs an amplification function.

Moreover, in addition to the inductors L11, L21, and L31 serving as a load of each stage, it is preferable to perform a pattern design of the inductor L12, which provides a DC bias to the first-stage input-side transistor Q11, to achieve gain up. For example, it is conceived that pattern formation of each inductor L is performed in one wiring layer (for example, a first layer). However, when pattern formation is performed in a plurality of wiring layers (for example, first and second layers, and first to third layers) and the inductors L of each layer are connected together (connected in parallel through an electric circuit), a series resistance component of the inductor L as a whole may be reduced. In this way, Q value of the inductor L becomes higher than a case in which only one wiring layer (a metal layer) is used, and the low-noise amplifier 400 has an increased gain in a desired frequency. That is, gain enhancement is achieved (refer to a low-noise amplifier 400_4 to be described below). Incidentally, as Q value increases, although the bandwidth is likely to be narrowed, it is possible to maintain a necessary and sufficient bandwidth.

A method in which a series resistance component of the inductor L is reduced to achieve gain enhancement may be preferably applied to the low-noise amplifier 400 of the high frequency side. As can be inferred from the aforementioned "frequency characteristic of Q value," when the amplifier has a tuning characteristic (frequency selectivity), in many cases, a decrease degree of Q value is large in high frequency side, and the high frequency side shows a greater gain decrease than the low frequency side. For example, when the signal transmission device 1 is configured to correspond to full-duplex two-way communication using 57 and 80 GHz bands, the method may not be applied to the low-noise amplifier 400 for the 57 GHz band but may be applied to only the low-noise amplifier 400 for the 80 GHz band.

[Trap Circuit]

The first example of the low-noise amplifier 400_1 includes a trap circuit 601 at a cascade connection point of the first-stage amplifier 410. Specifically, the low-noise amplifier 400_1 includes the trap circuit 601 configured as a serial resonance circuit including the inductor L13 and the capacitor C13. The trap circuit 601 is provided between a cascade connection point (referred to as a node ND1) of the transistors Q11 and Q12, and the reference potential point (ground). Each constant of the inductor L13 and the capacitor C13 is set and a pattern design of the inductor L13 and the capacitor C13 is performed such that a resonant frequency of the serial resonance circuit including the inductor L13 and the capacitor C13 matches a carrier frequency of an adjacent channel serving as an interfering wave.

For example, it is conceived that pattern formation of the inductor L13 is performed in one wiring layer (for example, a first layer). However, when pattern formation is performed in a plurality of wiring layers and the inductors L of each layer are connected together (connected in parallel), a series resistance component of the inductor L is reduced, and thus Q value becomes higher than when only one wiring layer (a metal layer) is used.

Furthermore, regardless of whether one layer or a plurality of layers are formed, the trap circuit 601 may be formed as a lumped parameter circuit by forming a coil-shaped pattern, but the invention is not limited thereto, and may include, for example, a distributed constant circuit shape in which a pattern such as a microstripline is formed. In any case, the capacitor C component preferably uses a distributed capacity when pattern formation of the inductor L is performed.

FIG. 7(B) illustrates a gain characteristic example of the low-noise amplifier 400_1 illustrated in FIG. 7(A). In this example, a gain characteristic example (obtained by simulation) of the low-noise amplifier 400_1 corresponding to the 57 GHz band (a desired wave frequency band) is illustrated. A dashed line indicates a case in which the trap circuit 601 is not provided. A solid line indicates a case in which the trap circuit 601 is provided. As illustrated, when the trap circuit 601 is not provided, the asymmetric gain characteristic is shown such that the high frequency side has a higher gain tendency than the low frequency side with respect to a peak point (in the vicinity of 57 GHz). Therefore, compared to the low frequency side, an adjacent channel frequency of the high frequency side is not sufficiently trapped, and frequency selectivity for an adjacent channel component (for example, the 80 GHz band) of the high frequency side decreases. In this state, the adjacent channel component (80 GHz band) is demodulated and thus so-called mutual interference occurs.

On the other hand, when the trap circuit 601 in which a resonant frequency is set to an 80 GHz band is provided, in the example in FIG. 7(B), it is possible to attenuate (decrease) a gain of about 15 decibels (dB) and it is possible to reduce interference due to a signal leaked into a 57 GHz band reception system from an 80 GHz band transmission system.

Incidentally, the first stage is largely influenced in terms of linearity or a noise figure (NF). Here, when the gain suppressing unit (the trap circuit 601) is provided in the first-stage amplifier 410, compared to a second example to be described below, it is advantageous in terms of the linearity. This is because a stage having a low signal amplitude performs an interfering wave eliminating function (a trap function). However, since the gain suppressing unit (the trap circuit 601) may serve as a noise source and an impedance is not infinite in a desired frequency of the trap circuit 601, a peak gain decreases slightly and thus it is disadvantageous in terms of the NF.

[Low-Noise Amplifier with a Trap Circuit: Second Example]

Figure 8:
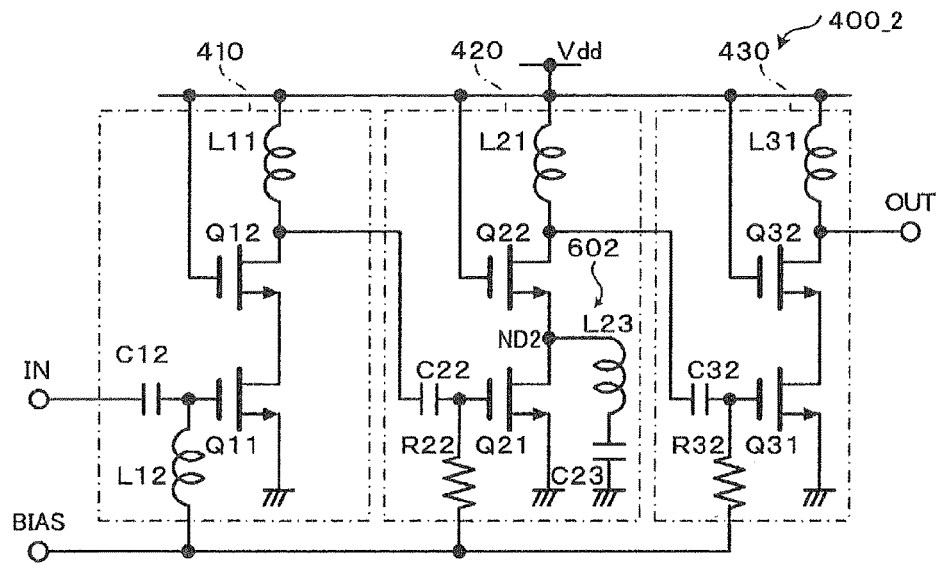
FIG. 8 is a diagram illustrating a second example of a low-noise amplifier having a trap circuit.

FIG. 8 is a diagram illustrating a second circuit configuration example of the low-noise amplifier 400 including a trap circuit as an example of the gain suppressing unit. A low-noise amplifier 400_2 in the second example includes the gain suppressing unit (the trap circuit) in the amplifier 4 other than a first-stage amplifier. The low-noise amplifier 400_2 in the second example illustrated in FIG. 8 includes a trap circuit 602 in a cascade connection point of the second-stage amplifier 420. Specifically, the low-noise amplifier 4002 includes the trap circuit 602 configured as a serial resonance circuit including an inductor L23 and a capacitor C23. The trap circuit 602 is provided between a cascade connection point (referred to as a node ND2) of the transistors Q21 and Q22 and a reference potential point (ground). The remaining configuration is the same as in the first example except that the trap circuit 601 is not provided. In the configuration of the second example, since the gain suppressing unit (the trap circuit 601) is provided in the amplifier 4 other than the first-stage amplifier, it is disadvantageous in terms of the linearity compared to the first example. This is because a stage having a high signal amplitude performs an interfering wave eliminating function (the trap function). However, since a stage having a low NF influence degree other than the first-stage performs an interfering wave eliminating function (the trap function), an impedance is not infinite in a desired frequency of the trap circuit 602 and it is more advantageous than the first example in terms of the NF even when a peak gain decreases slightly. Therefore, in the second example, it is possible to improve noise performance more than in the first example described above.

[Low-Noise Amplifier with a Trap Circuit: Third Example]

Figure 9:
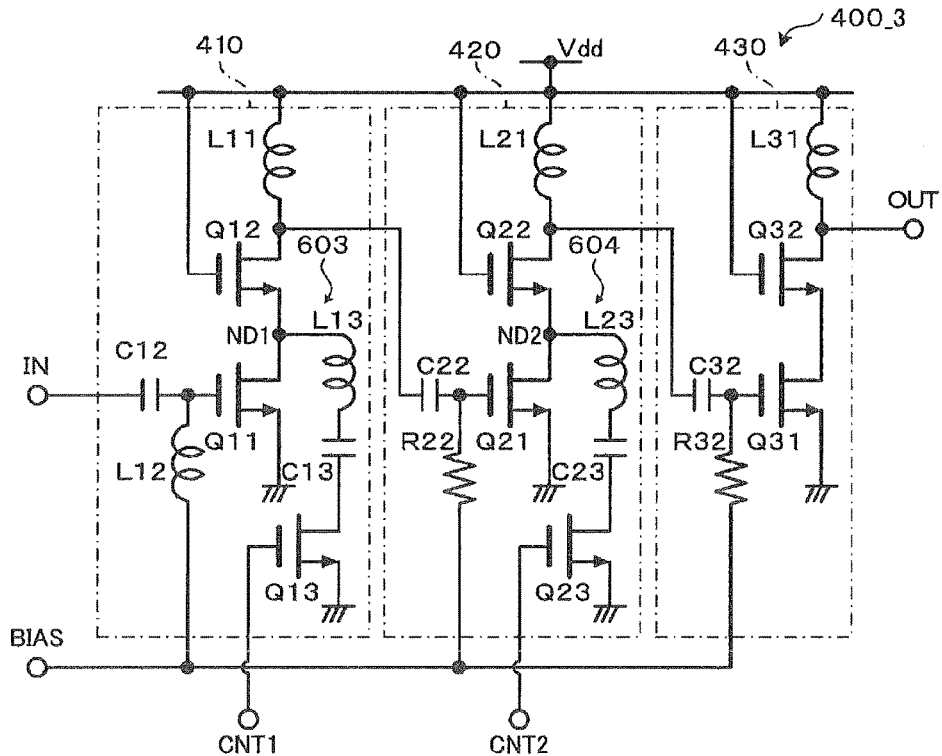
FIG. 9 is a diagram illustrating a third example of a low-noise amplifier having a trap circuit.

FIG. 9 is a diagram illustrating a third circuit configuration example of the low-noise amplifier 400 including a trap circuit as an example of the gain suppressing unit. A low-noise amplifier 400_3 in the third example combines the low-noise amplifier 400_1 in the first example and the low-noise amplifier 400_2 in the second example, and includes an ability to enable or disable an operation of the gain suppressing unit (the trap circuit). In other words, the low-noise amplifier 400_3 in the third example uses a switch for allowing the gain suppressing unit to be selectively used, and thus it is possible to selectively use the low-noise amplifier 400_1 in the first example and the low-noise amplifier 400_2 in the second example.

In order to enable or disable the operation of the trap circuit, the low-noise amplifier 400_3 includes a transistor Q13 serving as a selector switch in a side opposite to the node ND1 of the trap circuit 601 and a transistor Q23 serving as a selector switch in a side opposite to the node ND2 of the trap circuit 602. The transistors Q13 and Q23 are N-channel transistors (specifically MOSFETs). In the transistor Q13, one end (drain end) of a main electrode end is connected to the capacitor C13, and the other end (source end) of the main electrode end is connected to a reference potential point (ground). A control input end (gate end) is supplied with a control signal CNT1 for performing on/off control of the switch. In the transistor Q23, one end (drain end) of a main electrode end is connected to the capacitor C23 and the other end (source end) of the main electrode end is connected to a reference potential point (ground). A control input end (gate end) is supplied with a control signal CNT2 for performing on/off control of the switch.

When the control signal CNT1 is at a high level, the transistor Q13 serving as the switch is turned on, and thus the trap circuit 601 functions effectively. On the other hand, when the control signal CNT1 is at a low level, the transistor Q13 serving as the switch is turned off, and thus it is the same as a case in which the trap circuit 601 is not provided. When the control signal CNT2 is at a high level, the transistor Q23 serving as the switch is turned on, and thus the trap circuit 602 functions effectively. On the other hand, when the control signal CNT2 is at a low level, the transistor Q23 serving as the switch is turned off, and thus it is the same as a case in which the trap circuit 602 is not provided.

According to the low-noise amplifier 400_3 in the third example, depending on usage purposes or a required specification (focusing on the linearity or the noise performance), it is possible to selectively use the low-noise amplifier 400_1 in the first example and the low-noise amplifier 400_2 in the second example. In addition, when both of the transistors Q13 and Q23 are turned on and thus both of the trap circuits 602 and 602 effectively function, it is possible to allow a larger attenuation amount than when only one transistor functions. Therefore, it is possible to respond to a trap amount shortage when only one transistor functions.

[Modification]

The aforementioned third example is not a simple combination of the first and second examples and it allows the trap circuit to be selectively provided. However, in the combination of the first and second examples, selective providing is not necessary. For example, although not illustrated, it is possible to configure both of the trap circuits 601 and 602 to be regularly used based on the low-noise amplifier 400_3 in the third example. Alternatively, it is possible to configure either of the trap circuits 601 and 602 to be regularly used and the other to be provided with the switch (the transistor Q13 or Q23) to be selectively used based on the low-noise amplifier 400_3 in the third example. For example, when the trap circuit 602 is selectively used based on the first example in which the trap circuit 601 is regularly used, it is possible to respond to adjacent channel interference focusing on the linearity in a general state, and it is possible to respond to a trap amount shortage state by allowing the trap circuit 602 to function. On the other hand, when the trap circuit 601 is selectively used based on the second example in which the trap circuit 602 is regularly used, it is possible to respond to adjacent channel interference focusing on the noise performance in a general state, and it is possible to respond to a trap amount shortage state by allowing the trap circuit 601 to function.

[Low-Noise Amplifier without a Trap Circuit]

FIG. 10 is a diagram illustrating the general low-noise amplifier 400_4 having no trap circuit as an example of the gain suppressing unit. Here, FIG. 10(A) illustrates a circuit configuration example of the low-noise amplifier 400_4. FIG. 10(B) illustrates a gain characteristic example of the low-noise amplifier 400_4 illustrated in FIG. 10(A).

Similar to the low-noise amplifier 400_1 having the aforementioned trap circuit or the like, the low-noise amplifier 400_4 includes a three-stage amplifier 4 in which two transistors are cascade-connected. There are differences from the first example, for example, the trap circuit 601 is not provided, the first-stage amplifier 410 is replaced with an amplifier 460 (a reference numeral of a configuration component is changed to 60s from 10s), the second-stage amplifier 420 is replaced with an amplifier 470 (a reference numeral of a configuration component is changed to 70s from 20s), and the third-stage amplifier 430 is replaced with an amplifier 480 (a reference numeral of a configuration component is changed to 80s from 30s). Although reference numerals are changed, a basic configuration is the same as the first example, and thus a detailed description thereof will not be repeated.

FIG. 10(B) illustrates a gain characteristic example of the low-noise amplifier 400_4 illustrated in FIG. 10(A). In this example, a gain characteristic example (obtained by simulation) of the low-noise amplifier 400_4 corresponding to the 80 GHz band (a desired wave frequency band) is illustrated. A dashed line indicates a case in which each inductor L is formed in one wiring layer (for example, a first layer). A solid line indicates a case in which each inductor L is formed in a plurality of layers (in this example, first and second layers) and a series resistance component is reduced. As illustrated, compared to the gain characteristic when each inductor L is formed in one wiring layer, when each inductor L is formed in the plurality of layers and the series resistance component is reduced, it is understood that a gain of a peak point (in the vicinity of 80 GHz) becomes higher and gain enhancement is achieved. In addition, since Q value increases due to a decrease of the series resistance component of the inductor L, although the bandwidth is narrowed slightly, it is possible to maintain a necessary and sufficient bandwidth.

Hereinafter, a specific application example of the first countermeasure method example for addressing the mutual interference will be described by employing the gain suppressing unit (the trap circuit 601 or 602) related to only either interference channel between low and high frequency sides with respect to a desired wave. In addition, in the following, representatively, when the gain frequency characteristic of the amplifier having no gain suppressing unit is shown such that the high frequency side has more insufficient gain attenuation than the low frequency side with respect to the self channel, the gain suppressing unit (specifically, the trap circuit) is used only for an interference channel of the high frequency side with respect to the desired wave. However, this is only a representative example, and it can be modified as follows. When the gain frequency characteristic of the amplifier having no gain suppressing unit is shown such that the low frequency side has more insufficient gain attenuation than the high frequency side with respect to the self channel, the gain suppressing unit (specifically, the trap circuit) is used only for an interference channel of the low frequency side with respect to the desired wave. In addition, the same method may also be applied to a case in which the above states are mixed.

Embodiment 1

[Details of Millimeter-Wave Band Signal Transmission Function]

Figure 11:
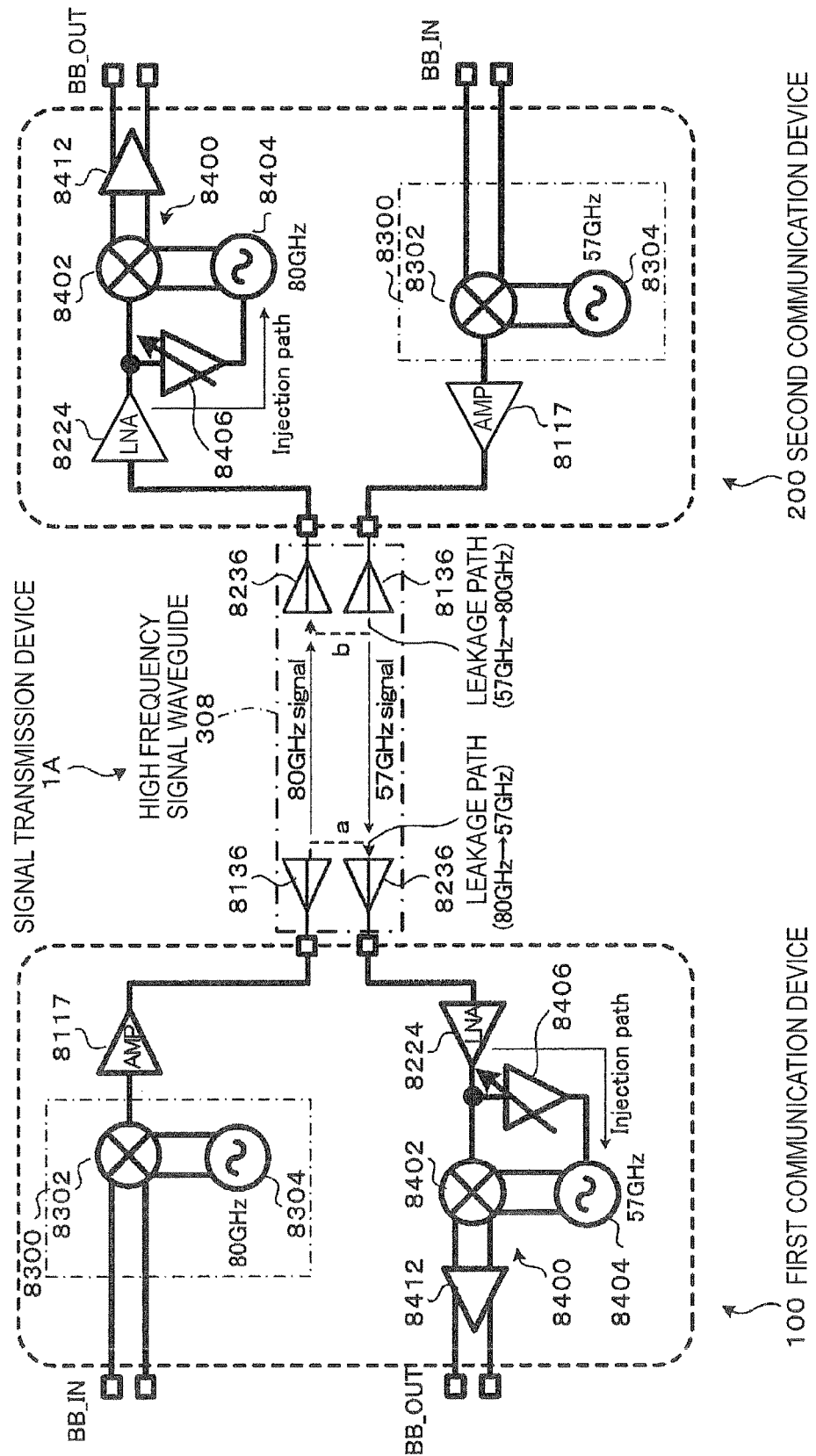
FIG. 11 is a diagram illustrating transmission and reception systems according to Embodiment 1 in which full-duplex two-way communication is applied.

Embodiment 1 is an application example of a mutual interference countermeasure in a configuration corresponding to the full-duplex two-way communication. FIG. 11 is a diagram illustrating transmission and reception systems according to Embodiment 1, and is a functional block diagram of Embodiment 1, focusing on a signal transmission function from a modulation function unit to a demodulation function unit through the high frequency signal waveguide 308 (the signal transmission path 9). FIG. 11 illustrates a configuration corresponding to full-duplex two-way communication of a low frequency side (for example, a 57 GHz band and 12.5 gigabits per second (Gb/s)) and a high frequency side (for example, an 80 GHz band and 12.5 Gb/s).

In a signal transmission device 1(A) according to Embodiment 1, the first communication device 100 uses a carrier frequency of the high frequency side (80 GHz band) in a transmission processing unit (TX) and a carrier frequency of the low frequency side (57 GHz band) in a reception processing unit (RX). That is, the first communication device 100 includes the 80 GHz transmission processing unit and the 57 GHz reception processing unit. On the other hand, the second communication device 200 uses a carrier frequency of the low frequency side (57 GHz band) in a transmission processing unit (TX) and a carrier frequency of the high frequency side (80 GHz band) in a reception processing unit (RX). That is, the second communication device 200 includes the 57 GHz transmission processing unit and the 80 GHz reception processing unit. In addition, the first and second communication devices 100 and 200 have an approximately similar configuration for both channels of the low frequency side (57 GHz band) and the high frequency side (80 GHz band). Furthermore, it is preferable to configure transmission and reception processing units (a circuit composed of a combination of the amplifier 4 and the low-noise amplifier 400, and a peripheral circuit thereof) as a single chip.

For example, in the transmission side, a transmission target signal (input baseband signal BB_IN: for example, an image signal of 12 bits) is converted into a serial data series at a high speed using the parallel-serial converting unit (not illustrated), and the converted signal is provided to a modulation function unit 8300 as a differential signal. The modulation function unit 8300 uses the signal from the parallel-serial converting unit as a modulation signal and modulates the signal to a millimeter-wave signal according to a predetermined modulation scheme. As the modulation function unit 8300, various circuit configurations may be employed depending on modulation schemes. As an amplitude modulation scheme, it is preferable to employ, for example, a direct conversion system that includes a 2-input frequency mixing unit 8302 (a mixer circuit, a multiplier) and a transmission-side local oscillator 8304 for each differential signal system. The transmission-side local oscillator 8304 (a first carrier signal generating unit) generates a carrier signal a (modulation carrier signal) used for modulation. The frequency mixing unit 8302 (a first frequency converting unit) generates a millimeter-wave band transmission signal (a modulated signal) by multiplying (modulation) the signal from the parallel-serial converting unit and a millimeter-wave band carrier wave generated by the transmission-side local oscillator 8304, and provides the result to an amplifier 8117 (AMP: corresponding to the amplifier 117). The transmission signal is amplified by the amplifier 8117 and is radiated from an antenna 8136.

The reception system employs a configuration corresponding to the modulation scheme of the transmission system. For example, according to the amplitude modulation scheme, it is possible to use a square detection circuit for obtaining a detection output proportional to the square of a received high frequency signal (envelope thereof) amplitude, or a simple envelope detection circuit without a square property. In addition, it is possible to use a circuit a (synchronous detection circuit) for synchronous detecting a received high frequency signal by generating a demodulation carrier signal and using the carrier signal. The synchronous detection circuit may also be used for a phase or frequency modulation scheme.

Here, in the reception system according to the embodiment, the direct conversion system using the synchronous detection circuit is employed and the demodulation carrier signal is generated using an injection locking scheme. The millimeter-wave reception signal received through an antenna 8236 is input to a variable gain type low noise amplifier 8224 (LNA, corresponding to the amplifier 224), amplitude adjustment is performed on the signal, and then the result is provided to a demodulation function unit 8400. The demodulation function unit 8400 includes a 2-input frequency mixing unit 8402 (a mixer circuit), a reception-side local oscillator 8404 and a baseband amplifier 8412. The injection signal is provided to the reception-side local oscillator 8404 through an injection path, and thus an output signal corresponding to the carrier signal used for modulation in the transmission-side is obtained. In general, the reception-side local oscillator 8404 obtains an oscillating output signal synchronized with the carrier signal used in the transmission-side. Then, the frequency mixing unit 8402 multiplies (synchronously detects) the received signal and the carrier signal for demodulation (a demodulation carrier signal: referred to as a reproduced carrier signal) based on the output signal of the reception-side local oscillator 8404, and thus a synchronous detection signal is obtained. By performing frequency conversion (down conversion and demodulation) using synchronous detection, the frequency mixing unit 8402 may obtain, for example, an excellent bit error rate characteristic and applicability of phase or frequency modulation using quadrature detection. A high frequency component of the synchronous detection signal is eliminated using a filter processing unit (not illustrated), and an input signal waveform (output input baseband signal BB_OUT: for example, an image signal of 12 bits) transmitted from the transmission-side is obtained. The filter processing unit may be provided between the reception-side local oscillator 8404 and the baseband amplifier 8412, or in a post-stage of the baseband amplifier 8412.

In order to provide the reproduced carrier signal based on the output signal of the reception-side local oscillator 8404 to the reception-side local oscillator 8404 and demodulate the signal, it is necessary to consider a phase shift. Therefore, there is a need to provide a phase adjustment circuit in a synchronous detection system. According to the embodiment, a phase amplitude adjustment unit 8406, which includes a function of the phase adjustment circuit and a function of adjusting an injection amplitude, is provided in the demodulation function unit 8400. The reception-side local oscillator 8404 and the phase amplitude adjustment unit 8406 constitute a demodulation-side (second) carrier signal generating unit that generates the demodulation carrier signal synchronized with the modulation carrier signal and provides the generated signal to the frequency mixing unit 8402. The phase amplitude adjustment unit 8406 may be provided for either or both of the injection signal to the reception-side local oscillator 8404 and the output signal of the reception-side local oscillator 8404. In the drawing, the phase amplitude adjustment unit 8406 is provided between the amplifier 8224 and the reception-side local oscillator 8404.

In addition, when the injection locking method is employed, control (adjustment) of a phase (an injection phase) or an amplitude (an injection voltage) of the injection signal and control of a free-running oscillation frequency $F_O$ of the reception-side local oscillator 8404 are important in terms of lock range control (adjustment). In other words, in order to achieve injection locking, it is important to adjust the injection phase, the injection voltage, or the free-running oscillation frequency $F_O$. For this reason, although not illustrated, an injection locking control unit is provided in a post-stage of the frequency mixing unit 8402, and an injection locking state is determined based on the synchronous detection signal (a baseband signal) obtained by the frequency mixing unit 8402. Based on a determination result, each component to be adjusted is controlled to achieve injection locking.

When multiple channels are implemented using a frequency division multiplexing method, the following problems occur in a method of using the square detection circuit. It is necessary to provide a band-pass filter for selecting a reception-side frequency in a pre-stage of the square detection circuit. However, it is difficult to implement a small-sized sharp band-pass filter. In addition, when the sharp band-pass filter is used, requirements for stability of a transmission-side carrier frequency become strict. Alternatively, when the injection locking is applied, by combining the synchronous detection, although the band-pass filter for selecting a wavelength is not used in the reception-side, it is less susceptible to the interference problem even when a plurality of transmission and reception pairs are independently transmitted at the same time such as multiple channel or full-duplex two-way.

In such a configuration of the signal transmission device 1, a differential baseband signal BB_IN input to the first communication device 100 is up-converted to an 80 GHz band signal by the modulation function unit 8300, is amplified by the amplifier 8117, and is coupled with the high frequency signal waveguide 308 through the antenna 8136. The 80 GHz band signal is received through the antenna 8236 of the second communication device 200 side through the high frequency signal waveguide 308. The reception signal is amplified by the amplifier 8224 (the low-noise amplifier 400), is supplied to the frequency mixing unit 8402, and is also supplied to the reception-side local oscillator 8404 through the phase amplitude adjustment unit 8406 of the injection path. An 80 GHz carrier signal for demodulation synchronized with an 80 GHz carrier signal for modulation in the reception-side local oscillator 8404 is generated in the reception-side local oscillator 8404. In the demodulation function unit 8400, the demodulation carrier signal is supplied to the frequency mixing unit 8402, and thus the received 80 GHz band signal is down-converted to the baseband signal BB_IN.

Similarly, the differential baseband signal BB_IN input to the first communication device 100 is up-converted to a 57 GHz band signal by the modulation function unit 8300, is amplified by the amplifier 8117, and is coupled with the high frequency signal waveguide 308 through the antenna 8136. The 57 GHz band signal is received through the antenna 8236 of the first communication device 100 side through the high frequency signal waveguide 308. This reception signal is amplified by the amplifier 8224 (the low-noise amplifier 400), is supplied to the frequency mixing unit 8402, and is also supplied to the reception-side local oscillator 8404 through the phase amplitude adjustment unit 8406 of the injection path. A 57 GHz carrier signal for demodulation synchronized with a 57 GHz carrier signal for modulation in the reception-side local oscillator 8404 is generated in the reception-side local oscillator 8404. In the demodulation function unit 8400, the demodulation carrier signal is supplied to the frequency mixing unit 8402, and thus the received 57 GHz band signal is down-converted to the baseband signal BB_IN.

Incidentally, in the configuration corresponding to the full-duplex two-way communication illustrated in FIG. 11, high frequency signals of two channels including the low frequency channel (57 GHz band) and the high frequency channel (80 GHz band) are transmitted to the other side from the transmission-side antenna 8136 to the reception-side antenna 8236 through the high frequency signal waveguide 308 (a transmission loss is, for example, 15 to 20 decibels, and it is flat as a whole). In this case, in the first communication device 100 side, a leakage path (represented by a dashed line a in the drawing) is formed to receive a high frequency channel (80 GHz band) signal from the antenna 8136 to the antenna 8236, which are adjacent to each other. In the second communication device 200 side, a leakage path (represented by a dashed line b in the drawing) is formed to receive a low frequency channel (57 GHz band) signal from the antenna 8136 to the antenna 8236, which are adjacent to each other. Compared to a normal path from the antenna 8136 to the antenna 8236 through the high frequency signal waveguide 308, signal energy of the leakage path is quite high since the antennas 8136 and 8236 are adjacent to each other and a loss caused by the high frequency signal waveguide 308 is small. Therefore, for example, even when the injection locking method is employed, there is a concern that the adjacent channel component is demodulated and thus "interference problem between adjacent channels" occurs when a reception-side (for example, the amplifier 8224) wavelength selection characteristic is insufficient. As a countermeasure thereof, a method in which "the asymmetric gain characteristic is (effectively) used" and the gain suppressing unit is provided for only either interference channel between the low and high frequency sides with respect to the desired wave is applied.

[Mutual Interference Countermeasure]

FIG. 12 is a diagram illustrating a specific technique for addressing mutual interference according to Embodiment 1 (a configuration corresponding to the full-duplex two-way communication illustrated in FIG. 11). Here, FIG. 12(A) is a simplified functional block diagram focusing on a signal transmission function from a transmission amplifier to a reception amplifier (the low-noise amplifier 400) through the high frequency signal waveguide 308. FIG. 12(B) illustrates a gain characteristic example of the low-noise amplifier 400 for the low frequency side (having the same characteristic as in FIG. 7(B)). FIG. 12(C) illustrates a gain characteristic example of the low-noise amplifier 400 for the high frequency side (having the same characteristic as in FIG. 10(B)).

In the drawings, "High" indicates the high frequency channel (80 GHz band) and "Low" indicates the low frequency channel (57 GHz band). When a desired channel is set as the "Low" channel, an upper-side adjacent channel is referred to as the high frequency channel. When the desired channel is set as "High," a lower-side adjacent channel is referred to as the low frequency channel. "TX" indicates the transmission processing unit and "RX" indicates the reception processing unit. "TXANT" indicates the transmission-side antenna 8136 (a transmission antenna) and "RXANT" indicates the reception-side antenna 8236 (a reception antenna). "AMP" indicates the transmission amplifier (the amplifier 117 or 8117) and "LNA" indicates the low-noise amplifier 400 (the amplifier 224 or 8224). "TP" indicates the gain suppressing unit (the trap circuit) configured to suppress an interfering wave (the adjacent channel component) for a desired channel component. A suffix thereof ("_H" or "_L") indicates whether an attenuation frequency (a trap position) matches either adjacent channel between the high and low frequency sides.

In this example, "trap circuit TP_H" is provided in the low-noise amplifier 400 for the low frequency channel, and the attenuation frequency matches the 80 GHz band serving as the upper-side adjacent channel (refer to the gain characteristic illustrated in FIG. 12(B)). The gain suppressing unit (the trap circuit) configured to suppress a gain of the lower-side adjacent channel is not provided in the low-noise amplifier 400 for the high frequency channel (refer to the gain characteristic illustrated in FIG. 12(C)).

A high frequency signal of the 80 GHz band (High) emitted from the amplifier (AMP) of the first communication device 100 is coupled with the high frequency signal waveguide 308 through the transmission antenna TXANT, and is transmitted to the second communication device 200 through the high frequency signal waveguide 308. In the second communication device 200, the high frequency signal of the 80 GHz band (High) is received through the reception antenna RXANT and is supplied to the low-noise amplifier 400 for the 80 GHz band. In this case, in the first communication device 100 side, the high frequency signal of the 80 GHz band (High) emitted from the transmission antenna TXANT jumps to a self reception antenna RXANT through a leakage path (represented by a dashed line a in the drawing), and is supplied to the low-noise amplifier 400 for the low frequency channel. Since the low-noise amplifier 400 for the low frequency channel includes the trap circuit TP_H in which the attenuation frequency is set to the 80 GHz band, the high frequency signal of the 80 GHz band is sufficiently attenuated by a function of the trap circuit TP_H, as illustrated in FIG. 12(B). For this reason, in the first communication device 100, the 80 GHz band is not demodulated in the post-stage demodulation function unit 8400 (not illustrated). As a result, it is possible to prevent interference due to the high frequency signal leaked from the 80 GHz band transmission processing unit TX to the 57 GHz band reception processing unit RX.

A high frequency signal of the 57 GHz band (Low) emitted from the amplifier (AMP) of the second communication device 200 is coupled with the high frequency signal waveguide 308 through the transmission antenna TXANT, and is transmitted to the first communication device 100 through the high frequency signal waveguide 308. In the first communication device 100, the high frequency signal of the 57 GHz band is received through the reception antenna RXANT and is supplied to the low-noise amplifier 400 for the low frequency channel. In this case, in the second communication device 200 side, the high frequency signal of the 57 GHz band emitted from the transmission antenna TXANT jumps to the self reception antenna RXANT through a leakage path (represented by a dashed line b in the drawing), and is supplied to the low-noise amplifier 400 for the high frequency channel. Although the low-noise amplifier 400 for the high frequency channel does not include the gain suppressing unit, as illustrated in FIG. 12(C), a gain in the vicinity of 57 GHz is sufficiently attenuated. For this reason, in the second communication device 100, even when the gain suppressing unit is not used, the 57 GHz band is not demodulated in the post-stage demodulation function unit 8400 (not illustrated). As a result, it is possible to prevent interference due to the high frequency signal leaked from the 57 GHz band transmission processing unit TX to the 80 GHz band reception processing unit RX.

Embodiment 2

[Details of Millimeter-Wave Signal Transmission Function]

Figure 13:
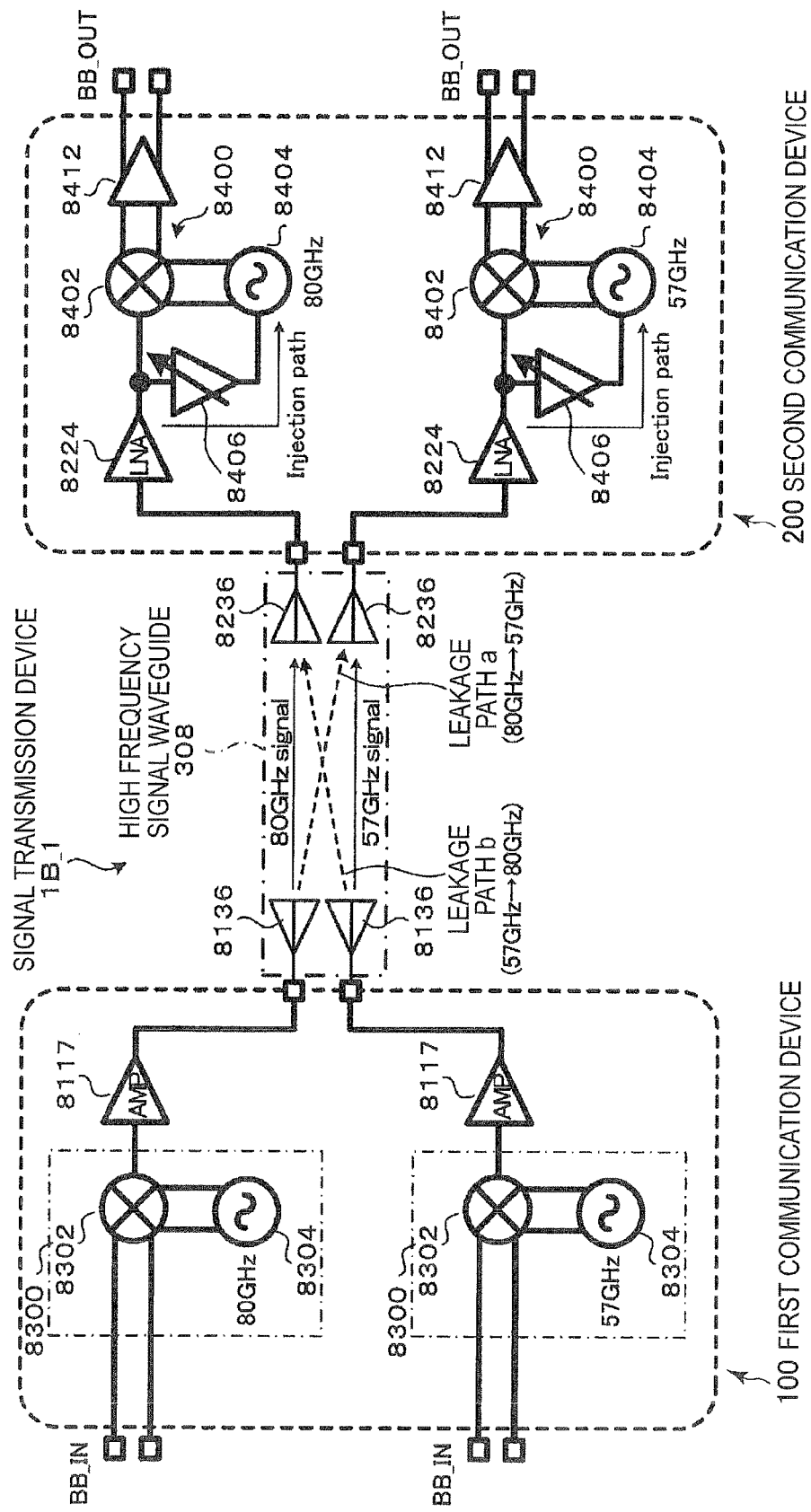
FIG. 13 is a diagram illustrating transmission and reception systems according to Embodiment 2 in which simplex two-way communication is applied.

FIG. 13 is a diagram illustrating transmission and reception systems according to Embodiment 2 and is a functional block diagram according to Embodiment 2, focusing on a signal transmission function from a modulation function unit to a demodulation function unit through the high frequency signal waveguide 308 (the signal transmission path 9). FIG. 13 illustrates a configuration corresponding to the simplex two-way communication of a low frequency side (for example, a 57 GHz band and 12.5 Gb/s) and a high frequency side (for example, an 80 GHz band and 12.5 Gb/s). In addition, it is preferable to configure the transmission processing unit (a circuit composed of two amplifiers 4, and a peripheral circuit thereof) or the reception processing unit (a circuit composed of two low-noise amplifiers 400, and a peripheral circuit thereof) as a single chip.

Embodiment 2 is an application example of a mutual interference countermeasure in a configuration corresponding to the simplex two-way communication. A signal transmission device 1B_1 according to Embodiment 2 differs from the signal transmission device 1(A) according to Embodiment 1 illustrated in FIG. 11 in that the transmission processing units TX for the low frequency side (57 GHz band) and the high frequency side (80 GHz band) are provided in either of the first or the second communication device 100 or 200 (in this example, in the first communication device 100), and the reception processing units TX for the low frequency side (57 GHz band) and the high frequency side (80 GHz band) are provided in the other side (in this example, in the second communication device 200). When such simplex two-way communication is applied, it is possible to substantially secure a transmission rate of 25.0 Gb/s.

Here, in the configuration corresponding to the simplex two-way communication illustrated in FIG. 13, signals of two channels including the low frequency side (57 GHz band) and the high frequency side (80 GHz band) are transmitted to the other side, from the transmission-side antenna 8136 to the reception-side antenna 8236 through the high frequency signal waveguide 308, respectively. In this case, in the second communication device 200 side, a leakage path (represented by a dashed line a) is also formed to receive a high frequency channel (80 GHz band) signal in the low frequency side antenna 8236, and a leakage path (represented by a dashed line b) is also formed to receive a low frequency channel (57 GHz band) signal in the high frequency side antenna 8236.

When the transmission loss of the high frequency signal waveguide 308 is the same regardless of the frequency band, transmission power may be set as the same value and thus signal energy of the leakage path may be the same as that of the normal path. However, in reality, it is difficult to obtain a flat transmission characteristic (a frequency characteristic) of the high frequency signal waveguide 308 across an entire transmission band of multichannel transmission. Thus, in many cases, a transmission characteristic is biased toward the low or high frequency side. In addition, it is difficult to obtain the same peak gain of the reception-side low-noise amplifier 400 regardless of the frequency band. Based on the above circumstances, the transmission power becomes higher for either of the low or the high frequency side. However, for example, even when the injection locking method is employed, the adjacent channel component is demodulated and thus an "interference problem between adjacent channels" may occur when the reception-side (for example, the amplifier 8224) wavelength selection characteristic is insufficient. In addition, in this example, a channel spacing is set to "80−57=23 GHz." When the channel spacing becomes narrower, as can be inferred from the gain characteristic example of the low-noise amplifier 400, the adjacent channel component is demodulated, and thus an "interference problem between adjacent channels" is highly likely to occur. In this way, even in the simplex two-way communication, it is preferable to apply the method in which "the asymmetric gain characteristic is (effectively) used" and the gain suppressing unit is provided for only either interference channel between the low and high frequency sides with respect to the desired wave.

[Mutual Interference Countermeasure]

FIG. 14 is a diagram illustrating a specific technique for addressing mutual interference according to Embodiment 2 (a configuration corresponding to the simplex two-way communication illustrated in FIG. 13). Here, FIG. 14 is a simplified functional block diagram focusing on a signal transmission function from a transmission amplifier to a reception amplifier (the low-noise amplifier 400) through the high frequency signal waveguide 308.

A gain characteristic of the low-noise amplifier 400 for the low frequency channel (57 GHz band) is the same as that in FIG. 14(B). A gain characteristic of the low-noise amplifier 400 for the high frequency channel (80 GHz band) is the same as that in FIG. 12(C). A peak gain of the low-noise amplifier 400 for the high frequency channel is lower than a peak gain of the low-noise amplifier 400 for the low frequency channel. Therefore, when the transmission loss of the high frequency signal waveguide 308 is the same regardless of the frequency band, the transmission power becomes higher for the high frequency side than the low frequency side. In the signal transmission device 1B_1, the low-noise amplifier 400 for the low frequency channel includes a trap circuit TP_H in which the attenuation frequency is set to the 80 GHz band in the second communication device 200 side.

For this reason, in the second communication device 200 side, the high frequency signal of the 80 GHz band (High) having higher power than the 57 GHz band (Low) jumps to the reception antenna RXANT through a leakage path (represented by a dashed line a in the drawing), and is supplied to the low-noise amplifier 400 for the low frequency channel. Since the trap circuit TP_H in which the attenuation frequency is set to the 80 GHz band is provided in the low-noise amplifier 400 for the low frequency channel, as illustrated in FIG. 12(B), the high frequency signal of the 80 GHz band is sufficiently attenuated by a function of the trap circuit TP_H. For this reason, in the second communication device 200, the 80 GHz band is not demodulated in the post-stage demodulation function unit 8400 for the 57 GHz band (not illustrated). As a result, it is possible to prevent interference due to the high frequency signal leaked from the 80 GHz band transmission processing unit TX to the 57 GHz band reception processing unit RX.

On the other hand, in the reception antenna RXANT for the high frequency channel, a high frequency signal of the 57 GHz band (Low) having lower power than the 80 GHz band also jumps through a leakage path (represented by a dashed line b in the drawing) and is supplied to the low-noise amplifier 400 of the high frequency channel. Although the low-noise amplifier 400 for the high frequency channel does not include the gain suppressing unit, since the 57 GHz band high frequency signal has lower power than the 80 GHz band serving as the desired wave, as illustrated in FIG. 12(C), a gain in the vicinity of 57 GHz is sufficiently attenuated. For this reason, in the second communication device 100, even when the gain suppressing unit is not used, the 57 GHz band is not demodulated in the post-stage demodulation function unit 8400 for the 80 GHz band (not illustrated). As a result, it is possible to prevent interference due to the high frequency signal leaked from the 57 GHz band transmission processing unit TX to 80 GHz band reception processing unit RX.

[Modification]

FIG. 15 is a diagram illustrating a modification of Embodiment 2 and is a diagram illustrating a specific technique for addressing mutual interference in a configuration corresponding to simplex multiple communication. Here, FIG. 15 is a simplified functional block diagram, focusing on a signal transmission function from a transmission amplifier to a reception amplifier (the low-noise amplifier 400) through the high frequency signal waveguide 308. The aforementioned Embodiment 2 describes the method in which, in one-way communication of two channels, "the asymmetric gain characteristic is (effectively) used," and the gain suppressing unit is provided for only either interference channel between the low and high frequency sides with respect to the desired wave. On the other hand, this modification is generally expanded in three or more channels. In this modification, Embodiment 2 is applied when the simplex multiple communication is applied in a combination of two channels which are adjacent to each other.

As illustrated, in a signal transmission device 1B_2, the low-noise amplifier 400 for an $F_X$ (X is 1 to n−1, $F_X<F_{X+1}$) GHz band includes a trap circuit TP_X+1 in which the attenuation frequency is set to the $F_{X+1}$ GHz band in the second communication device 200 side. In the second communication device 200 side, a high frequency signal of the $F_{X+1}$ GHz band jumps to the reception antenna RXANT for the $F_X$ GHz band through a leakage path (represented by a dashed line a in the drawing) and is supplied to the low-noise amplifier 400. Since the low-noise amplifier 400 for the $F_X$ GHz band includes the trap circuit TP_X+1 in which the attenuation frequency is set to the $F_{X+1}$ GHz band, the high frequency signal of the $F_{X+1}$ GHz band is sufficiently attenuated by a function of the trap circuit TP_X+1. For this reason, in the second communication device 200, the $F_{X+1}$ GHz band is not demodulated in the post-stage demodulation function unit 8400 for the $F_X$ GHz band (not illustrated). As a result, it is possible to prevent interference due to the high frequency signal leaked from the $F_{X+1}$ GHz band transmission processing unit TX to the $F_X$ GHz band reception processing unit RX. Although a detailed description thereof is omitted, in another leakage path (represented by a dashed line other than the dashed line a in the drawing), even when the gain suppressing unit is not used, an interfering wave is not demodulated in the demodulation function unit 8400. As a result, it is possible to prevent interference due to a leakage component.

Embodiment 3

Embodiment 3 is an application example of a mutual interference countermeasure in a configuration when the full-duplex two-way communication and the simplex two-way communication are combined. Here, the most fundamental example including three channels will be described. Unlike Embodiment 4 to be described below, in the simplex two-way communication, it is assumed that a mutual interference countermeasure (that is, the method according to Embodiment 2) is unnecessary between transmission-sides and between reception-sides. That is, Embodiment 1 is applied when the full-duplex two-way communication is applied in a combination of two channels which are adjacent to each other. A leakage path of a simplex two-way communication system is not considered.

Hereinafter, in a relation of three channels, "Low" indicates a low frequency channel (57 GHz band). "Mid" indicates a mid frequency channel (80 GHz band). "High" indicates a high frequency channel (103 GHz band). When a desired channel is set as the low frequency channel, the mid frequency channel is referred to as an upper-side adjacent channel. When the desired channel is set as the mid frequency channel, the low frequency channel is referred to as a lower-side adjacent channel and the high frequency channel is referred to as an upper-side adjacent channel. When the desired channel is set as the high frequency channel, the mid frequency channel is referred to as a lower-side adjacent channel.

FIGS. 16 to 17 are diagrams illustrating a specific technique for addressing mutual interference according to Embodiment 3 in which the full-duplex two-way communication and the simplex two-way communication are combined. Here, FIG. 16 is a diagram illustrating a gain characteristic example of the low-noise amplifier 400 used in Embodiment 3. Specifically, FIG. 16(A) illustrates a gain characteristic example of the low-noise amplifier 400 for the low frequency channel (57 GHz band) (it is the same as in FIG. 7(B)). FIG. 16(B) illustrates a gain characteristic example of the low-noise amplifier 400 for the mid frequency channel (80 GHz band). FIG. 16(C) illustrates a gain characteristic example of the low-noise amplifier 400 for the high frequency channel (103 GHz band).

FIG. 17 is a diagram illustrating transmission and reception systems according to Embodiment 3, is a simplified functional block diagram, focusing on a signal transmission function from a transmission amplifier to a reception amplifier (the low-noise amplifier 400) through the high frequency signal waveguide 308, and illustrates three configurations obtained by frequency band combinations of transmission and reception processing units. It is preferable to configure transmission and reception processing units (a circuit composed of a combination of the amplifier 4 and the low-noise amplifier 400, and a peripheral circuit thereof) as a single chip.

In a signal transmission device 1C according to Embodiment 3, Embodiment 1 is applied when any two channels adjacent to each other are combined. Specifically, in first or second communication device 100 or 200, focusing on a reception processing unit RX for a certain frequency band, the gain suppressing unit (trap circuit) is provided in the low-noise amplifier 400 for a combination in which an upper-side adjacent channel is the transmission processing unit TX, but the gain suppressing unit (trap circuit) is not provided for the other combinations. Hereinafter, the three configurations will be described in detail.

First Example

In a signal transmission device 1C_1 of a first example illustrated in FIG. 17(A), the first communication device 100 includes a transmission processing unit TX for the high frequency channel (103 GHz band), a reception processing unit RX for the mid frequency channel (80 GHz band), and a transmission processing unit TX for the low frequency channel (57 GHz band). The second communication device 200 includes a reception processing unit RX for the high frequency channel, a transmission processing unit TX for the mid frequency channel, and a reception processing unit RX for the low frequency channel. In such configurations, it is possible to apply the full-duplex two-way communication using the high and mid frequency channels or the low and mid frequency channels, and it is possible to apply the simplex two-way communication using the high and low frequency channels.

In first communication device 100, focusing on the reception processing unit RX for the mid frequency channel, since a combination in which the high frequency channel serving as the upper-side adjacent channel is the transmission processing unit TX is obtained, the high frequency channel serving as the upper-side adjacent channel is combined as the transmission processing unit TX. Therefore, the gain suppressing unit (trap circuit) configured to suppress a gain of the high frequency channel is provided in the low-noise amplifier 400 for the mid frequency channel. In addition, in second communication device 200, focusing on the reception processing unit RX for the low frequency channel, since a combination in which the mid frequency channel serving as the upper-side adjacent channel is the transmission processing unit TX is obtained, the gain suppressing unit (trap circuit) configured to suppress a gain of the mid frequency channel is provided in the low-noise amplifier 400 for the low frequency channel, the gain suppressing unit (trap circuit) configured to suppress a gain of the mid frequency channel is provided in the low-noise amplifier 400 for the low frequency channel. The gain suppressing unit (trap circuit) is not provided in combinations other than the above combination.

That is, in the first communication device 100, "trap circuit TP_H" is provided in the low-noise amplifier 400 for the mid frequency channel, and the attenuation frequency matches the 103 GHz band high frequency channel (refer to the solid line gain characteristic illustrated in FIG. 16(B)). The gain suppressing unit (trap circuit) is not provided in the low-noise amplifier 400 for the low frequency channel (refer to the dashed line gain characteristic illustrated in FIG. 16(A)), and the gain suppressing unit (trap circuit) is not provided in the low-noise amplifier 400 for the high frequency channel (refer to the gain characteristic illustrated in FIG. 16(C)). In the second communication device 200, "trap circuit TP_M" is provided in the low-noise amplifier 400 for the low frequency channel and the attenuation frequency matches the 80 GHz band mid frequency channel (refer to the solid line gain characteristic illustrated in FIG. 16(A)). The gain suppressing unit (trap circuit) is not provided in the low-noise amplifier 400 for the mid frequency channel (refer to the dashed line gain characteristic illustrated in FIG. 16(B)), and the gain suppressing unit (trap circuit) is not provided in the low-noise amplifier 400 for the high frequency channel (refer to the gain characteristic illustrated in FIG. 16(C)).

In the first communication device 100, a high frequency signal of the 103 GHz band (High) is coupled with the high frequency signal waveguide 308 through the transmission antenna TXANT and is transmitted to the second communication device 200 side. However, in this case, the high frequency signal jumps to the self reception antenna RXANT through a leakage path (represented by a dashed line a in the drawing) and is supplied to the low-noise amplifier 400 for the mid frequency channel. Since the low-noise amplifier 400 for the low frequency channel includes the trap circuit TP_H in which the attenuation frequency is set to the 103 GHz band, as illustrated in FIG. 16(B), the high frequency signal of the 103 GHz band is sufficiently attenuated by a function of the trap circuit TP_H. For this reason, in the first communication device 100, the 103 GHz band is not demodulated in the post-stage demodulation function unit 8400 for the 80 GHz band (not illustrated). As a result, it is possible to prevent interference due to the high frequency signal leaked from the 103 GHz band transmission processing unit TX to the 80 GHz band reception processing unit RX. In addition, a high frequency signal of the 57 GHz band (Low) is coupled with the high frequency signal waveguide 308 through the transmission antenna TXANT and is transmitted to the second communication device 200 side. However, in this case, the high frequency signal jumps to the self reception antenna RXANT through a leakage path (represented by a dashed line b in the drawing) and is supplied to the low-noise amplifier 400 for the mid frequency channel. Although the low-noise amplifier 400 for the mid frequency channel does not include the gain suppressing unit configured to suppress a gain of the 57 GHz band, as illustrated in FIG. 16(B), a gain in the vicinity of 57 GHz is sufficiently attenuated. For this reason, in the second communication device 100, even when the gain suppressing unit is not used, the 57 GHz band is not demodulated in the post-stage demodulation function unit 8400 for the 80 GHz band (not illustrated). As a result, it is possible to prevent interference due to the high frequency signal leaked from the 57 GHz band transmission processing unit TX to the 80 GHz band reception processing unit RX.

Meanwhile, in the second communication device 200, a high frequency signal of the 80 GHz band (Mid) is coupled with the high frequency signal waveguide 308 through the transmission antenna TXANT and is transmitted to the first communication device 100 side. However, in this case, the high frequency signal jumps to the self reception antenna RXANT through a leakage path (represented by a dashed line c in the drawing) and is supplied to the low-noise amplifier 400 for the low frequency channel. Since the low-noise amplifier 400 for the low frequency channel includes the trap circuit TP_M in which the attenuation frequency is set to the 80 GHz band, as illustrated in FIG. 16(A), the high frequency signal of the 80 GHz band is sufficiently attenuated by a function of the trap circuit TP_M. For this reason, in the second communication device 200, the 80 GHz band is not demodulated in the post-stage demodulation function unit 8400 for the 57 GHz band (not illustrated). As a result, it is possible to prevent interference due to the high frequency signal leaked from the 80 GHz band transmission processing unit TX to the 57 GHz band reception processing unit RX. In addition, a high frequency signal of the 103 GHz band (Low) is coupled with the high frequency signal waveguide 308 through the transmission antenna TXANT and is transmitted to the first communication device 100 side. However, in this case, the high frequency signal jumps to the self reception antenna RXANT through a leakage path (represented by a dashed line d in the drawing) and is supplied to the low-noise amplifier 400 for the high frequency channel. Although the low-noise amplifier 400 for the high frequency channel does not include the gain suppressing unit configured to suppress a gain of the 80 GHz band, as illustrated in FIG. 16(C), a gain in the vicinity of 80 GHz is sufficiently attenuated. For this reason, in the second communication device 100, even when the gain suppressing unit is not used, the 80 GHz band is not demodulated in the post-stage demodulation function unit 8400 for the 103 GHz band (not illustrated). As a result, it is possible to prevent interference due to the high frequency signal leaked from the 103 GHz band transmission processing unit TX to the 80 GHz band reception processing unit RX.

Second Example

In a signal transmission device 1C_2 of a second example illustrated in FIG. 17(B), the first communication device 100 includes a reception processing unit RX for the high frequency channel (103 GHz band), a transmission processing unit TX for the mid frequency channel (80 GHz band), and a transmission processing unit TX for the low frequency channel (57 GHz band). The second communication device 200 includes a transmission processing unit TX for the high frequency channel, a reception processing unit RX for the mid frequency channel, and a reception processing unit RX for the low frequency channel. In such configurations, it is possible to apply the full-duplex two-way communication using the high and mid frequency channels or the high and low frequency channels, and it is possible to apply the simplex two-way communication using the mid and low frequency channels.

In the second communication device 200, focusing on the reception processing unit RX for the mid frequency channel, since a combination in which the high frequency channel serving as the upper-side adjacent channel is the transmission processing unit TX is obtained, the gain suppressing unit (trap circuit) configured to suppress a gain of the high frequency channel is provided in the low-noise amplifier 400 for the mid frequency channel. The gain suppressing unit (trap circuit) is not provided combinations other than the above combination. Compared to the first example, in the second example, it is unnecessary to provide the gain suppressing unit in the first communication device 100.

In the second communication device 200, a high frequency signal of the 103 GHz band (High) is coupled with the high frequency signal waveguide 308 through the transmission antenna TXANT and is transmitted to the first communication device 100 side. However, in this case, the high frequency signal jumps to the self reception antenna RXANT through a leakage path (represented by a dashed line a in the drawing) and is supplied to the low-noise amplifier 400 for the mid frequency channel. Since the low-noise amplifier 400 for the mid frequency channel includes the trap circuit TP_H in which the attenuation frequency is set to the 103 GHz band, as illustrated in FIG. 16(B), the high frequency signal of the 103 GHz band is sufficiently attenuated by a function of the trap circuit TP_H. For this reason, in the second communication device 200, the 103 GHz band is not demodulated in the post-stage demodulation function unit 8400 for the 80 GHz band (not illustrated). As a result, it is possible to prevent interference due to the high frequency signal leaked from the 103 GHz band transmission processing unit TX to the 80 GHz band reception processing unit RX. Although a detailed description is omitted, in the other leakage paths (represented by dashed lines b, c, and d in the drawing), even when the gain suppressing unit is not used, the interfering wave is not demodulated in the demodulation function unit 8400. As a result, it is possible to prevent interference due to a leakage component.

Third Example

In a signal transmission device 1C_3 of a third example illustrated in FIG. 17(C), the first communication device 100 includes a transmission processing unit TX for the high frequency channel (103 GHz band), a transmission processing unit TX for the mid frequency channel (80 GHz band), and a reception processing unit RX for the low frequency channel (57 GHz band). The second communication device 200 includes a reception processing unit RX for the high frequency channel, a reception processing unit RX for the mid frequency channel, and a transmission processing unit TX for the low frequency channel. In such a configuration, it is possible to apply the full-duplex two-way communication using the high and low frequency channels or the mid and low frequency channels, and it is possible to apply the simplex two-way communication using the high and mid frequency channels.

In the first communication device 100, focusing on the reception processing unit RX for the low frequency channel, since a combination in which the mid frequency channel serving as the upper-side adjacent channel is the transmission processing unit TX is obtained, the gain suppressing unit (trap circuit) configured to suppress a gain of the mid frequency channel is provided in the low-noise amplifier 400 for the low frequency channel. The gain suppressing unit (trap circuit) is not provided in combinations other than the above combination. Compared to the first example, in the third example, it is unnecessary to provide the gain suppressing unit in the second communication device 200.

In the first communication device 100, a high frequency signal of the 80 GHz band (Mid) is coupled with the high frequency signal waveguide 308 through the transmission antenna TXANT and is transmitted to the second communication device 200 side. However, in this case, the high frequency signal jumps to the self reception antenna RXANT through a leakage path (represented by a dashed line a in the drawing) and is supplied to the low-noise amplifier 400 for the low frequency channel. Since the low-noise amplifier 400 for the low frequency channel includes the trap circuit TP_M in which the attenuation frequency is set to the 80 GHz band, as illustrated in FIG. 16(A), the high frequency signal of the 80 GHz band is sufficiently attenuated by a function of the trap circuit TP_M. For this reason, in the first communication device 100, the 80 GHz band is not demodulated in the post-stage demodulation function unit 8400 for the 57 GHz band (not illustrated). As a result, it is possible to prevent interference due to the high frequency signal leaked from the 80 GHz band transmission processing unit TX to the 57 GHz band reception processing unit RX. Although a detailed description is omitted, in the other leakage paths (represented by dashed lines b, c, and d in the drawing), even when the gain suppressing unit is not used, the interfering wave is not demodulated in the demodulation function unit 8400. As a result, it is possible to prevent interference due to a leakage component.

[Modification]

Figure 18:
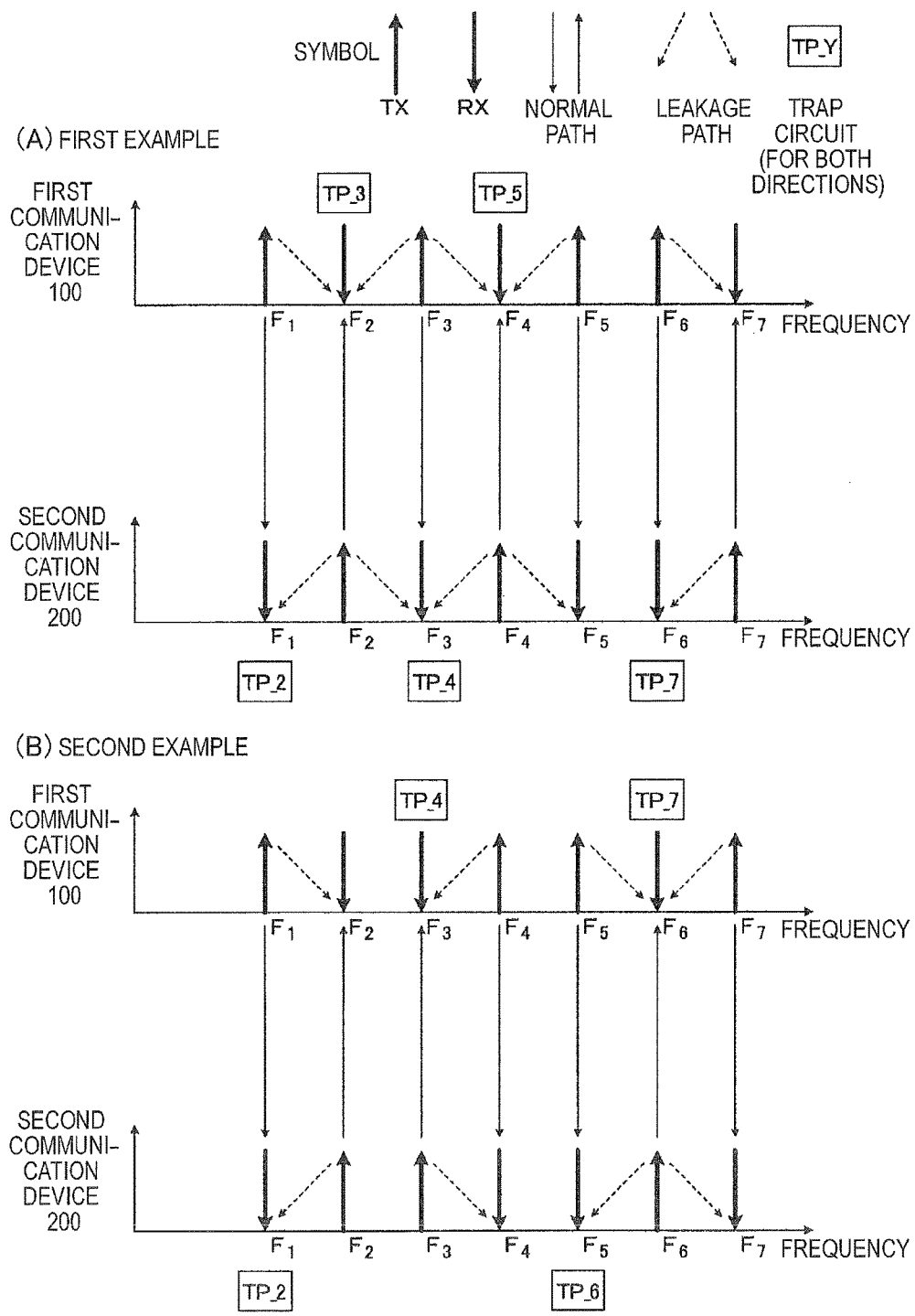
FIGS. 18(A) and 18(B) are diagrams illustrating a modification of Embodiment 3.

FIG. 18 is a diagram illustrating a modification of Embodiment 3. In this modification, the method that has been described with three channels according to Embodiment 3 is applied in four or more channels. In Embodiment 3, although the most fundamental example including three channels has been described when the full-duplex two-way communication and the simplex two-way communication are combined, it may be similarly applied when there are four or more channels. Embodiment 3 is applied when any two channels adjacent to each other are combined. As an example, descriptions of several cases will be made with seven channels in total (carrier frequency $F_Y$ (Y is 1 to 7, $F_Y < F_{Y+1}$)), including a first channel ($F_1$ GHz band), a second channel ($F_2$ GHz band), a third channel ($F_3$ GHz band), a fourth channel ($F_4$ GHz band), a fifth channel ($F_5$ GHz band), a sixth channel ($F_6$ GHz band), and a seventh channel ($F_7$ GHz band).

FIG. 18 briefly illustrates carrier frequency arrangement of each channel and transmission and reception processing units TX and RX for each channel provided in the first and second communication devices 100 and 200. In the drawing, a thick ascending arrow in a channel on a frequency axis indicates a transmission processing unit TX of the channel and a thick descending arrow indicates a reception processing unit RX of the channel. A solid line between the first and second communication devices 100 and 200 indicates a normal path. A dashed line within the first or second communication device 100 or 200 indicates a leakage path.

In the first example illustrated in FIG. 18(A), the first communication device 100 includes an $F_1$ GHz band transmission processing unit TX, an $F_2$ GHz band reception processing unit RX, an $F_3$ GHz band transmission processing unit TX, an $F_4$ GHz band reception processing unit RX, an $F_5$ GHz band transmission processing unit TX, an $F_6$ GHz band transmission processing unit TX, and an $F_7$ GHz band reception processing unit RX. The second communication device 200 includes an $F_1$ GHz band reception processing unit RX, an $F_2$ GHz band transmission processing unit TX, an $F_3$ GHz band reception processing unit RX, an $F_4$ GHz band transmission processing unit TX, an $F_5$ GHz band reception processing unit RX, an $F_6$ GHz band reception processing unit RX, and an $F_7$ GHz band transmission processing unit TX.

The full-duplex two-way communication may be considered to be applied in each of a combination of adjacent first and second channels, a combination of adjacent second and third channels, a combination of adjacent third and fourth channels, a combination of adjacent fourth and fifth channels, and a combination of adjacent sixth and seventh channels.

In this case, by applying the method according to Embodiment 3, a trap circuit TP_Y+1 (the attenuation frequency is set to a Y+1 channel band) configured to suppress a gain of a Y+1 channel is provided in the low-noise amplifier 400 for a Y channel for a combination in which the upper-side adjacent channel is the transmission processing unit TX. For example, in the first communication device 100, a trap circuit TP_3 configured to suppress a gain of the third channel is provided in the low-noise amplifier 400 for the second channel and a trap circuit TP_5 configured to suppress a gain of the fifth channel is provided in the low-noise amplifier 400 for the fourth channel. In the second communication device 200, a trap circuit TP_2 configured to suppress a gain of the second channel is provided in the low-noise amplifier 400 for the first channel, a trap circuit TP_4 configured to suppress a gain of the fourth channel is provided in the low-noise amplifier 400 for the third channel, and a trap circuit TP_7 configured to suppress a gain of the seventh channel is provided in the low-noise amplifier 400 for the sixth channel.

In the second example illustrated in FIG. 18(B), the first communication device 100 includes an $F_1$ GHz band transmission processing unit TX, an $F_2$ GHz band reception processing unit RX, an $F_3$ GHz band reception processing unit RX, an $F_4$ GHz band transmission processing unit TX, an $F_5$ GHz band transmission processing unit TX, an $F_6$ GHz band reception processing unit RX, and an $F_7$ GHz band transmission processing unit TX. The second communication device 200 includes an $F_1$ GHz band reception processing unit RX, an $F_2$ GHz band transmission processing unit TX, an $F_3$ GHz band transmission processing unit TX, an $F_4$ GHz band reception processing unit RX, an $F_5$ GHz band reception processing unit RX, an $F_6$ GHz band transmission processing unit TX, and an $F_7$ GHz band reception processing unit RX.

The full-duplex two-way communication may be considered to be applied in each of a combination of adjacent first and second channels, a combination of adjacent third and fourth channels, a combination of adjacent fifth and sixth channels, and a combination of adjacent sixth and seventh channels. In the first communication device 100, a trap circuit TP_4 configured to suppress a gain of the fourth channel is provided in the low-noise amplifier 400 for the third channel and a trap circuit TP_7 configured to suppress a gain of the seventh channel is provided in the low-noise amplifier 400 for the sixth channel. In the second communication device 200, a trap circuit TP_2 configured to suppress a gain of the second channel is provided in the low-noise amplifier 400 for the first channel and a trap circuit TP_6 configured to suppress a gain of the sixth channel is provided in the low-noise amplifier 400 for the fifth channel.

In this manner, even when there are four or more channels, in a combination of adjacent channels when the full-duplex two-way communication is performed between the first and second communication devices 100 and 200, the trap circuit TP_Y+1 in which the attenuation frequency is set to the Y+1 channel band is provided in the low-noise amplifier 400 for the Y channel. As a result, it is possible to prevent interference due to the high frequency signal leaked from the Y+1 channel band transmission processing unit TX to the Y channel reception processing unit RX through the leakage path.

Embodiment 4

Embodiment 4 is an application example of a mutual interference countermeasure when the full-duplex two-way communication and the simplex two-way communication are combined. Unlike Embodiment 3 described above, in the simplex two-way communication, it is assumed that the mutual interference countermeasure (that is, the method of Embodiment 2) is unnecessary between transmission-sides, whereas the mutual interference countermeasure (that is, the method of Embodiment 2) is necessary between reception-sides. That is, in addition to Embodiment 3, Embodiment 2 is applied when the simplex multiple communication is applied in a combination of two channels which are adjacent to each other. Unlike Embodiment 3, a leakage path of a simplex two-way communication system is also considered.

FIG. 19 is a diagram illustrating transmission and reception systems according to Embodiment 4 in which the full-duplex two-way communication and the simplex two-way communication are combined, and is a simplified functional block diagram, focusing on a signal transmission function from a transmission amplifier to a reception amplifier (the low-noise amplifier 400) through the high frequency signal waveguide 308. Here, three configurations obtained by frequency band combinations of transmission and reception processing units are illustrated. In addition, it is preferable to configure transmission and reception processing units (a circuit composed of the amplifier 4 and the low-noise amplifier 400, and a peripheral circuit thereof) as a single chip.

In a signal transmission device 1D according to Embodiment 4, in the simplex two-way communication between the first and second communication devices 100 and 200, focusing on the reception processing unit RX for a certain frequency band, the gain suppressing unit (trap circuit) is provided in the low-noise amplifier 400 for a combination in which the upper-side adjacent channel is the transmission processing unit TX. The gain suppressing unit (trap circuit) is not provided for combinations other than the above combination. Hereinafter, focusing on points different from Embodiment 3, the three configurations will be described in detail.

First Example

A signal transmission device 1D_1 of a first example illustrated in FIG. 19(A) is a modification of the first example according to Embodiment 3. The simplex two-way communication using high and low frequency channels can be applied to the device and leakage paths (represented by dashed lines e and f in the drawing) are formed therein. Since the channels are not adjacent to each other, there is no reason (necessity) to apply Embodiment 2.

Second Example

A signal transmission device 1D_2 of a second example illustrated in FIG. 19(B) is a modification of the second example according to Embodiment 3. The simplex two-way communication using mid and low frequency channels can be applied to the device and leakage paths (represented by dashed lines e and f in the drawing) are formed therein. Since the channels are adjacent to each other, there is a reason to apply Embodiment 2. Specifically, in the second communication device 200 side, a trap circuit TP_M in which the attenuation frequency is set to the 80 GHz band is provided in the low-noise amplifier 400 for the low frequency channel. That is, the trap circuit TP_M is further added to the second example according to Embodiment 3.

In the second communication device 200 side, the high frequency signal of the 80 GHz band (Mid) having higher power than the 57 GHz band (Low) jumps to the reception antenna RXANT through a leakage path (represented by a dashed line e in the drawing), and is supplied to the low-noise amplifier 400 for the low frequency channel. Since the trap circuit TP_M in which the attenuation frequency is set to the 80 GHz band is provided in the low-noise amplifier 400 for the low frequency channel, as illustrated in FIG. 16(A), the high frequency signal of the 80 GHz band is sufficiently attenuated by a function of the trap circuit TP_M. For this reason, in the second communication device 200, the 80 GHz band is not demodulated in the post-stage demodulation function unit 8400 for the 57 GHz band (not illustrated). As a result, it is possible to prevent interference due to the high frequency signal leaked from the 80 GHz band transmission processing unit TX to the 57 GHz band reception processing unit RX through the leakage path e.

Third Example

A signal transmission device 1D_3 of a third example illustrated in FIG. 19(C) is a modification of the third example according to Embodiment 3. The simplex two-way communication using high and mid frequency channels can be applied to the device and leakage paths (represented by dashed lines e and f in the drawing) are formed therein. Since the channels are adjacent to each other, there is a reason to apply Embodiment 2. Specifically, in the second communication device 200 side, a trap circuit TP_H in which the attenuation frequency is set to the 103 GHz band is provided in the low-noise amplifier 400 for the mid frequency channel. That is, the trap circuit TP_H is further added to the third example according to Embodiment 3.

In the second communication device 200 side, the high frequency signal of the 103 GHz band (High) having higher power than the 80 GHz band (Low) jumps to the reception antenna RXANT through a leakage path (represented by a dashed line e in the drawing), and is supplied to the low-noise amplifier 400 for the mid frequency channel. Since the trap circuit TP_H in which the attenuation frequency is set to the 103 GHz band is provided in the low-noise amplifier 400 for the high frequency channel, as illustrated in FIG. 16(B), the high frequency signal of the 103 GHz band is sufficiently attenuated by a function of the trap circuit TP_H. For this reason, in the second communication device 200, the 103 GHz band is not demodulated in the post-stage demodulation function unit 8400 for the 80 GHz band (not illustrated). As a result, it is possible to prevent interference due to the high frequency signal leaked from the 103 GHz band transmission processing unit TX to the 80 GHz band reception processing unit RX through the leakage path e.

[Modification]

FIG. 20 is a diagram illustrating a modification of Embodiment 4. In this modification, the method that has been described with three channels according to Embodiment 4 is applied in four or more channels. In Embodiment 4, although the most fundamental example including three channels has been described, it may be similarly applied when there are four or more channels. As an example, a description will be made based on the modification of Embodiment 3 illustrated in FIG. 18.

By applying the method according to Embodiment 4, a trap circuit TP_Y+1 (the attenuation frequency is set to the Y+1 channel band) configured to suppress a gain of the Y+1 channel is provided in the low-noise amplifier 400 for the Y channel for a combination in which the simplex two-way communication is applied and the upper-side adjacent channel is the transmission processing unit TX (a combination enclosed in an ellipse in the drawing).

For example, in a first example illustrated in FIG. 20(A), in addition to the full-duplex two-way communication in the adjacent channel combination described in the modification (first example) of Embodiment 3, the simplex two-way communication may be considered to be applied to a combination of adjacent fifth and sixth channels. In this case, in the first communication device 100, a trap circuit TP_6 configured to suppress a gain of the sixth channel is provided in the low-noise amplifier 400 for the fifth channel.

In a second example illustrated in FIG. 20(B), in addition to the full-duplex two-way communication in the adjacent channel combination described in the modification (second example) of Embodiment 3, the simplex two-way communication may be considered to be applied to a combination of adjacent second and third channels and a combination of adjacent fourth and fifth channels. In this case, in the first communication device 100, a trap circuit TP_3 configured to suppress a gain of the third channel is provided in the low-noise amplifier 400 for the second channel, and in the second communication device 200, a trap circuit TP_5 configured to suppress a gain of the fifth channel is provided in the low-noise amplifier 400 for the fourth channel.

In this manner, even when there are four or more channels, in the combination of adjacent channels in which the simplex two-way communication is performed between the first and second communication devices 100 and 200, the trap circuit TP_Y+1 in which the attenuation frequency is set to the Y+1 channel band is provided in the low-noise amplifier 400 for the Y channel. As a result, it is possible to prevent interference due to the high frequency signal leaked from the Y+1 channel band transmission processing unit TX to the Y channel reception processing unit RX through the leakage path.

Embodiment 5

[Mutual Interference Countermeasure Method: Second Example]

Next, a second example of a mutual interference countermeasure method and a specific application example thereof will be described. Similar to the first example of the mutual interference countermeasure method, the second example of the mutual interference countermeasure method uses the asymmetric open-loop gain frequency characteristic of the amplifier circuit and "compensates for an attenuation shortage due to the asymmetric gain characteristic of the amplifier." However, in order to implement this example, there is a difference in that the signal suppressing unit configured to suppress a signal component of a channel other than the self channel is provided outside the amplifier (provided, before demodulation processing). As the signal suppressing unit, for example, the trap circuit, is employed.

FIGS. 21 and 22 are diagrams illustrating transmission and reception systems according to Embodiment 5. Here, FIG. 21 illustrates first to third examples and FIG. 22 illustrates fourth to sixth examples. All examples illustrate modifications of Embodiment 4 and may also be similarly applied to Embodiments 1 to 3.

Each of the first to third examples illustrated in FIGS. 21(A) to 21(C) is a modification of the first to third examples according to Embodiment 4. The signal suppressing unit (the trap circuit 601 or 602) is not provided in the low-noise amplifier 400 but is provided in a pre-stage of the low-noise amplifier 400. On the other hand, each of the first to third examples illustrated in FIGS. 22(A) to 22(C) is a modification of the first to third examples according to Embodiment 4. The signal suppressing unit (the trap circuit 601 or 602) is not provided in the low-noise amplifier 400 but is provided in a post-stage (a pre-stage of the demodulation function unit 8400) of the low-noise amplifier 400.

Even when the second example of the mutual interference countermeasure method is applied, since a signal level of an interference channel is attenuated by a function of the signal suppressing unit (the trap circuit 601 or 602), an interference channel component is not demodulated in the demodulation function unit 8400 (not illustrated) provided in a post-stage of the low-noise amplifier 400. As a result, it is possible to prevent mutual interference. Since the asymmetric open-loop gain frequency characteristic of the amplifier circuit is used, it is sufficient that the signal suppressing unit has an attenuation characteristic capable of compensating for an attenuation shortage due to the asymmetric gain frequency characteristic. The attenuation characteristic may allow small attenuation in a target channel position. For example, when the trap circuit is used, a trap amount may be small and it may be implemented in a simple configuration.

Embodiment 6

[Mutual Interference Countermeasure Method: Third Example]

Next, a third example of the mutual interference countermeasure method and a specific application example thereof will be described. Unlike the first or second example of the mutual interference countermeasure method, the third example of the mutual interference countermeasure method does not use the asymmetric open-loop gain frequency characteristic of the amplifier circuit. In other words, the third example may be applied regardless of whether the open-loop gain frequency characteristic of the amplifier circuit is symmetric or asymmetric. For example, the third example may be applied even when the amplifier circuit is a broadband amplifier circuit having no frequency (wavelength) selectivity. Even in this case, the gain suppressing unit is not provided in the reception processing units for all channels, and the gain suppressing unit configured to suppress a gain of a channel other than the self channel is provided in any reception processing unit. In this manner, it is possible to prevent interference from a channel for which at least a gain suppressing unit is provided.

Figure 23:
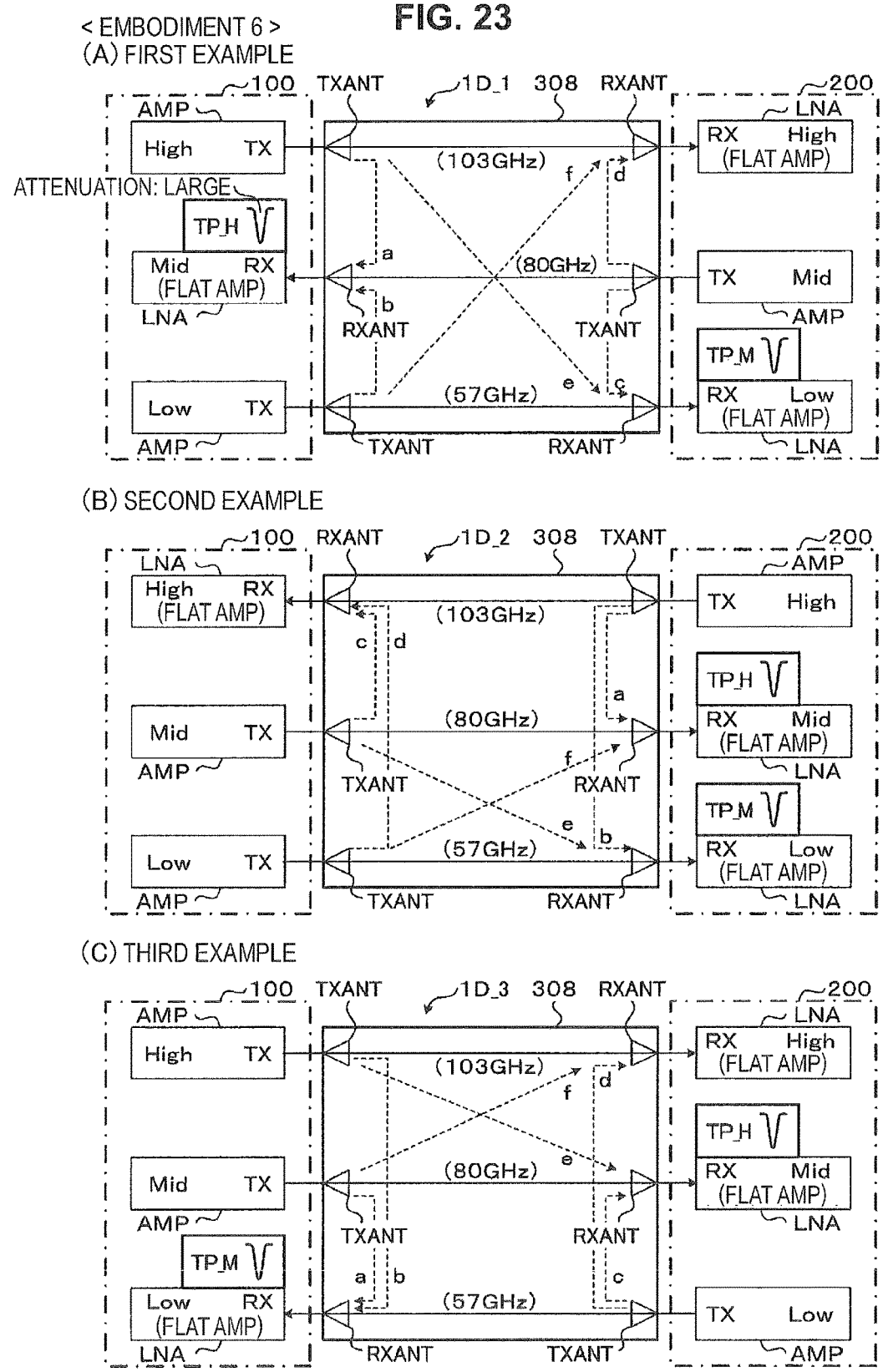
FIGS. 23(A) to 23(C) are diagrams illustrating transmission and reception systems according to Embodiment 6 (first to third examples).

FIGS. 23 and 24 are diagrams illustrating transmission and reception systems according to Embodiment 6. Here, FIG. 23 illustrates first to third examples and FIG. 24 illustrates fourth to sixth examples. Although FIG. 23 illustrates a modification of Embodiment 4 and FIG. 24 illustrates a modification of Embodiment 5, they may be similarly applied to other Embodiments.

Each of the first to third examples illustrated in FIGS. 23(A) to 23(C) is a modification of the first to third examples according to Embodiment 4 in which the gain suppressing unit (the trap circuit 601 or 602) is provided in the low-noise amplifier 400. Each of the fourth to sixth examples illustrated in FIGS. 24(A) to 24(C) is a modification of the first to third examples according to Embodiment 5 in which the gain suppressing unit (the trap circuit 601 or 602) is provided in the pre-stage of the low-noise amplifier 400.

In all examples, the low-noise amplifier 400 does not have distinct and asymmetric open-loop gain frequency characteristic. For example, a flat amplifier (small undulation is allowed) that does not have frequency selectivity and in which a gain of all channel bands is substantially flat is used. Since the asymmetric open-loop gain frequency characteristic of the low-noise amplifier 400 is not used, it is necessary for the gain suppressing unit (the trap circuit 601 or 602) to have a great attenuation characteristic.

Even when the third example of the mutual interference countermeasure method is applied, in a system in which at least a gain suppressing unit is provided, a signal level of an interference channel is attenuated by a function of the gain suppressing unit (the trap circuit 601 or 602). Therefore, an interference channel component is not demodulated in the demodulation function unit 8400 (not illustrated) provided in a post-stage of the low-noise amplifier 400, and thus it is possible to prevent interference. Since the asymmetric open-loop gain frequency characteristic of the amplifier circuit is not used, compared to Embodiment 4 or 5 or the like, it is necessary for the gain suppressing unit to have an attenuation characteristic allowing great attenuation in a target channel position. For example, when the trap circuit is used, a trap circuit having a large amount of trap may be used.

Embodiment 7

FIGS. 25 to 26 are diagrams illustrating Embodiment 7. Here, FIG. 25 is a diagram illustrating a frequency characteristic example of the low-noise amplifier 400 used in Embodiment 7. FIG. 26 is a diagram illustrating transmission and reception systems according to Embodiment 7.

As a typical example, while it has been specifically described in each aforementioned Embodiment that interference (mutual interference) from a channel adjacent in both sides is suppressed by the gain suppressing unit using, for example, the trap circuit, the technology disclosed in the specification is not limited thereto. The technology disclosed in the specification is not limited to the adjacent channel. When there is an influence from another more distant channel serving as an interfering wave other than the self channel, the influence of the channel (interference channel) other than the self channel may be suppressed by the gain suppressing unit using the trap circuit or the like. For example, it is possible to prevent an influence from another channel adjacent to the adjacent channel.

For example, FIG. 25 illustrates the frequency characteristic example of the low-noise amplifier 400 used in Embodiment 7. As an example, although modifications of FIGS. 4(C) and 5(B) in which the gain suppressing unit is applied to the high frequency side are illustrated, they may also be similarly applied to FIGS. 4(B) and 5(A) in which the gain suppressing unit is applied to the low frequency side. As illustrated in FIG. 25(A), the open-loop frequency characteristic of the low-noise amplifier 400 has frequency selectivity for a desired channel signal (carrier frequency Fc), that is, the self channel, and is sufficiently attenuated in both of a lower-side adjacent channel signal (carrier frequency $F_D$) and an upper-side adjacent channel signal (carrier frequency $F_{U1}$). However, a bounce is observed in a frequency in a frequency side higher than the upper-side adjacent channel (carrier frequency $F_{U1}$), and a gain attenuation is insufficient in another upper side channel signal (carrier frequency $F_{U2}$). That is, the gain attenuation is insufficient in the channel (carrier frequency $F_{U2}$) which is a second upper side channel (another high frequency side channel of the adjacent channel) with respect to the self channel In this case, as illustrated in FIG. 25(B), the gain suppressing unit is applied to match an attenuation frequency (trap position) in this channel signal (carrier frequency $F_{U2}$), and thus it is possible to attenuate the channel signal component (carrier frequency $F_{U2}$). Since the channel signal component (carrier frequency $F_{U2}$) may be set equal to or less than the reception limit level, the channel signal component (carrier frequency $F_{U2}$) is not demodulated. As a result, it is possible to prevent mutual interference.

FIG. 26 is a diagram illustrating transmission and reception systems according to Embodiment 7 in which the method is applied and illustrates a modification of the third example according to Embodiment 3 illustrated in FIG. 17(C). In the first communication device 100, focusing on the reception processing unit RX for the low frequency channel, since a combination in which the high frequency channel, which is a second upper side channel (another high frequency side channel of the adjacent channel), is the transmission processing unit TX is obtained, the gain suppressing unit (trap circuit) configured to suppress a gain of the high frequency channel is provided in the low-noise amplifier 400 for the low frequency channel. The gain suppressing unit (trap circuit) is not provided in combinations other than the above combination. Incidentally, there is no reason (necessity) to apply the first example according to Embodiment 3 illustrated in FIG. 17(A) or the second example according to Embodiment 3 illustrated in FIG. 17(B).

In the first communication device 100, a high frequency signal of the 103 GHz band (High) is coupled with the high frequency signal waveguide 308 through the transmission antenna TXANT and is transmitted to the second communication device 200 side. However, in this case, the high frequency signal jumps to the self reception antenna RXANT through a leakage path (represented by a dashed line b in the drawing) and is supplied to the low-noise amplifier 400 for the low frequency channel. Since the low-noise amplifier 400 for the low frequency channel includes the trap circuit TP_H in which the attenuation frequency is set to the 103 GHz band, as illustrated in FIG. 25(B), the high frequency signal of the 103 GHz band is sufficiently attenuated by a function of the trap circuit TP_H. For this reason, in the first communication device 100, the 103 GHz band is not demodulated in the post-stage demodulation function unit 8400 for the 57 GHz band (not illustrated). As a result, it is possible to prevent interference due to the high frequency signal leaked from the 103 GHz band transmission processing unit TX to the 57 GHz band reception processing unit RX. Although a detailed description is omitted, in the other leakage paths (represented by dashed lines a, c, and d in the drawing), even when the gain suppressing unit is not used, the interfering wave is not demodulated in the demodulation function unit 8400. As a result, it is possible to prevent interference due to a leakage component.

While exemplary embodiments of the technology disclosed in the specification have been described above, the technological scope described in the claims is not limited to the exemplary embodiments. It is possible to add various modifications or improvements to the embodiments within the spirit and scope of the technology disclosed in the specification. Embodiments to which such modifications or improvements are added are also included in the technological scope disclosed in the specification. The technology according to the claims is not limited to the above embodiments. All combinations of features described in the embodiments are not necessarily directed to problems to be solved by the technology disclosed in the specification. The embodiments include various stages of technology and various technologies may be derived from an appropriate combination of a plurality of disclosed configuration conditions. Even when some configuration conditions are removed from all configuration conditions disclosed in the embodiments, as long as the resulting effects are obtained by addressing the problems to be solved by the technology disclosed in the specification, a configuration in which some configuration conditions are removed may also be derived as the technology disclosed in the specification.

According to the description of the embodiments, the technology according to the claims described in the appended claims is an example, for example, the following technology is derived. The technology will be listed as follows.

[Supplementary Note A1]

A signal transmission device including:
reception processing units for respective channels, so as to enable multichannel transmission by dividing frequency bands,
wherein, a total number of channels is equal to or greater than three, and when full-duplex two-way communication is applied in any combination of two channels, one of reception processing units include a signal suppressing unit configured to suppress a signal component of a channel other than a self channel.

[Supplementary Note A2]

The signal transmission device according to supplementary note A1,
wherein the reception processing unit includes an amplifier configured to have frequency selectivity for the self channel and amplify a received signal, the signal suppressing unit includes a gain suppressing unit provided in the amplifier, and
when the full-duplex two-way communication is applied in any combination of two channels, the gain suppressing unit is configured to suppress a gain of a channel other than the self channel, the channel having an insufficient attenuation degree in a gain frequency characteristic.

[Supplementary Note A3]

The signal transmission device according to supplementary note A2,
wherein the combination of two channels has a relation of mutually adjacent channels, and
the gain suppressing unit is configured to suppress a gain of a channel that has an insufficient attenuation degree in the gain frequency characteristic, the channel being one of a lower-side adjacent channel and an upper-side adjacent channel.

[Supplementary Note A4]

The signal transmission device according to supplementary note A3,
wherein the gain frequency characteristic of the amplifier having no gain suppressing unit is shown such that a high frequency side has more insufficient gain attenuation than a low frequency side with respect to the self channel, and the gain suppressing unit provided in a lower-side adjacent channel amplifier is configured to suppress a gain of the upper-side adjacent channel.

[Supplementary Note A5]

The signal transmission device according to supplementary note A4, further including:
a first communication device and a second communication device coupled by a waveguide,
wherein the first communication device includes a first channel transmission processing unit, a second channel reception processing unit, and a third channel transmission processing unit,
the second communication device includes a first channel reception processing unit, a second channel transmission processing unit, and a third channel reception processing unit,
a carrier frequency of a second channel is set higher than a carrier frequency of a first channel, and a carrier frequency of a third channel is set higher than the carrier frequency of the second channel,
the full-duplex two-way communication is applicable to a combination of the second channel and the first channel and a combination of the second channel and the third channel,
n amplifier of the first channel reception processing unit includes a gain suppressing unit configured to suppress a gain of the second channel, and
an amplifier of the second channel reception processing unit includes a gain suppressing unit configured to suppress a gain of the third channel.

[Supplementary Note A6]

The signal transmission device according to supplementary note A4, further including:
a first communication device and a second communication device coupled by a waveguide,
wherein the first communication device includes a first channel transmission processing unit, a second channel transmission processing unit, and a third channel reception processing unit,
the second communication device includes a first channel reception processing unit, a second channel reception processing unit, and a third channel transmission processing unit,
a carrier frequency of a second channel is set higher than a carrier frequency of a first channel, and a carrier frequency of a third channel is set higher than the carrier frequency of the second channel,
the full-duplex two-way communication is applicable to a combination of the third channel and the first channel and a combination of the third channel and the second channel, and
an amplifier of the second channel reception processing unit includes a gain suppressing unit configured to suppress a gain of the third channel.

[Supplementary Note A7]

The signal transmission device according to supplementary note A4, further including:
a first communication device and a second communication device coupled by a waveguide,
wherein the first communication device includes a first channel reception processing unit, a second channel transmission processing unit, and a third channel transmission processing unit,
the second communication device includes a first channel transmission processing unit, a second channel reception processing unit, and a third channel reception processing unit,
a carrier frequency of a second channel is set higher than a carrier frequency of a first channel, and a carrier frequency of a third channel is set higher than the carrier frequency of the second channel,
the full-duplex two-way communication is applicable to a combination of the first channel and the second channel and a combination of the first channel and the third channel, and
an amplifier of the first channel reception processing unit includes a gain suppressing unit configured to suppress a gain of the second channel.

[Supplementary Note A8]

The signal transmission device according to any one of supplementary note A2 to supplementary note A7,
wherein, when simplex two-way communication is applied in any combination of two channels, the gain suppressing unit is configured to suppress a gain of a channel other than the self channel, the channel having an insufficient attenuation degree in the gain frequency characteristic.

[Supplementary Note A9]

The signal transmission device according to supplementary note A8,
wherein the combination of two channels has a relation of mutually adjacent channels, and
the gain suppressing unit is configured to suppress a gain of a channel that has an insufficient attenuation degree in the gain frequency characteristic, the channel being one of a lower-side adjacent channel and an upper-side adjacent channel.

[Supplementary note A10]

The signal transmission device according to supplementary note A6, further including:
a first communication device and a second communication device coupled by a waveguide,
wherein the first communication device includes a first channel transmission processing unit, a second channel transmission processing unit, and a third channel reception processing unit,
the second communication device includes a first channel reception processing unit,
a second channel reception processing unit, and a third channel transmission processing unit,
a carrier frequency of a second channel is set higher than a carrier frequency of a first channel, and a carrier frequency of a third channel is set higher than the carrier frequency of the second channel,
the full-duplex two-way communication is applicable to a combination of the third channel and the first channel and a combination of the third channel and the second channel,
the simplex two-way communication is applicable to a combination of the first channel and the second channel,
an amplifier of the first channel reception processing unit includes a gain suppressing unit configured to suppress a gain of the second channel, and
an amplifier of the second channel reception processing unit includes a gain suppressing unit configured to suppress a gain of the third channel.

[Supplementary Note A11]

The signal transmission device according to supplementary note A7, further including:
a first communication device and a second communication device coupled by a waveguide,
the first communication device includes a first channel reception processing unit, a second channel transmission processing unit, and a third channel transmission processing unit, wherein the second communication device includes a first channel transmission processing unit, a second channel reception processing unit, and a third channel reception processing unit,
a carrier frequency of a second channel is set higher than a carrier frequency of a first channel, and a carrier frequency of a third channel is set higher than the carrier frequency of the second channel,
the full-duplex two-way communication is applicable to a combination of the first channel and the second channel and a combination of the first channel and the third channel,
the simplex two-way communication is applicable to a combination of the second and third channels,
an amplifier of the first channel reception processing unit includes a gain suppressing unit configured to suppress a gain of the second channel, and
an amplifier of the second channel reception processing unit includes a gain suppressing unit configured to suppress a gain of the third channel.

[Supplementary Note A12]
A signal transmission device including:
reception processing units for respective channels, so as to enable multichannel transmission by dividing frequency bands,
wherein a total number of channels is equal to or greater than two, and
when simplex two-way communication is applied in any combination of two channels, one of reception processing units include a gain suppressing unit configured to suppress a gain of a channel other than a self channel.

[Supplementary Note A13]
The signal transmission device according to supplementary note A12,
wherein the reception processing unit includes an amplifier configured to have frequency selectivity for the self channel and amplify a received signal,
the signal suppressing unit includes a gain suppressing unit provided in the amplifier, and
when the simplex two-way communication is applied in any combination of two channels, the gain suppressing unit is configured to suppress a gain of a channel other than the self channel, the channel having an insufficient attenuation degree in a gain frequency characteristic.

[Supplementary Note A14]
The signal transmission device according to supplementary note A13
wherein the combination of two channels has a relation of mutually adjacent channels, and
the gain suppressing unit is configured to suppress a gain of a channel that has an insufficient attenuation degree in the gain frequency characteristic, the channel being one of a lower side adjacent channel and an upper side adjacent channel.

[Supplementary Note A15]
The signal transmission device according to any one of supplementary note A1 to supplementary note A15,
wherein the gain suppressing unit is composed of a trap circuit.

[Supplementary Note A16]
The signal transmission device according to supplementary note A15,
wherein the trap circuit includes a serial resonance circuit having an inductor and a capacitor.

[Supplementary Note A17]
A receiving circuit in which:
when the number of channels is equal to or greater than three in total, full-duplex two-way communication is applied in any combination of two channels, and
the receiving circuit includes a signal suppressing unit configured to suppress a signal component of a channel other than the self channel

[Supplementary Note A18]
A receiving circuit including:
a signal suppressing unit configured to suppress a signal component of a channel other than a self channel, when simplex two-way communication is applied in any combination of two channels.

[Supplementary Note A19]
An electronic apparatus including:
reception processing units for respective channels, so as to enable multichannel transmission by dividing frequency bands,
wherein a total number of channels is equal to or greater than three, and
when full-duplex two-way communication is applied in any combination of two channels, one of reception processing units include a signal suppressing unit configured to suppress a signal component of a channel other than a self channel.

[Supplementary Note A20]
An electronic apparatus including:
reception processing units for respective channels, so as to enable multichannel transmission by dividing frequency bands,
wherein a total number of channels is equal to or greater than two, and
when simplex two-way communication is applied in any combination of two channels, one of reception processing units include a signal suppressing unit configured to suppress a signal component of a channel other than a self channel.

[Supplementary Note B1]
A signal transmission device including:
a plurality of reception processing units configured to receive a transmission signal,
wherein any of the plurality of reception processing units includes a signal suppressing unit configured to suppress a signal component of a channel other than the self channel.

[Supplementary Note B2]
The signal transmission device according to supplementary note B1,
wherein the reception processing unit includes an amplifier configured to have frequency selectivity for the self channel and amplify a received signal,
the signal suppressing unit includes a gain suppressing unit provided in the amplifier, and
the gain suppressing unit is configured to suppress a gain of a channel, other than the self channel, having an insufficient attenuation degree in a gain frequency characteristic.

[Supplementary Note B3]
The signal transmission device according to supplementary note B2,
wherein in any combination of two channels which are adjacent to each other, the gain suppressing unit is configured to suppress a gain of either lower-side or upper-side adjacent channel that has an insufficient attenuation degree in the gain frequency characteristic.

[Supplementary Note B4]
The signal transmission device according to supplementary note B3, wherein the gain frequency characteristic of the amplifier having no gain suppressing unit is shown such that a high frequency side has more insufficient gain attenuation than a low frequency side with respect to the self channel, and the gain suppressing unit is configured to suppress a gain of the upper-side adjacent channel.

[Supplementary Note B5]

The signal transmission device according to supplementary note B3, wherein the amplifier includes the gain suppressing unit when full-duplex two-way communication is applied in any combination of two channels which are adjacent to each other.

[Supplementary Note B6]

The signal transmission device according to supplementary note B5, wherein first and second communication devices coupled by a waveguide are included, the first communication device includes a first channel transmission processing unit, a second channel reception processing unit, and a third channel transmission processing unit, the second communication device includes a first channel reception processing unit, a second channel transmission processing unit, and a third channel reception processing unit, a carrier frequency of a second channel is set higher than that of a first channel, and a carrier frequency of a third channel is set higher than that of the second channel, the full-duplex two-way communication is applicable to a combination of the second and first channels and a combination of the second and third channels, the gain frequency characteristic of the amplifier having no gain suppressing unit is shown such that a high frequency side has more insufficient gain attenuation than a low frequency side with respect to the self channel, an amplifier of the first channel reception processing unit includes a gain suppressing unit configured to suppress a gain of the second channel, and an amplifier of the second channel reception processing unit includes a gain suppressing unit configured to suppress a gain of the third channel.

[Supplementary Note B7]

The signal transmission device according to supplementary note B5, wherein first and second communication devices coupled by a waveguide are included, the first communication device includes a first channel transmission processing unit, a second channel transmission processing unit, and a third channel reception processing unit, the second communication device includes a first channel reception processing unit, a second channel reception processing unit, and a third channel transmission processing unit, a carrier frequency of a second channel is set higher than that of a first channel, and a carrier frequency of a third channel is set higher than that of the second channel, the full-duplex two-way communication is applicable to a combination of the third and first channels and a combination of the third and second channels, the gain frequency characteristic of the amplifier having no gain suppressing unit is shown such that a high frequency side has more insufficient gain attenuation than a low frequency side with respect to the self channel, and an amplifier of the second channel reception processing unit includes a gain suppressing unit configured to suppress a gain of the third channel.

[Supplementary Note B8]

The signal transmission device according to supplementary note B5, wherein first and second communication devices coupled by a waveguide are included, the first communication device includes a first channel reception processing unit, a second channel transmission processing unit, and a third channel transmission processing unit, the second communication device includes a first channel transmission processing unit, a second channel reception processing unit, and a third channel reception processing unit, a carrier frequency of a second channel is set higher than that of a first channel, and a carrier frequency of a third channel is set higher than that of the second channel, the full-duplex two-way communication is applicable to a combination of the first and second channels and a combination of the first and third channels, the gain frequency characteristic of the amplifier having no gain suppressing unit is shown such that a high frequency side has more insufficient gain attenuation than a low frequency side with respect to the self channel, and an amplifier of the first channel reception processing unit includes a gain suppressing unit configured to suppress a gain of the second channel.

[Supplementary Note B9]

The signal transmission device according to supplementary note B5, wherein the amplifier includes the gain suppressing unit when the number of channels is equal to or greater than three in total and simplex two-way communication is applied in any combination of two channels which are adjacent to each other.

[Supplementary Note B10]

The signal transmission device according to supplementary note B9, wherein the gain frequency characteristic of the amplifier having no gain suppressing unit is shown such that a high frequency side has more inefficient gain attenuation than a low frequency side with respect to the self channel, and the gain suppressing unit is configured to suppress a gain of the upper-side adjacent channel.

[Supplementary Note B11]

The signal transmission device according to supplementary note B10, further including:

a first communication device and a second communication device coupled by a waveguide, wherein the first communication device includes a first channel transmission processing unit, a second channel transmission processing unit, and a third channel reception processing unit, the second communication device includes a first channel reception processing unit, a second channel reception processing unit, and a third channel transmission processing unit, a carrier frequency of a second channel is set higher than a carrier frequency of a first channel, and a carrier frequency of a third channel is set higher than the carrier frequency of the second channel, the full-duplex two-way communication is applicable to a combination of the third channel and the first channel and a combination of the third channel and the second channel, the simplex two-way communication is applicable to a combination of the first channel and the second channel, an amplifier of the first channel reception processing unit includes a gain suppressing unit configured to suppress a gain of the second channel, and an amplifier of the second channel reception processing unit includes a gain suppressing unit configured to suppress a gain of the third channel.

[Supplementary Note B12]

The signal transmission device according to supplementary note B10, further including:

a first communication device and a second communication device coupled by a waveguide, wherein the first communication device includes a first channel reception processing unit, a second channel transmission processing unit, and a third channel transmission processing unit, the second communication device includes a first channel transmission processing unit, a second channel reception processing unit, and a third channel reception processing unit, a carrier frequency of a second channel is set higher than a carrier frequency of a first channel, and a carrier frequency of a third channel is set higher than the carrier frequency of the second channel, the full-duplex two-way communication is applicable to a combination of the first channel and the second channel and a combination of the first channel and the third channel, the simplex two-way communication is applicable to a combination of the second and third channels, an amplifier of the first channel reception processing unit includes a gain suppressing unit configured to suppress a gain of the second channel, and an amplifier of the second channel reception processing unit includes a gain suppressing unit configured to suppress a gain of the third channel.

[Supplementary Note B13]

The signal transmission device according to supplementary note B3, wherein the amplifier includes the gain suppressing unit when simplex two-way communication is applied in any combination of two channels which are adjacent to each other.

[Supplementary Note B14]

The signal transmission device according to supplementary note B2, wherein the gain suppressing unit is composed of a trap circuit.

[Supplementary Note B15]

The signal transmission device according to supplementary note B14, wherein the trap circuit includes a serial resonance circuit having an inductor and a capacitor.

[Supplementary Note B16]

The signal transmission device according to supplementary note B14, wherein the amplifier includes two cascade-connected transistors and an amplifier stage having an inductor in which a constant is set to have frequency selectivity for the self channel as a load, and the trap circuit is connected between a cascade connection point of the two transistors and a reference potential point.

[Supplementary Note B17]

The signal transmission device according to supplementary note B16, wherein the amplifier includes a plurality of amplifier stages and the trap circuit is provided in a first amplifier stage.

[Supplementary Note B18]

The signal transmission device according to supplementary note B16, wherein the amplifier includes a plurality of amplifier stages and the trap circuit is provided in at least one amplifier stage other than a first stage.

[Supplementary Note B19]

A receiving circuit including:

an amplifier circuit configured to have frequency selectivity for the self channel and amplify a received signal, wherein the amplifier circuit includes a gain suppressing circuit configured to suppress a gain of a channel other than the self channel.

[Supplementary Note B20]

An electronic apparatus in which:

a reception processing unit configured to receive a transmission signal is provided for each channel;

the reception processing unit includes an amplifier configured to have frequency selectivity for the self channel and amplify a received signal; and the amplifier includes a gain suppressing unit configured to suppress a gain of a channel other than the self channel.

[Supplementary Note C1]

A signal transmission device in which:

the number of channels is two in total;

a reception processing unit is provided for each channel, which enables full-duplex two-way communication through frequency band dividing; and the reception processing unit includes a signal suppressing unit configured to suppress a signal component of an adjacent channel.

[Supplementary Note C2]

The signal transmission device according to supplementary note C1, wherein the reception processing unit includes an amplifier configured to have frequency selectivity for the self channel and amplify a received signal, the signal suppressing unit includes a gain suppressing unit provided in the amplifier, and the gain suppressing unit configured to suppress a gain of either lower-side or upper-side adjacent channel that has an insufficient attenuation degree in a gain frequency characteristic.

[Supplementary Note C3]

The signal transmission device according to supplementary note C2, wherein the gain frequency characteristic of the amplifier having no gain suppressing unit is shown such that a high frequency side has more insufficient gain attenuation than a low frequency side with respect to the self channel, and the gain suppressing unit provided in a lower-side adjacent channel amplifier is configured to suppress a gain of the upper-side adjacent channel.

[Supplementary Note C4]

The signal transmission device according to supplementary note C1, wherein the gain suppressing unit is composed of a trap circuit.

[Supplementary Note C5]

The signal transmission device according to supplementary note C4, wherein the trap circuit includes a serial resonance circuit having an inductor and a capacitor.

[Supplementary Note C6]

The signal transmission device according to supplementary note C5, wherein pattern formation of the inductor is performed in a plurality of wiring layers and inductors of each layer are connected in parallel through an electric circuit.

[Supplementary Note C7]

The signal transmission device according to supplementary note C5, wherein the capacitor uses a distributed capacity when pattern formation of the inductor is performed.

[Supplementary Note C8]

The signal transmission device according to supplementary note C4, wherein the amplifier includes two cascade-connected transistors and an amplifier stage having an inductor in which a constant is set to have frequency selectivity for the self channel as a load, and the trap circuit is connected between a cascade connection point of the two transistors and a reference potential point.

[Supplementary Note C9]

The signal transmission device according to supplementary note C8, wherein the amplifier includes a plurality of amplifier stages and the trap circuit is provided in a first amplifier stage.

[Supplementary Note C10]

The signal transmission device according to supplementary note C8, wherein the amplifier includes a plurality of amplifier stages and the trap circuit is provided in at least one amplifier stage other than a first stage.

[Supplementary Note C11]

The signal transmission device according to supplementary note C8, wherein the amplifier includes a plurality of amplifier stages and the trap circuit is provided in a first amplifier stage and at least one amplifier stage other than the first stage.

[Supplementary Note C12]

The signal transmission device according to supplementary note C11, wherein a switch configured to selectively use the trap circuit is provided in at least either of the gain suppressing unit provided in the first amplifier stage or the trap circuit provided in at least one amplifier stage other than the first stage.

[Supplementary Note C13]

The signal transmission device according to supplementary note C8, wherein pattern formation of the inductor is performed in a plurality of wiring layers, and inductors of each layer are connected in parallel through an electric circuit.

[Supplementary Note C14]

The signal transmission device according to supplementary note C2, wherein the amplifier is formed in a complementary metal oxide semiconductor.

[Supplementary Note C15]

The signal transmission device according to supplementary note C2, wherein the transmission and reception processing units are coupled by a waveguide.

[Supplementary Note C16]

The signal transmission device according to supplementary note C15, wherein the waveguide is made of a dielectric material.

[Supplementary Note C17]

A receiving circuit in which:
a signal suppressing unit is configured to suppress a signal component of a channel other than the self channel;
the number of channels is two in total; and
full-duplex two-way communication is performed through frequency band dividing.

[Supplementary Note C18]

An electronic apparatus in which:
the number of channels is two in total;
a reception processing unit is provided for each channel, which enables full-duplex two-way communication through frequency band dividing; and
the reception processing unit includes a signal suppressing unit configured to suppress a signal component of an adjacent channel.

[Supplementary Note C19]

The electronic apparatus according to supplementary note C18, wherein the reception processing unit includes an amplifier configured to have frequency selectivity for the self channel and amplify a received signal, the signal suppressing unit includes a gain suppressing unit provided in the amplifier, and
the gain suppressing unit is configured to suppress a gain of either lower-side or upper-side adjacent channel that has an insufficient attenuation degree in the gain frequency characteristic.

[Supplementary Note C20]

The electronic apparatus according to supplementary note C19, wherein the gain frequency characteristic of the amplifier having no gain suppressing unit is shown such that a high frequency side has more insufficient gain attenuation than a low frequency side with respect to the self channel, and the gain suppressing unit provided in a lower-side adjacent channel amplifier is configured to suppress a gain of the upper-side adjacent channel.

REFERENCE SIGNS LIST

1 signal transmission device
100 first communication device
103 semiconductor chip
200 second communication device
203 semiconductor chip
400 low-noise amplifier
601 trap circuit
602 trap circuit
603 trap circuit
604 trap circuit
8 electronic apparatus
308 high frequency signal waveguide
TX transmission processing unit (transmission circuit)
RX reception processing unit (receiving circuit)

The invention claimed is:

1. A signal transmission device, comprising:
a plurality of reception processors configured to:
handle respective channels of a plurality of channels;
handle multichannel transmission based on a division of frequency bands to be used for a communication,
wherein the communication occurs on separate frequencies for transmission and for reception,
wherein a total number of the plurality of channels is equal to or greater than three,
wherein, based on a full-duplex two-way communication that is applied in any combination of two channels of the plurality of channels, one of the plurality of reception processors includes a first trap circuit configured to suppress a signal component of at least a low frequency side or a high frequency side of a first channel, wherein at least the low frequency side or the high frequency side to be suppressed has a lesser attenuation degree in a gain frequency characteristic with respect to a self channel of the one of the plurality of reception processors, and
wherein the one of the plurality of reception processors includes an amplifier, wherein the amplifier is configured to have frequency selectivity for the self channel and amplify a received signal.

2. The signal transmission device according to claim 1, wherein the first trap circuit is present in the amplifier, and
wherein, based on the full-duplex two-way communication that is applied in any combination of two channels of the plurality of channels, the first trap circuit is further configured to suppress a gain of a first channel, wherein the first channel has the lesser attenuation degree in the gain frequency characteristic.

3. The signal transmission device according to claim 2,
wherein the combination of two channels has a relation of mutually adjacent channels, and
wherein the first trap circuit is further configured to suppress a gain of a second channel that has the lesser attenuation degree in the gain frequency characteristic, a second channel being one of a lower-side adjacent channel and an upper-side adjacent channel.

4. The signal transmission device according to claim 3,
wherein the gain frequency characteristic of the amplifier in which the first trap circuit is unavailable is such that the high frequency side has a lesser gain attenuation than the low frequency side with respect to the self channel, and
wherein the first trap circuit is configured to suppress a gain of the upper-side adjacent channel, wherein the amplifier is a lower adjacent channel amplifier.

5. The signal transmission device according to claim 4, further comprising:
a first communication device and a second communication device, wherein the second communication device is coupled with the first communication device by a waveguide,
wherein the first communication device includes a third channel transmission processor, a fourth channel reception processor, and a fifth channel transmission processor,
wherein the second communication device includes a third channel reception processor, a fourth channel transmission processor, and a fifth channel reception processor,
wherein a carrier frequency of a fourth channel is set higher than a carrier frequency of a third channel, and a carrier frequency of a fifth channel is set higher than the carrier frequency of the fourth channel,
wherein the full-duplex two-way communication occurs via a combination of the fourth channel and the third channel or a combination of the fourth channel and the fifth channel,
wherein an amplifier of the third channel reception processor includes a trap circuit configured to suppress a gain of the fourth channel, and
wherein an amplifier of the fourth channel reception processor includes a third trap circuit configured to suppress a gain of the fifth channel.

6. The signal transmission device according to claim 4, further comprising:
a first communication device and a second communication device, wherein the second communication device is coupled with the first communication device by a waveguide,
wherein the first communication device includes a third channel transmission processor, a fourth channel transmission processor, and a fifth channel reception processor,
wherein the second communication device includes a third channel reception processor, a fourth channel reception processor, and a fifth channel transmission processor,
wherein a carrier frequency of a fourth channel is set higher than a carrier frequency of a third channel, and a carrier frequency of a fifth channel is set higher than the carrier frequency of the fourth channel,
wherein the full-duplex two-way communication occurs via a combination of the fifth channel and the third channel or a combination of the fifth channel and the fourth channel, and
wherein an amplifier of the fourth channel reception processor includes a second trap circuit configured to suppress a gain of the fifth channel.

7. The signal transmission device according to claim 4, further comprising:
a first communication device and a second communication device, wherein the second communication device is coupled with the first communication device by a waveguide,
wherein the first communication device includes a third channel reception processor, a fourth channel transmission processor, and a fifth channel transmission processor,
wherein the second communication device includes a third channel transmission processor, a fourth channel reception processor, and a fifth channel reception processor,
wherein a carrier frequency of a fourth channel is set higher than a carrier frequency of a third channel, and a carrier frequency of a fifth channel is set higher than the carrier frequency of the fourth channel,
wherein the full-duplex two-way communication occurs via a combination of the third channel and the fourth channel or a combination of the third channel and the fifth channel, and
wherein an amplifier of the third channel reception processor includes a second trap circuit configured to suppress a gain of the fourth channel.

8. The signal transmission device according to claim 2,
wherein, based on a simplex two-way communication via any combination of two channels of the plurality of channels, the first trap circuit is further configured to suppress the gain of the first channel.

9. The signal transmission device according to claim 8,
wherein the combination of two channels has a relation of mutually adjacent channels, and
wherein the first trap circuit is further configured to suppress a gain of a second channel that has the lesser attenuation degree in the gain frequency characteristic, the second channel being one of a lower-side adjacent channel and an upper-side adjacent channel.

10. The signal transmission device according to claim 9,
wherein the gain frequency characteristic of the amplifier in which the first trap circuit is unavailable is such that the high frequency side has a lesser gain attenuation than the low frequency side with respect to the self channel, and
wherein the first trap circuit is configured to suppress a gain of the upper-side adjacent channel, wherein the amplifier is a lower side adjacent channel amplifier.

11. The signal transmission device according to claim 10, further comprising:
a first communication device and a second communication device, wherein the second communication device is coupled with the first communication device by a waveguide,
wherein the first communication device includes a third channel transmission processor, a fourth channel transmission processor, and a third channel reception processor,
wherein the second communication device includes a third channel reception processor, a fourth channel reception processor, and a fifth channel transmission processor,
wherein a carrier frequency of a fourth channel is set higher than a carrier frequency of a third channel, and a carrier frequency of a fifth channel is set higher than the carrier frequency of the fourth channel, wherein the full-duplex two-way communication occurs via a combination of the third channel and the third channel or a combination of the fifth channel and the fourth channel, wherein the simplex two-way communication occurs via a combination of the third channel and the fourth channel, wherein an amplifier of the third channel reception processor includes a second trap circuit configured to suppress a gain of the fourth channel, and wherein an amplifier of the fourth channel reception processor includes a third trap circuit configured to suppress a gain of the fifth channel.

12. The signal transmission device according to claim 10, further comprising:

a first communication device and a second communication device, wherein the second communication device is coupled with the first communication device by a waveguide, wherein the first communication device includes a third channel reception processor, a fourth channel transmission processor, and a fifth channel transmission processor, wherein the second communication device includes a third channel transmission processor, a fourth channel reception processor, and a fifth channel reception processor, wherein a carrier frequency of a fourth channel is set higher than a carrier frequency of a third channel, and a carrier frequency of a fifth channel is set higher than the carrier frequency of the fourth channel, wherein the full-duplex two-way communication occurs via a combination of the third channel and the fourth channel or a combination of the third channel and the fifth channel, wherein the simplex two-way communication occurs via a combination of the fourth and fifth channels, wherein an amplifier of the third channel reception processor includes a second trap circuit configured to suppress a gain of the fourth channel, and wherein an amplifier of the fourth channel reception processor includes a trap circuit configured to suppress a gain of the fifth channel.

13. A signal transmission device, comprising:

a plurality of reception processors configured to:

handle respective channels of a plurality of channels;

handle multichannel transmission based on a division of frequency bands to be used for a communication, wherein the communication occurs on separate frequencies for transmission and for reception, wherein a total number of channels of the plurality of channels is equal to or greater than two, wherein, based on a simplex two-way communication that is applied in any combination of two channels of the plurality of channels, one of the plurality of reception processors includes a trap circuit configured to suppress a signal component of at least a low frequency side or a high frequency side of a first channel, wherein at least the low frequency side or the high frequency side to be suppressed has a lesser attenuation degree in a gain frequency characteristic with respect to a self channel of the one of the plurality of reception processors, and wherein the one of the plurality of reception processors includes an amplifier, wherein the amplifier is configured to have frequency selectivity for the self channel and amplify a received signal.

14. The signal transmission device according to claim 13, wherein the trap circuit is present in the amplifier, and wherein, based on the simplex two-way communication that is applied in any combination of two channels of the plurality of channels, the trap circuit is configured to suppress a gain of the first channel, wherein the first channel has the lesser attenuation degree in the gain frequency characteristic.

15. The signal transmission device according to claim 14, wherein the combination of two channels has a relation of mutually adjacent channels, and wherein the trap circuit is further configured to suppress a gain of a second channel that has the lesser attenuation degree in the gain frequency characteristic, the second channel being one of a lower side adjacent channel and an upper side adjacent channel.

16. A receiving circuit, comprising:

a trap circuit configured to suppress a signal component of at least a low frequency side or a high frequency side of a first channel of a plurality of channels, wherein at least the low frequency side or the high frequency side to be suppressed has a lesser attenuation degree in a gain frequency characteristic with respect to a self channel in a multichannel transmission in which a frequency band to be used for a communication is divided and wherein the communication occurs on separate frequencies for transmission and for reception, based on a total number of channels of the plurality of channels that is equal to or greater than three and a full-duplex two-way communication that is applied in any combination of two channels of the plurality of channels.

17. A receiving circuit, comprising:

a trap circuit configured to suppress a signal component of at least a low frequency side or a high frequency side of a first channel of a plurality of channels, wherein at least the low frequency side or the high frequency side to be suppressed has a lesser attenuation degree in a gain frequency characteristic with respect to a self channel in a multichannel transmission in which a frequency band to be used for a communication is divided and wherein the communication occurs on separate frequencies for transmission and for reception, based on a simplex two-way communication that is applied in any combination of two channels of the plurality of channels.

18. An electronic apparatus, comprising:

a plurality of reception processors configured to:

handle respective channels of a plurality of channels;

handle multichannel transmission based on a division of frequency bands used for a communication, wherein the communication occurs on separate frequencies for transmission and for reception, wherein a total number of channels of the plurality of channels is equal to or greater than three, and wherein, based on a full-duplex two-way communication that is applied in any combination of two channels of the plurality of channels, one of the plurality of reception processors includes a trap circuit configured to suppress a signal component of at least a low frequency side or a high frequency side of a first channel, wherein at least the low frequency side or the high frequency side to be suppressed has a lesser attenuation degree in a gain frequency characteristic with respect to a self channel of the one of the plurality of reception processors, and wherein the one of the plurality of reception processors includes an amplifier, wherein the amplifier is configured to have frequency selectivity for the self channel and amplify a received signal.

19. An electronic apparatus, comprising:

a plurality of reception processors configured to:

handle for respective channels of a plurality of channels;

handle multichannel transmission based on a division of frequency bands to be used for a communication, wherein the communication occurs on separate frequencies for transmission and for reception, wherein a total number of channels of the plurality of channels is equal to or greater than two, and wherein, based on a simplex two-way communication that is applied in any combination of two channels of the plurality of channels, one of the plurality of reception processors includes a trap circuit configured to suppress a signal component of at least a low frequency side or a high frequency side of a first channel, wherein at least the low frequency side or the high frequency side to be suppressed has a lesser attenuation degree in a gain frequency characteristic with respect to a self channel of the one of the plurality of reception processors, and wherein the one of the plurality of reception processors includes an amplifier, wherein the amplifier is configured to have frequency selectivity for the self channel and amplify a received signal.

* * * * *